United States Patent
He et al.

(10) Patent No.: US 11,765,693 B2
(45) Date of Patent: Sep. 19, 2023

(54) METHOD AND APPARATUS FOR NR V2X SIDELINK HARQ PROCEDURE

(71) Applicant: Samsung Electronics Co., Ltd., Suwon-si (KR)

(72) Inventors: Chao He, Allen, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/805,448

(22) Filed: Jun. 3, 2022

(65) Prior Publication Data

US 2022/0303955 A1 Sep. 22, 2022

Related U.S. Application Data

(63) Continuation of application No. 16/847,497, filed on Apr. 13, 2020, now Pat. No. 11,356,979.

(60) Provisional application No. 62/838,042, filed on Apr. 24, 2019, provisional application No. 62/842,075, filed on May 2, 2019, provisional application No. 62/854,594, filed on May 30, 2019, provisional application No. 62/854,618, filed on May 30, 2019, provisional application No. 62/866,698, filed on Jun. 26, 2019, provisional application No. 62/901,320, filed on Sep. 17, 2019.

(51) Int. Cl.
| | |
|---|---|
| *H04W 72/02* | (2009.01) |
| *H04L 1/1812* | (2023.01) |
| *H04W 72/0446* | (2023.01) |
| *H04W 4/40* | (2018.01) |
| *H04L 5/00* | (2006.01) |
| *H04W 92/18* | (2009.01) |

(52) U.S. Cl.
CPC .......... *H04W 72/02* (2013.01); *H04L 1/1819* (2013.01); *H04L 5/0055* (2013.01); *H04W 4/40* (2018.02); *H04W 72/0446* (2013.01); *H04W 92/18* (2013.01)

(58) Field of Classification Search
None
See application file for complete search history.

(56) References Cited

U.S. PATENT DOCUMENTS

2021/0314921 A1* 10/2021 Yang ................. H04W 72/0453
2022/0201654 A1* 6/2022 Lee .................... H04W 72/0406

OTHER PUBLICATIONS

Intellectual Property India, Examination Report dated Aug. 3, 2023 regarding Application No. 202117053303, 6 pages.

* cited by examiner

*Primary Examiner* — Anh Ngoc M Nguyen

(57) ABSTRACT

Apparatuses and methods for obtaining and providing hybrid automatic repeat request acknowledgement (HARQ-ACK) information. A method for providing HARQ-ACK information includes receiving a configuration for a slot offset value and receiving a physical sidelink shared channel (PSSCH) over a number of sub-channels in a first slot. The PSSCH includes a transport block (TB). The method includes determining a second slot as an earliest slot with resources for transmission of a physical sidelink feedback channel (PSFCH) that is after the first slot by a number of slots equal to the slot offset value. The PSFCH includes the HARQ-ACK information that is in response to reception of the TB. The method further includes transmitting the PSFCH in the second slot.

19 Claims, 31 Drawing Sheets

RX UE

| Zone 1 | Zone 2 | Zone 3 | Zone 4 |
|---|---|---|---|
| Zone 13 | Zone 14 | Zone 15 | Zone 16 |
| Zone 9 | Zone 10 | Zone 11 | Zone 12 |

RX UE

| Zone 5 | Zone 6 | Zone 7 | Zone 8 |
|---|---|---|---|

Tx UE

| Zone 1 | Zone 2 | Zone 3 | Zone 4 |
|---|---|---|---|
| Zone 13 | Zone 14 | Zone 15 | Zone 16 |
| Zone 9 | Zone 10 | Zone 11 | Zone 12 |
| Zone 5 | Zone 6 | Zone 7 | Zone 8 |

FIG. 20

METHOD AND APPARATUS FOR NR V2X SIDELINK HARQ PROCEDURE

CROSS-REFERENCE TO RELATED APPLICATIONS AND CLAIM OF PRIORITY

This application is a continuation of U.S. application Ser. No. 16/847,497, which claims priority to U.S. Provisional Patent Application No. 62/838,042 filed Apr. 24, 2019, U.S. Provisional Patent Application No. 62/842,075 filed May 2, 2019, U.S. Provisional Patent Application No. 62/854,594 filed May 30, 2019, U.S. Provisional Patent Application No. 62/854,618 filed May 30, 2019, U.S. Provisional Patent Application No. 62/866,698 filed Jun. 26, 2019, and U.S. Provisional Patent Application No. 62/901,320 filed Sep. 17, 2019, the disclosures of which are incorporated herein by reference in their entireties.

TECHNICAL FIELD

The present disclosure relates to vehicle to everything (V2X) sidelink hybrid automatic repeat request (HARQ) procedures.

BACKGROUND

5G New Radio Interface/Access (NR) systems support multiple services including enhanced mobile broadband (eMBB), massive machine type communication (mMTC), ultra-reliable low latency communication (uRLLC), and V2X. These services have enhanced features including higher data rates, higher operating frequency bands, wider bandwidths, greater reliability, shorter latency, and increased number of connectivities than previous services. V2X includes Vehicle-to-Vehicle (V2V) Communications, Vehicle-to-Infrastructure (V2I) Communications, and Vehicle-to-Pedestrian (V2P) Communications. These three types of V2X can use "co-operative awareness" to provide more intelligent services for end-users. Because the use of V2X is increasing, sidelink HARQ procedures need to improve to keep up with the demand.

SUMMARY

The present disclosure relates to monitoring downlink control channels for communication with multiple transmission reception points.

In one embodiment, a method for a user equipment (UE) to provide HARQ-acknowledgement (ACK) information is provided. The method includes receiving a configuration for a slot offset value and receiving a physical sidelink shared channel (PSSCH) over a number of sub-channels in a first slot. The PSSCH includes a transport block (TB). The method includes determining a second slot as an earliest slot with resources for transmission of a physical sidelink feedback channel (PSFCH) that is after the first slot by a number of slots equal to the slot offset value. The PSFCH includes the HARQ-ACK information that is in response to reception of the TB. The method further includes transmitting the PSFCH in the second slot.

In another embodiment, a UE is provided. The UE includes a transceiver configured to receive a configuration for a slot offset value and receive a PSSCH over a number of sub-channels in a first slot. The PSSCH includes a TB. The UE also includes a processor operably connected to the transceiver. The processor is configured to determine a second slot as an earliest slot with resources for transmission of a PSFCH that is after the first slot by a number of slots equal to the slot offset value. The PSFCH includes HARQ-ACK information in response to reception of the TB. The transceiver is further configured to transmit the PSFCH in the second slot.

In yet another embodiment, a method for a UE to obtain HARQ-ACK information is provided. The method includes transmitting a configuration for a slot offset value and transmitting a PSSCH over a number of sub-channels in a first slot. The PSSCH includes a TB. The method includes determining a second slot as an earliest slot with resources for reception of a PSFCH that is after the first slot by a number of slots equal to the slot offset value and receiving the PSFCH in the second slot. The PSFCH includes the HARQ-ACK information that is in response to transmission of the TB.

In yet another embodiment, a UE is provided. The UE includes a transceiver configured to transmit a configuration for a slot offset value and transmit a PSSCH over a number of sub-channels in a first slot. The PSSCH includes a TB. The UE also includes a processor operably connected to the transceiver. The processor is configured to determine a second slot as an earliest slot with resources for reception of a PSFCH that is after the first slot by a number of slots equal to the slot offset value. The transceiver is further configured to receive the PSFCH in the second slot. The PSFCH includes HARQ-ACK information in response to transmission of the TB.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 20 illustrates UEs marked in various geographical zones according to various embodiments of the present disclosure;

DETAILED DESCRIPTION

FIGS. 1 through 37, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

A 5G communication system can be implemented in higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are considered in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

The discussion of 5G systems and frequency bands associated therewith is for reference as certain embodiments of the present disclosure can be implemented in 5G systems. However, the present disclosure is not limited to 5G systems or the frequency bands associated therewith, and embodiments of the present disclosure can be utilized in connection with any frequency band.

Figure 1:
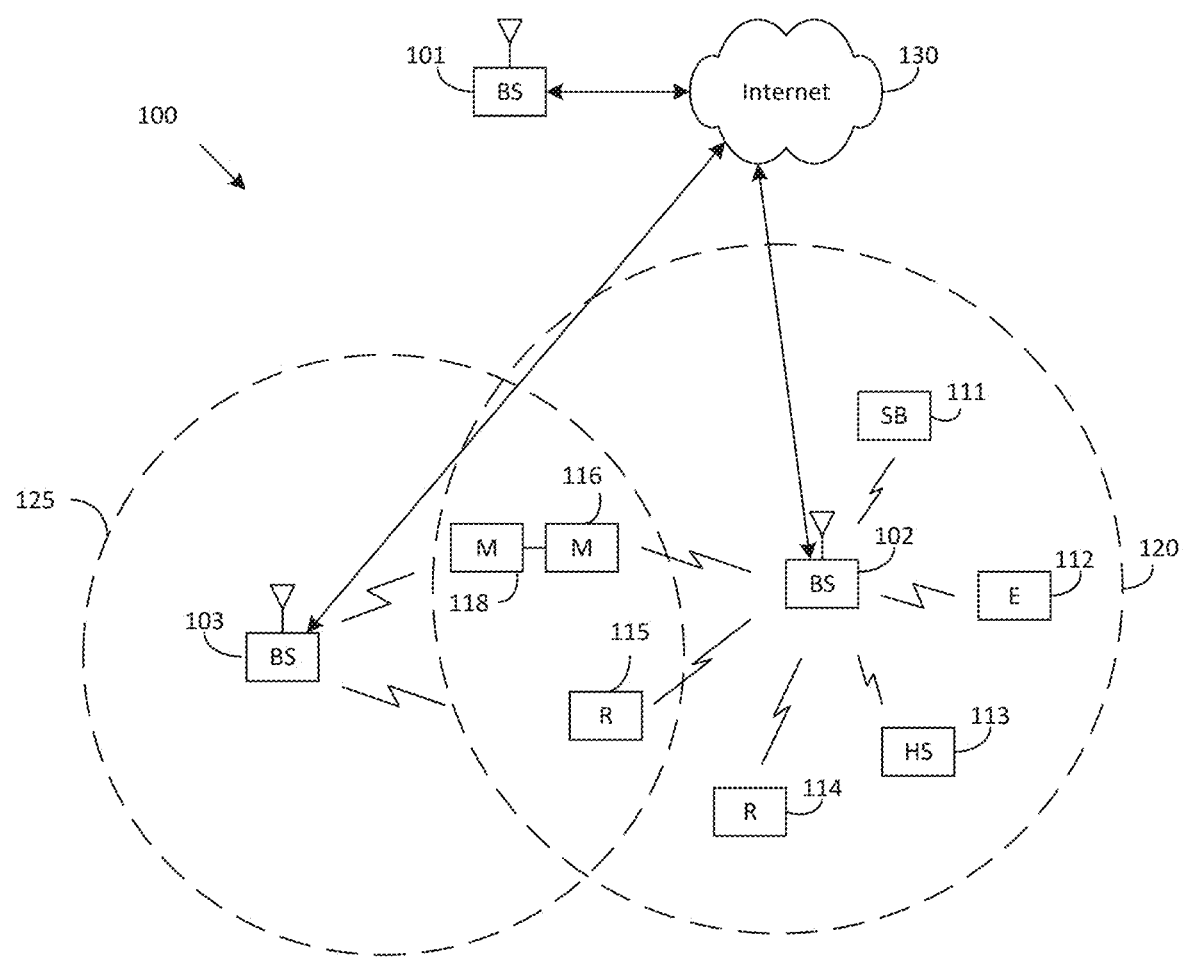
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

The gNB 102 provides wireless broadband access to the network 130 for a first plurality of UEs within a coverage area 120 of the gNB 102. The first plurality of UEs includes a UE 111, which can be located in a small business; a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

In various embodiments, UE 116 can communicate directly with another UE 118 such that UE 116 can act as a gNB for UE 118 as discussed in greater detail below. For example, in some embodiments, the UE 116 and/or UE 118 may be a vehicle and may conduct V2X communications as discussed in greater detail below.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2:
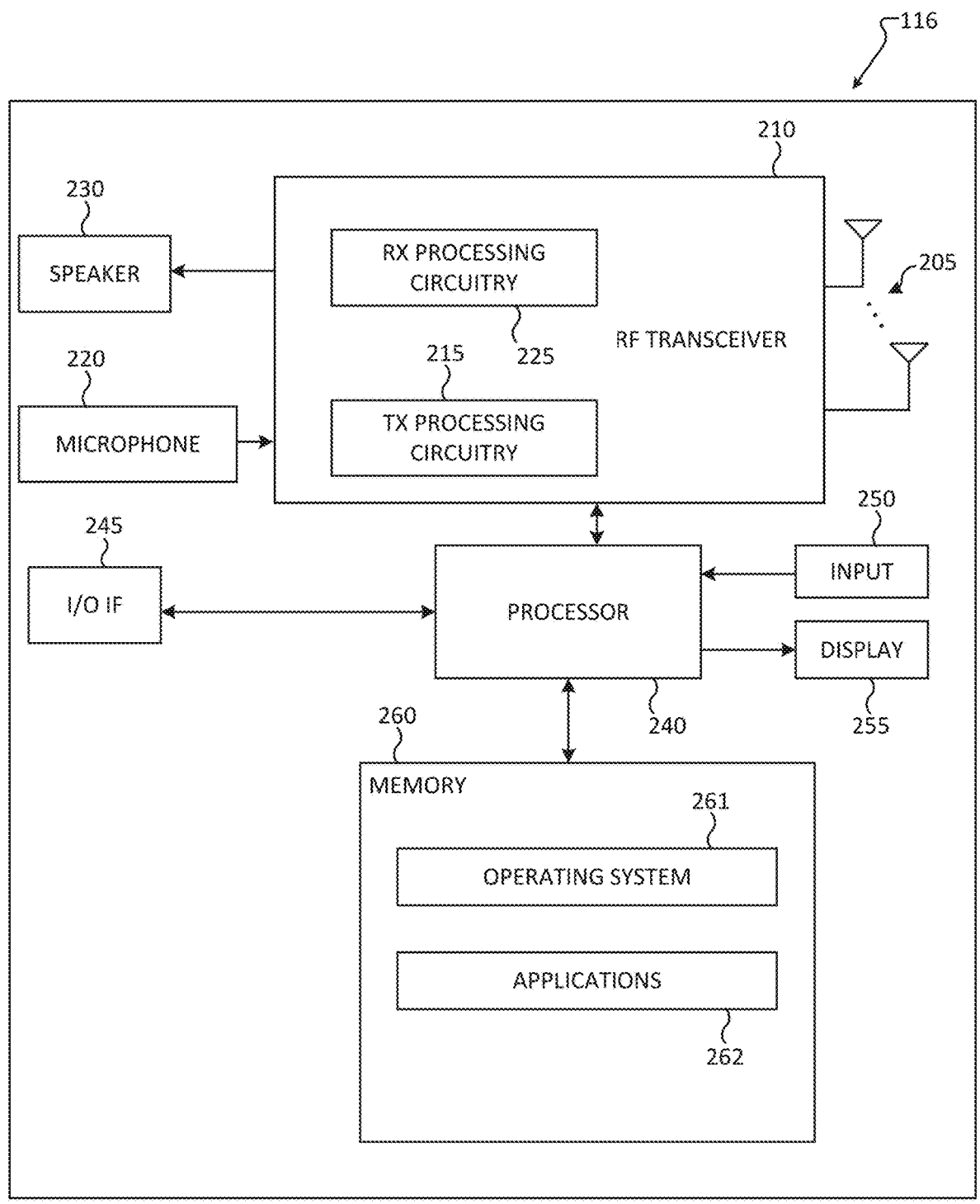
FIG. 2 illustrates an example user equipment according to various embodiments of the present disclosure.

FIG. 2 illustrates an example UE 116 according to the present disclosure. The embodiment of the UE 116 illustrated in FIG. 2 is for illustration only, and the UEs 111-118 of FIG. 1 can have the same or similar configuration. However, UEs come in a wide variety of configurations, and FIG. 2 does not limit the scope of the present disclosure to any particular implementation of a UE.

The UE 116 includes one or more transceivers 210, a microphone 220, a speaker 230, a processor 240, an input/output (I/O) interface 245, an input 250, a display 255, and a memory 260. The memory 260 includes an operating system (OS) program 261 and one or more applications 262.

The transceiver 210 includes transmit (TX) processing circuitry 215 to modulate signals, receive (RX) processing circuitry 225 to demodulate signals, and an antenna array 205 including antennas to send and receive signals. The antenna array 205 receives an incoming signal transmitted by a gNB of the wireless network 100 of FIG. 1. The transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna array 205.

The processor 240 can include one or more processors or other processing devices and execute the OS program 261 stored in the memory 260 in order to control the overall operation of the UE 116. For example, the processor 240 can control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 can execute other processes and programs resident in the memory 260, such as operations for non-zero power or zero power channel state information reference signal (CSI-RS) reception and measurement for systems. The processor 240 can move data into or out of the memory 260 as part of an executing process. In some embodiments, the processor 240 is configured to execute the applications 262 based on the OS program 261 or in response to signals received from gNBs or an operator. The processor 240 is also coupled to the I/O interface 245, which provides the UE 116 with the ability to connect to other devices such as laptop computers and handheld computers. The I/O interface 245 is the communication path between these accessories and the processor 240.

The processor 240 is also coupled to the input 250 (e.g., keypad, touchscreen, button etc.) and the display 255. The operator of the UE 116 can use the input 250 to enter data into the UE 116. The display 255 can be a liquid crystal display or other display capable of rendering text and/or at least limited graphics, such as from web sites.

The memory 260 is coupled to the processor 240. The memory 260 can include at least one of a random-access memory (RAM), Flash memory, or other read-only memory (ROM).

Although FIG. 2 illustrates one example of UE 116, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs) and one or more graphics processing units (GPUs). Although FIG. 2 illustrates the UE 116 as a mobile telephone or smartphone, UEs can be configured to operate as other types of mobile or stationary devices.

Figure 3:
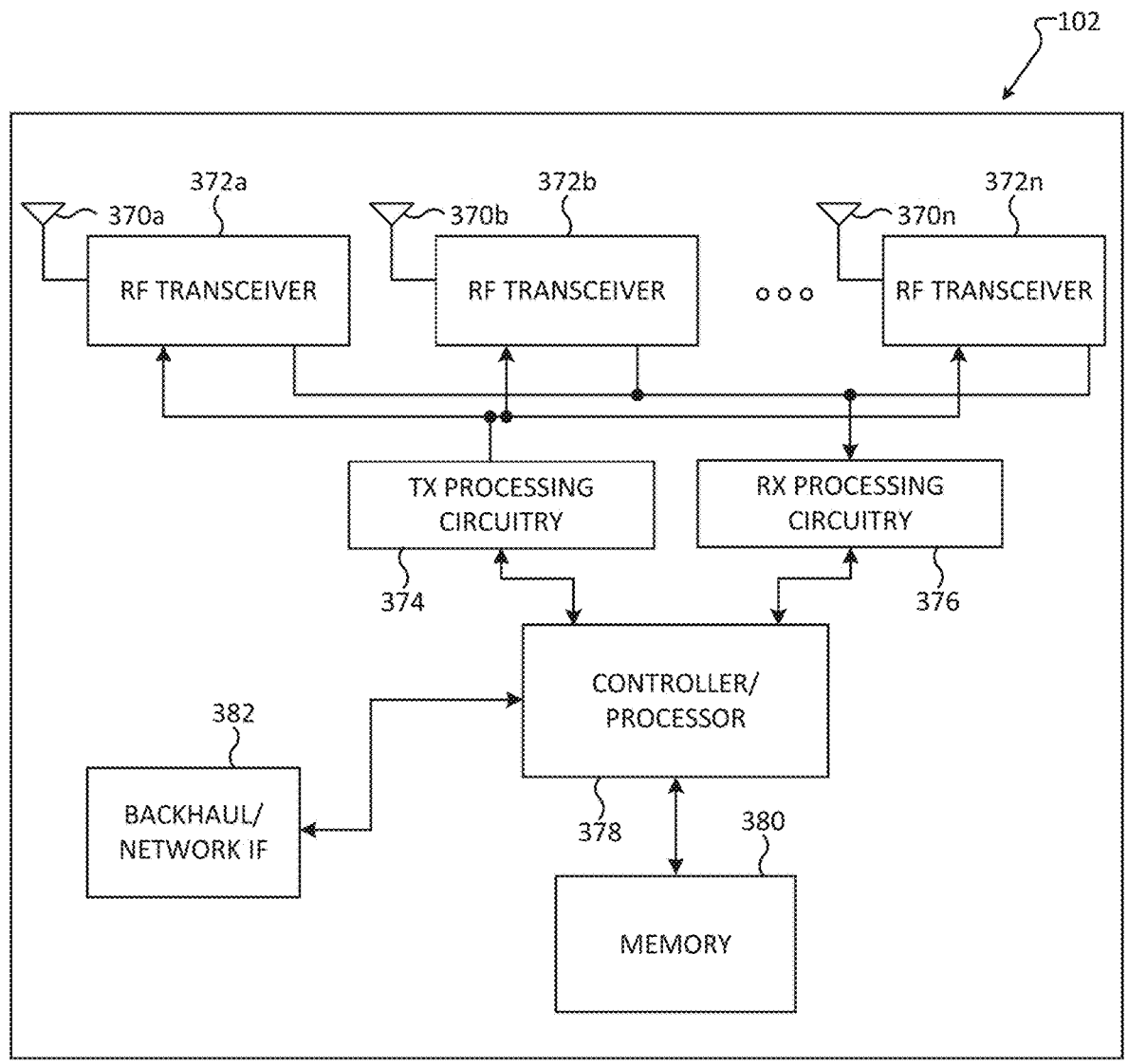
FIG. 3 illustrates an example base station (BS) according to various embodiments of the present disclosure.

FIG. 3 illustrates an example gNB 102 according to the present disclosure. The embodiment of the gNB 102 shown in FIG. 3 is for illustration only, and other gNBs of FIG. 1 can have the same or similar configuration. However, gNBs come in a wide variety of configurations, and FIG. 3 does not limit the scope of the present disclosure to any particular implementation of a gNB. The gNB 101 and the gNB 103 can include the same or similar structure as the gNB 102.

As shown in FIG. 3, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions is stored in memory.

Although FIG. 3 illustrates one example of a gNB 102, various changes can be made to FIG. 3. For example, the gNB 102 can include any number of each component shown in FIG. 3. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

The present disclosure relates generally to wireless communication systems and, more specifically, to vehicular communication network protocols, including vehicle-to-device, vehicle-to-vehicle, and vehicle-to-network communication resource allocation and synchronization methods. A communication system includes a downlink (DL) that conveys signals from transmission points such as base stations (BSs or gNBs) to user equipments (UEs) and an uplink (UL) that conveys signals from UEs to reception points such as gNBs. Additionally, a communication system can include a sidelink (SL) to support transmissions and receptions among UEs or among other non-infrastructure-based nodes.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 1 millisecond or 0.5 milliseconds and include 14 symbols, and an RB can have a BW of 180 kHz or 360 kHz and include 12 SCs with inter-SC spacing of 15 kHz or 30 kHz.

DL signals include data signals conveying information content, control signals conveying DL control information (DCI), and reference signals (RS) that are also known as pilot signals. A gNB can transmit data information or DCI through respective physical DL shared channels (PDSCHs) or physical DL control channels (PDCCHs). A gNB can transmit one or more of multiple types of RS including channel state information RS (CSI-RS) and demodulation RS (DMRS). A CSI-RS is intended for UEs to measure channel state information (CSI) or to perform other measurements such as ones related to mobility support. A DMRS can be transmitted only in the BW of a respective PDCCH or PDSCH and a UE can use the DMRS to demodulate data or control information.

UL signals also include data signals conveying information content, control signals conveying UL control information (UCI), and RS. A UE transmits data information or UCI through a respective physical UL shared channel (PUSCH) or a physical UL control channel (PUCCH). When a UE simultaneously transmits data information and UCI, the UE can multiplex both in a PUSCH or transmit them separately in respective PUSCH and PUCCH. UCI includes hybrid automatic repeat request acknowledgement (HARQ-ACK) information, indicating correct or incorrect detection of data transport blocks (TBs) by a UE, scheduling request (SR) indicating whether a UE has data in the UE's buffer, and CSI reports enabling a gNB to select appropriate parameters to perform link adaptation for PDSCH or PDCCH transmissions to a UE.

A CSI report from a UE can include a channel quality indicator (CQI) informing a gNB of a modulation and coding scheme (MCS) for the UE to detect a data TB with a predetermined block error rate (BLER), such as a 10% BLER, of a precoding matrix indicator (PMI) informing a gNB how to precode signaling to a UE, and of a rank indicator (RI) indicating a transmission rank for a PDSCH. UL RS includes DMRS and sounding RS (SRS). DMRS is transmitted in a BW of a respective PUSCH or PUCCH transmission. A gNB can use a DMRS to demodulate information in a respective PUSCH or PUCCH. SRS is transmitted by a UE to provide a gNB with UL CSI and, for a TDD or a flexible duplex system, to also provide a PMI for DL transmissions. An UL DMRS or SRS transmission can be based, for example, on a transmission of a Zadoff-Chu (ZC) sequence or, in general, of a CAZAC sequence.

Figure 4A:
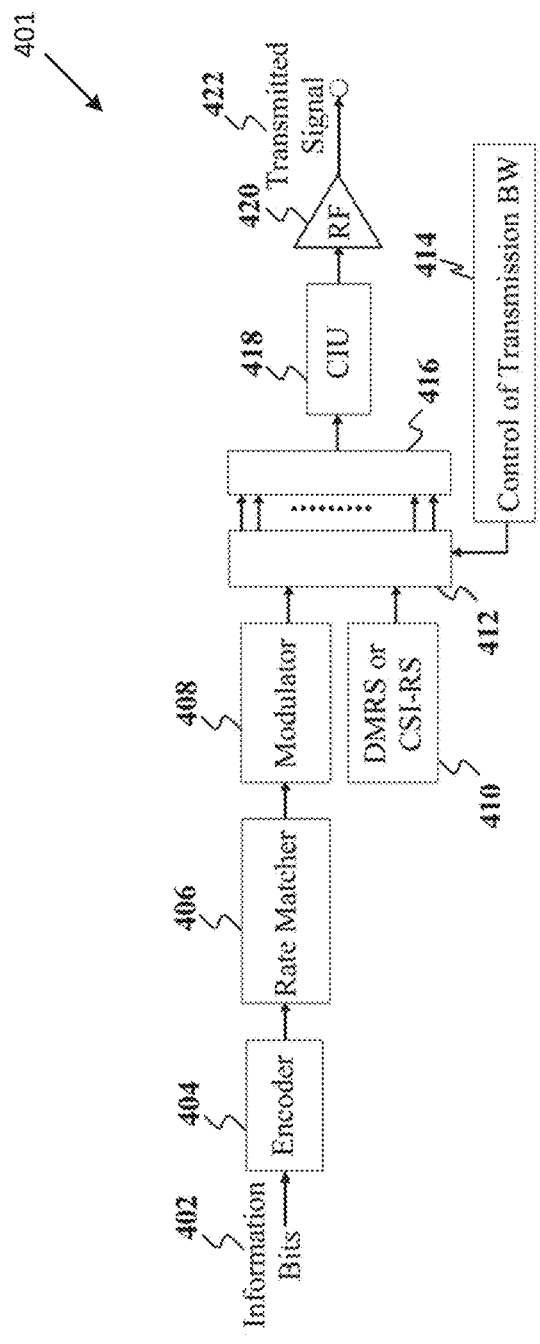
FIG. 4A illustrates an example transmitter structure according to various embodiments of the present disclosure.

FIG. 4A illustrates an example transmitter structure 401 using OFDM according to embodiments of the present disclosure. An embodiment of the transmitter structure 401 shown in FIG. 4A is for illustration only. One or more of the components illustrated in FIG. 4A can be implemented in specialized circuitry configured to perform the noted functions or one or more of the components can be implemented by one or more processors executing instructions to perform the noted functions. Other embodiments are used without departing from the scope of the present disclosure.

Information bits, such as DCI bits or data bits 402, are encoded by encoder 404, rate matched to assigned time/frequency resources by rate matcher 406 and modulated by modulator 408. Subsequently, modulated encoded symbols and DMRS or CSI-RS 410 are mapped to SCs 412 by SC mapping unit 414, an inverse fast Fourier transform (IFFT) is performed by filter 416, a cyclic prefix (CP) is added by a CP insertion unit (CIU) 418, and a resulting signal 422 is filtered by a filter and transmitted by an radio frequency (RF) unit 420.

Figure 4B:
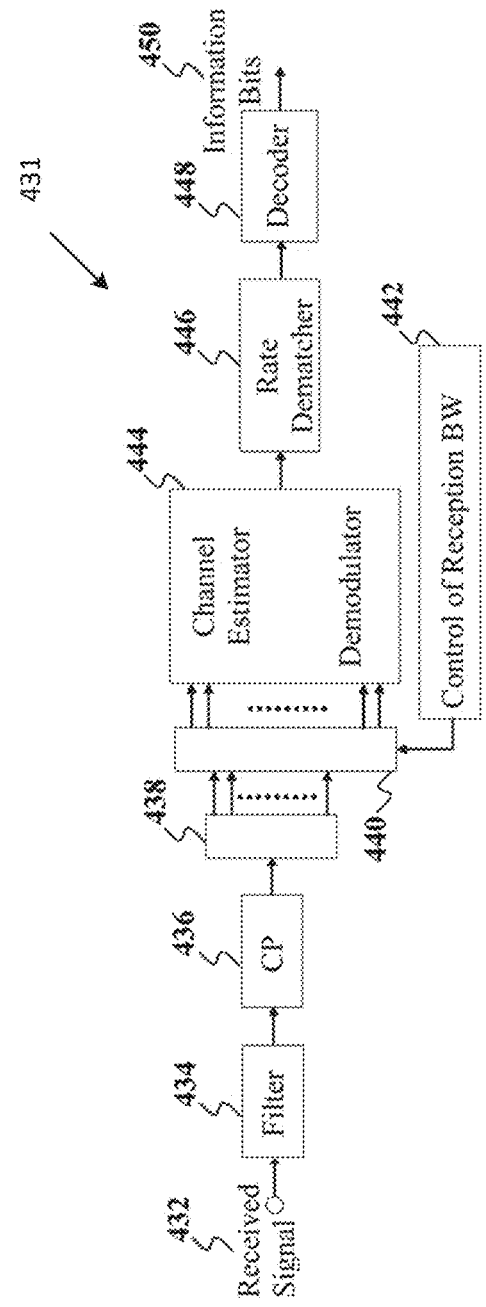
FIG. 4B illustrates an example receiver structure according to various embodiments of the present disclosure.

FIG. 4B illustrates an example receiver structure 431 using OFDM according to embodiments of the present disclosure. An embodiment of the receiver structure 431 shown in FIG. 4B is for illustration only. One or more of the components illustrated in FIG. 4B can be implemented in specialized circuitry configured to perform the noted functions or one or more of the components can be implemented by one or more processors executing instructions to perform the noted functions. Other embodiments are used without departing from the scope of the present disclosure.

A received signal 432 is filtered by filter 434, a CP removal unit 436 removes a CP, a filter 438 applies a fast Fourier transform (FFT), SCs de-mapping unit 440 de-maps SCs selected by BW selector unit 442, received symbols are demodulated by a channel estimator and a demodulator unit 444, a rate de-matcher 446 restores a rate matching, and a decoder 448 decodes the resulting bits to provide information bits 450.

Figure 4C:
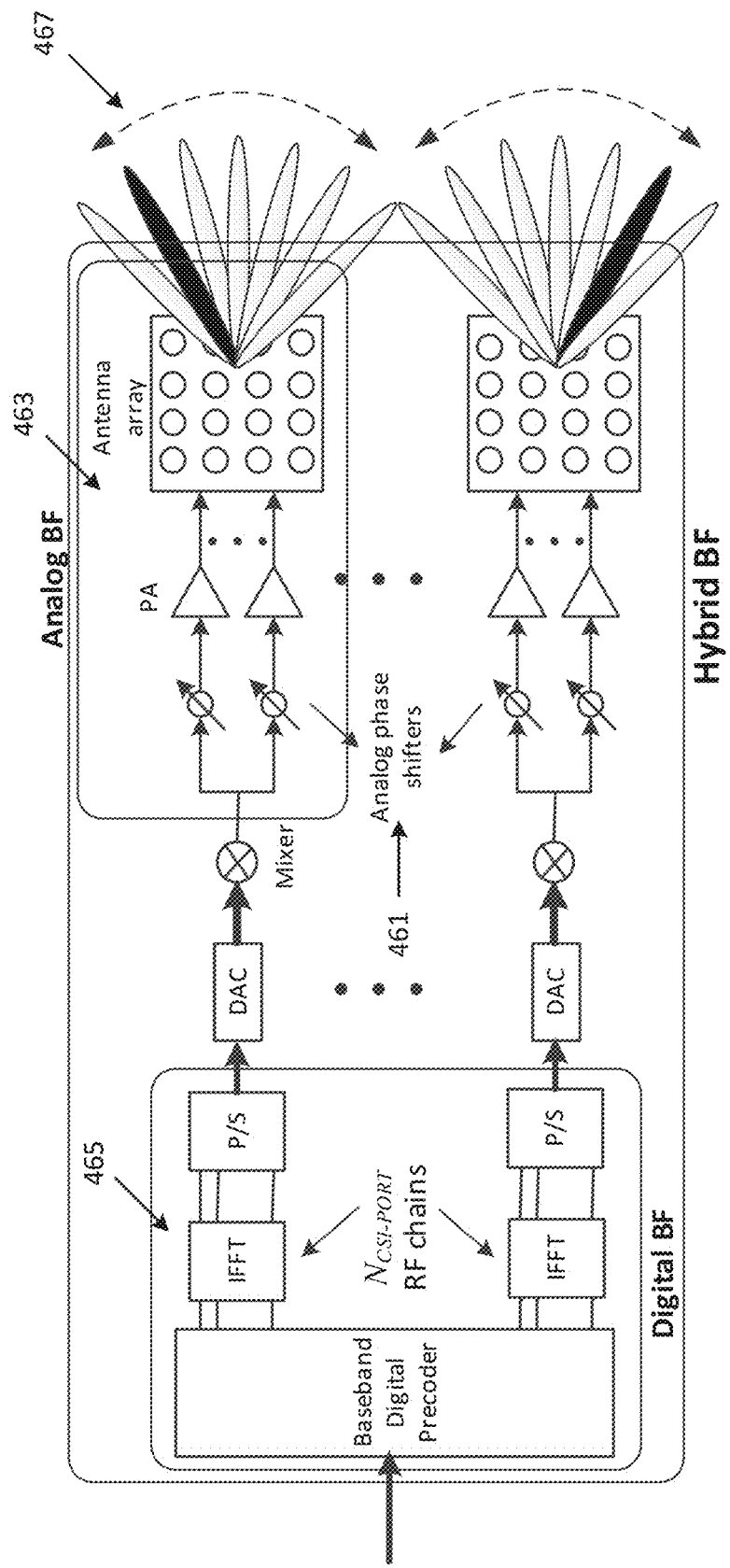
FIG. 4C illustrates an example for a mapping of a channel state information reference signal (CSI-RS) port to antenna elements according to various embodiments of the present disclosure.

FIG. 4C illustrates an example for a mapping of a CSI-RS port to antenna elements according to various embodiments of the present disclosure. In various embodiments, the transmitter structure 401 and receiver structure 431 can be implemented as the antenna elements in FIG. 4C. In various embodiments, the transmitter structure 401 and receiver structure 431 can be implemented in FIGS. 2 and 3.

One CSI-RS port is mapped onto a number of antenna elements that can be substantially larger than one and can be controlled by a bank of analog phase shifters 461. One CSI-RS port can then correspond to one sub-array that produces a narrow analog beam through analog beamforming 463. The analog beam can be configured to sweep across a wider range of angles 467 by varying the phase shifter bank across symbols or slots. A number of sub-arrays (equal to the number of RF chains) is same as a number of CSI-RS antenna ports $N_{CS}$I-PORT A digital beamforming unit 465 performs a linear combination across $N_{CSI-PORT}$ analog beams to increase precoding gain. While analog beams are wideband (hence not frequency-selective), digital precoding can be varied across frequency sub-bands or resource blocks. For mmWave bands, although a number of antenna elements can be larger for a given form factor, a number of CSI-RS antenna ports, that can correspond to the number of digitally precoded antenna ports, it typically limited due to hardware constraints, such as a feasibility to install a large number of ADCs/DACs at mmWave frequencies.

Traditionally, cellular communication networks have been designed to establish wireless communication links between UEs and fixed communication infrastructure components, such as gNBs, that serve UEs in a wide or local geographic range. However, a wireless network can also be implemented by utilizing only device-to-device (D2D) communication links without the need for fixed infrastructure components. This type of network is typically referred to as an "ad-hoc" network. A hybrid communication network can support devices that connect both to fixed infrastructure components and to other D2D-enabled devices. While UEs such as smartphones can be envisioned for D2D networks, vehicular communication can also be supported by a communication protocol where vehicles exchange control or data information with other vehicles, or with infrastructure, or with other UEs. Such a network is referred to as a V2X network. Multiple types of communication links can be supported by nodes in a V2X network. The communication links can utilize same or different protocols and systems.

Direct communication between vehicles in V2V is based on a sidelink (SL) interface. Sidelink is the UE to UE interface for SL communication and SL discovery. The SL corresponds to the PC5 interface. SL communication is defined as a functionality enabling proximity services (ProSe) Direct Communication between two or more nearby UEs without traversing any network node.

UEs that are in proximity of each other can exchange V2V-related information when permission, authorization, and proximity criteria are fulfilled. The proximity criteria can be configured by the mobile network operator (MNO). UEs supporting V2V Service can also exchange such information when served by or not served by an MNO that supports V2X service. The UE supporting V2V applications transmits application layer information, such as about a location, dynamics, and attributes, as part of the V2V service. The V2V payload can be flexible in order to accommodate different information contents, and the information can be transmitted periodically according to a configuration provided by the MNO. V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X service, such as RSU, application server, and so on.

Figure 5:
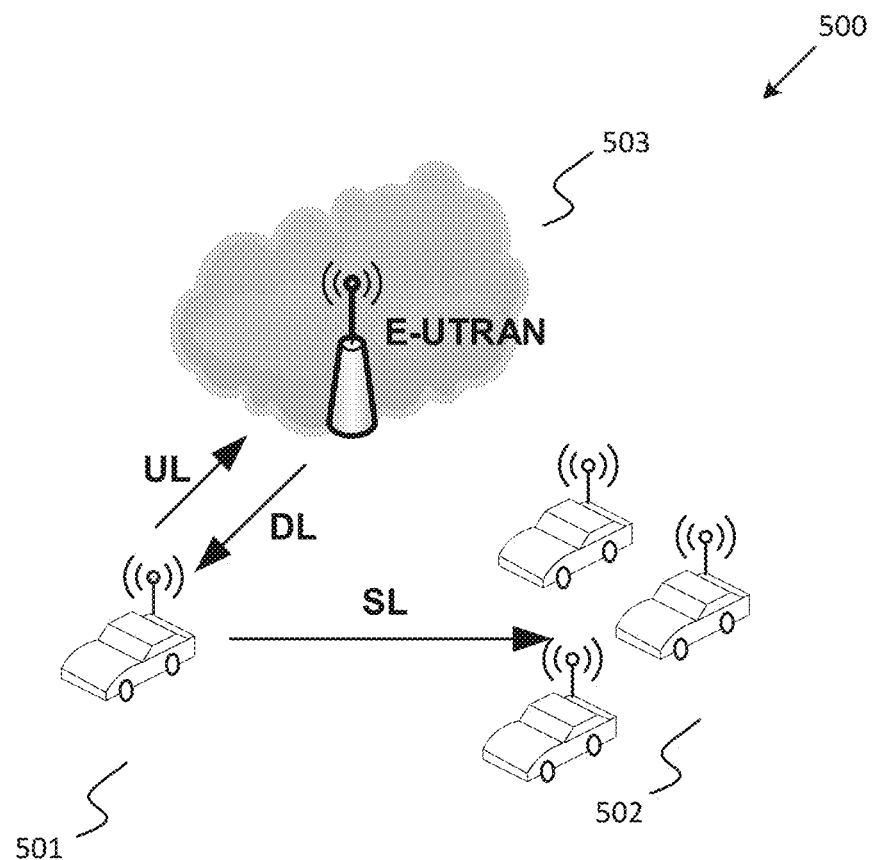
FIG. 5 illustrates an example sidelink (SL) interface according to various embodiments of the present disclosure.

FIG. 5 illustrates an example SL interface 500 according to illustrative embodiments of the present disclosure. For example, the SL interface 500 may be implemented among UEs in a wireless network, for example, as illustrated in FIG. 1. The embodiment of the SL interface 500 shown in FIG. 5 is for illustration only. Other embodiments of the SL interface 500 can be used without departing from the scope of the present disclosure.

In this illustrative embodiment, UL designates the link from UE 501 to gNB 503, DL designates the link from gNB 503 to UE 501, and SL designates the radio links over the PC5 interfaces between UE 501 and UEs 502. UE 501 transmits a V2V message to one or multiple UEs 502 in the SL. The PC5 interface re-uses existing frequency allocation, regardless of the duplex mode (frequency division duplex (FDD) or time division duplex (TDD). To minimize a hardware complexity on a UE and especially on the power amplifier of the UE, transmission on V2V links can occur in the UL band in case of FDD. Similar, the PC5 interface can use time resources (symbols of slots) that are reserved for UL transmission in TDD. The signal transmission can be based on single carrier frequency division multiple access (SC-FDMA) or on orthogonal frequency division multiple access (OFDMA).

A sidelink can include transmissions of signals and channels as for a downlink or for an uplink. For example, similar to a downlink, a sidelink includes transmission of a physical sidelink control channel (PSCCH) providing a sidelink control information (SCI) format scheduling a reception of a physical sidelink shared channel (PSSCH) providing TB(s) for data information and also includes transmission of corresponding DM-RS or of CSI-RS. For example, similar to uplink, a sidelink includes a physical sidelink feedback channel (PSFCH) providing HARQ-ACK information in response to a decoding outcome of a TB in a PSSCH reception.

For a PSSCH transmission from a first UE to a second UE, the second UE can report in a PSFCH HARQ-ACK information for a decoding outcome of TB provided by the PSSCH reception. The HARQ-ACK information has an ACK value when the second UE correctly decodes the TB and a NACK value when the second UE does not correctly decode the TB. The first UE can report the HARQ-ACK information from the second UE to a serving gNB through the uplink.

In several scenarios, such as for example when a HARQ-ACK information reception reliability cannot be ensured or when HARQ-ACK information may not be useful as there may not be retransmissions of a TB, it can be beneficial to dynamically disable reporting of HARQ-ACK information by a UE in response to a TB decoding in a PSSCH reception.

A first UE can transmit a PSSCH providing a TB to a second UE. The TB can include one or more code block groups (CBGs) where each code block (CB) includes a CRC. The second UE can report whether or not each CBG included in the TB is correctly decoded. A CBG is correctly decoded when all CBs included in the CBG are correctly decoded; otherwise, the CBG is incorrectly decoded. For a retransmission of the TB in a PSSCH, the first UE can include only CBGs with NACK value for HARQ-ACK information corresponding to a previous transmission of the TB.

Figure 6:
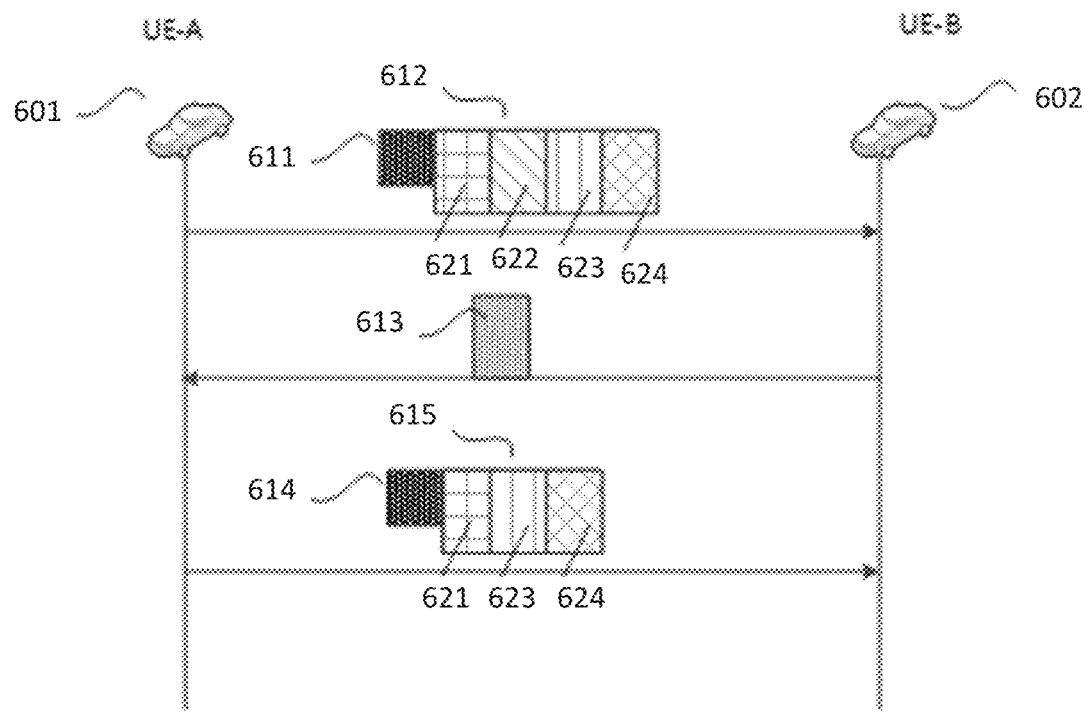
FIG. 6 illustrates a first example of codebook group (CBG)-based HARQ-ACK information reporting on sidelink according to various embodiments of the present disclosure

FIG. 6 illustrates a first example of CBG-based HARQ-ACK information reporting on sidelink according to various embodiments of the present disclosure. For example, the CBG-based HARQ-ACK information reporting may be among the UEs in a sidelink as illustrated, for example, in FIG. 5. The embodiment of the CBG-based HARQ-ACK information reporting shown in FIG. 6 is for illustration only. Other embodiments can be used without departing from the scope of the present disclosure.

UE-A transmits a PSSCH to UE-B. A PSSCH transmission provides a TB and, with CBG-based HARQ-ACK information reporting from UE-B, PSSCH retransmissions for a TB provide CBGs (the CBGs that were indicated by the HARQ-ACK information to have been incorrectly decoded by UE-B). UE-A 601 can transmit a PSCCH with a SCI format 611 to schedule a PSSCH reception by UE-B 602. A TB in the PSSCH reception 612 includes four CBGs: 621, 622, 623 and 624. After detecting the SCI format 611, UE-B 602 can decode CBs in a corresponding PSSCH reception 612 according to a configuration provided by the SCI format 611. UE-B 602 decodes CBs of each CBG in the TB included in the PSSCH reception 612 and checks a corresponding CBG 621, 622, 623 and 624. UE-B reports HARQ-ACK information of a decoding outcome for each CBG 621, 622, 623 and 624 in one or more PSFCHs 613. In 613, the UE-B can report which ones of CBGs 621, 622, 623 and 624 are decoded correctly. UE-A 601 can re-transmit CBGs that UE-A detects a corresponding HARQ-ACK information to have a NACK value. UE-A can indicate in a SCI format 614 scheduling a retransmission of TB in a PSSCH 615 that three of the four CBGs 621, 623 and 624 are re-transmitted (the fourth CGB 622 is not retransmitted).

SL transmission and reception by a UE occur within resources assigned to one or more UEs in a group of UEs. A resource pool (RP) is a set of resources assigned for sidelink operation and consists of slots in the time domain and resource blocks in the frequency domain.

Figure 7:
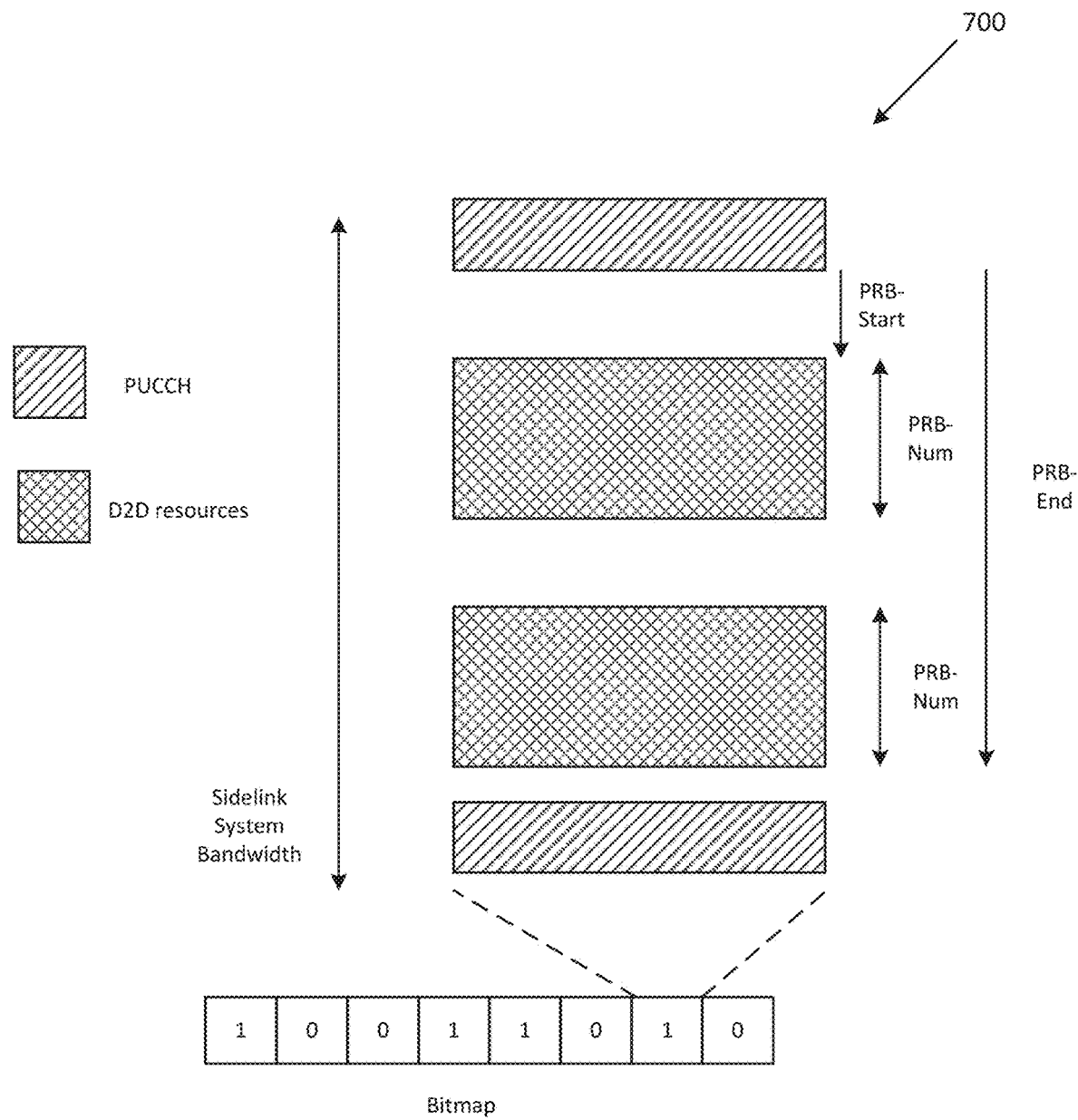
FIG. 7 illustrates an example resource pool according to various embodiments of the present disclosure.

FIG. 7 illustrates an example resource pool 700 according to various embodiments of the present disclosure. For example, the resource pool 700 may be shared among the UEs in a sidelink as illustrated, for example, in FIG. 5. The embodiment of the resource pool shown in FIG. 7 is for illustration only. Other embodiments can be used without departing from the scope of the present disclosure.

A resource pool 700 is defined as follows:
(a) in the frequency domain, by parameters
PRBnum: defining a frequency range/bandwidth in a number of physical RBs (PRB)
PRBstart, PRBend: defining a location in frequency for the number of PRBs
(b) in the time domain, by a bitmap that indicates slots available for SL transmissions A pool of time-frequency resources is repeated with a period defined by a parameter SC-Period, for example in a number of slots or in a number of milliseconds with range of possible values between 40 msec and 320 msec where, for example, the smaller values can be used for voice traffic.

UEs can scan a resource pool to receive PSCCH and detect a SCI format that includes a group identifier for the UEs. A UE transmits a PSCCH with a SCI format within the resource pool.

Resource pools can be of two types: reception resource pools (Rx RPs) and transmission resource pools (Tx RPs). Within a cell, there may be more Rx RPs than Tx RPs to enable reception from adjacent cells or from out-of-coverage UEs.

Two modes of resource allocation exist for V2X communications: Mode 1 that is also referred to as "scheduled resource allocation" and Mode 2 that is also referred as "UE autonomous resource selection". In Mode 1, transmissions on sidelink are scheduled by a gNB. The UE detects a DCI format from the gNB that indicates resources for PSCCH/PSSCH transmission and then the UE transmits a PSCCH with a SCI format scheduling a PSSCH transmission over resources indicated by the DCI format.

Figure 8:
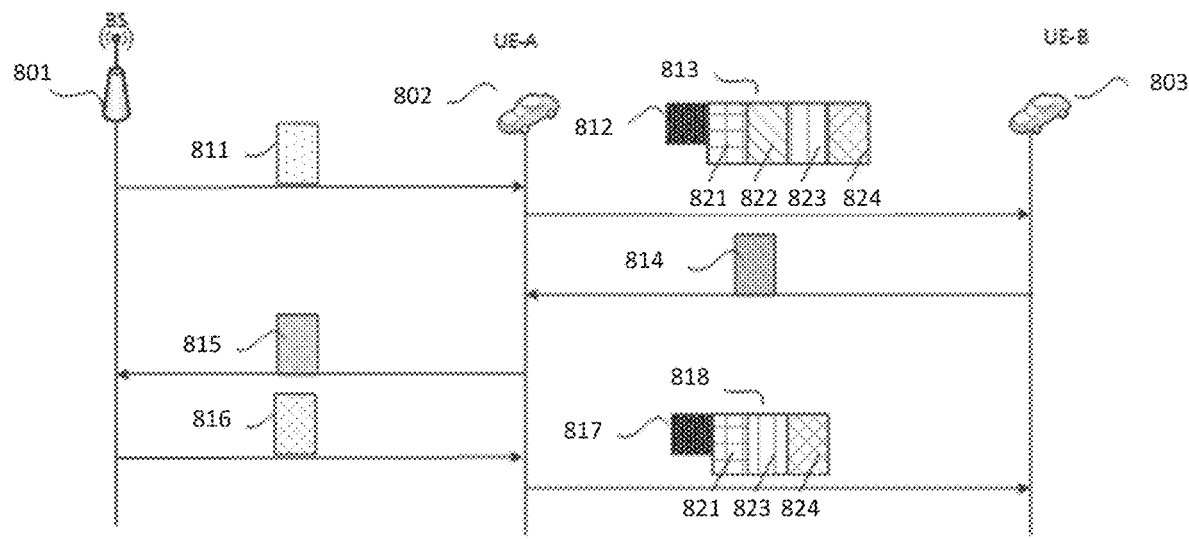
FIG. 8 illustrates a second example of CBG-based HARQ-ACK information reporting on sidelink according to various embodiments of the present disclosure.

FIG. 8 illustrates a second example of CBG-based HARQ-ACK information reporting on sidelink according to various embodiments of the present disclosure. For example, the CBG-based HARQ-ACK information reporting may be among the UEs in a sidelink as illustrated, for example, in FIG. 5. The embodiment of the CBG-based HARQ-ACK information reporting on sidelink shown in FIG. 8 is for illustration only. Other embodiments can be used without departing from the scope of the present disclosure.

UE-A 802 transmits a PSSCH to UE-B 803 through sidelink. A sidelink resource used for the PSSCH transmission is allocated to UE-A by a serving gNB, or BS, 801. The BS 801 can transmit a PDCCH to UE-A 802 to allocate, through a corresponding DCI format, to UE-A 802 the sidelink resource for PSCCH and PSSCH transmissions. UE-A transmits a PSCCH and a PSSCH in the allocated sidelink resource. A TB included in a PSSCH reception 813 by UE-B comprises of four CBGs 821, 822, 823 and 824. UE-B 803 detects a SCI format 812 in a PSSCH reception and then decodes the TB in a PSSCH reception 813 according to configuration information provided by the SCI format 812. UE-B decodes each CB for CBGs 821, 822, 823 and 824 and then checks a corresponding CRC. UE-B 803 reports HARQ-ACK information for each of the four CBGs in the PSSCH reception 813 through one or more PSFCHs 814. UE-A can report the detected HARQ-ACK information for the four CBGs 821, 822, 823 and 824 to the serving gNB 801 in a PUCCH or PUSCH transmission 815. The following alternatives can apply for the HARQ-ACK information reports by UE-A in 815:

UE-A can report a number of incorrectly decoded CBGs among the four CBGs 821, 822, 823 and 824.

UE-A can report the incorrectly decoded CBGs among the four CBGs 821, 822, 823 and 824.

UE-A can report the correctly decoded CBGs among the four CBGs 821, 822, 823 and 824.

UE-A can report HARQ-ACK information for each of the four CBGs 821, 822, 823 and 824.

After a reception of a HARQ-ACK information report from UE-A 802, the gNB 801 can transmit a PDCCH 816 to UE-A to allocate, through a DCI format in the PDCCH, a sidelink resource for UE-A 802 to retransmit in a PSSCH incorrectly decoded CBGs by UE-B. UE-A 802 can transmit a PSCCH with a SCI format 817 scheduling a PSSCH reception 818 to UE-B that includes the incorrectly decoded CBGs 821, 823 and 824 using the sidelink resource allocated by the gNB 801. In the SCI format 817, UE-A can indicate the CBGs, from the four CB Gs 821, 822, 823 and 824, that are included in the PSSCH reception 818.

A UE can transmit a PSCCH providing a SCI format that schedules one or more PSSCH receptions to one or more other UEs. The SCI format can include one or more of the following information elements (fields):

- A destination ID to identify a UE or a group of UEs for a corresponding PSSCH reception;
- A HARQ process number;
- A source ID to identify a UE transmitting the PSCCH/PSSCH;
- A new data indicator (NDI) to indicate whether the PSSCH includes a first transmission or a retransmission of a TB;
- A redundancy version (RV); CBG transmission indicator to indicate initial transmission or retransmission of a CBG in the PSSCH;
- A SL_HARQ_Conf field to indicate whether reporting of HARQ-ACK information for the TB/CBGs of the scheduled PSSCH reception is enabled or disabled;
- A resource allocation field for a PSFCH transmission with HARQ-ACK information from a UE receiving the PSSCH.

The LTE-V and NR standards include two radio interfaces. The cellular interface, Uu, supports vehicle-to-infrastructure communications. The PC5 interface supports V2V communications based on direct LTE sidelink. LTE sidelink, or device-to-device communication, was introduced for public safety and includes two modes of operation, mode 1 and mode 2. Both modes were designed to prolong the battery lifetime of mobile devices at the cost of increasing the latency. Connected vehicles require highly reliable and low-latent V2X communications. Therefore, modes 1 and 2 may not be suitable for vehicular applications.

Two new communication modes, modes 3 and 4, are specifically designed for V2V communications. In mode 3 (referred to as mode 1 in NR), the cellular network selects and manages the radio resources used by vehicles for their direct V2V communications. In mode 4 (referred to as mode 2 in NR), vehicles autonomously select the radio resources for their direct V2V communications. Mode 4 can operate without cellular coverage and is therefore considered the baseline V2V mode because safety applications cannot effectively depend on the availability of cellular coverage. Mode 4 includes a distributed scheduling scheme for vehicles to select their radio resources and includes the support for distributed congestion control.

LTE V2X defines subchannels as a group of RBs in the same subframe. The number of RBs per subchannel can vary. Subchannels are used to transmit data and control information. The data is transmitted in transport blocks (TB s) over physical sidelink shared channels (PSSCH) and the sidelink control information (SCI) messages are transmitted over physical sidelink control channels (PSCCH). A UE, such as the UE 116, that transmits a TB also transmits its associated SCI format that is also referred to as a scheduling assignment. The SCI format includes information such as the modulation and coding scheme (MCS) used to transmit the TB, the frequency resource allocation, and the resource reservation interval for semipersistent scheduling (SPS). A TB and its associated SCI format are always be transmitted in a same subframe. LTE V2X defines two sub-channelization schemes.

The first scheme is an adjacent PSCCH+ PSSCH. The SCI format and TB are transmitted in a respective PSCCH and PSSCH in adjacent RBs. For each PSCCH and PSSCH transmission, the PSCCH occupies the first two RBs of the first subchannel utilized for the transmission. The PSSCH is transmitted in the RBs following the PSCCH and can occupy several subchannels, for example, depending on a size of a TB provided by the PSSCH. If the PSSCH occupies several subchannels, the PSSCH also occupies the first two RBs of the following subchannels.

The second scheme is a non-adjacent PSCCH+ PSSCH. The RBs are divided into pools. One pool is dedicated to transmitting only PSCCHs and the PSCCHs occupy two RBs. The second pool is reserved to transmit only PSSCHs and is divided into subchannels.

NR V2X Release 16 introduced two communication modes, Mode 1 and Mode 2. In Mode 1, a gNB schedules SL resources to be used by a UE for SL transmissions. In Mode 2, a UE determines SL transmission resource(s) within SL resources configured by a gNB/network or pre-configured SL resources. The UE autonomously selects the SL resource or resources for transmission and schedules SL transmissions of other UEs. The UE further assists SL resource selection for other UEs which can be included in other UE functions.

The Medium Access Control (MAC) entity can be configured by RRC with a discontinuous reception (DRX) functionality that controls the PDCCH monitoring of the UE. When in RRC_CONNECTED, if DRX is configured, the MAC entity can instruct the physical layer of the UE to monitor PDCCH discontinuously using the DRX operation; otherwise the MAC entity instructs the physical layer of the UE to monitor the PDCCH continuously.

For power control, a receiver UE reports SL-RSRP to the transmitter UE and, for sidelink open loop power control for unicast PSCCH/PSSCH transmissions, the transmitter UE can derive a pathloss based on a respective reported SL-RSRP.

When HARQ-ACK information reporting is enabled for groupcast, a receiver UE transmits only HARQ-ACK information with NACK value (option 1) or HARQ-ACK information with either ACK value or NACK value (option 2). In HARQ-ACK information reporting for groupcast, all receiver UEs can share a physical sidelink feedback channel (PSFCH) for Option 1, while each receiver UE can use a separate PSFCH for Option 2. Each PSFCH can be mapped to a time, frequency, and code resource.

Sidelink CSI-RS for CQI/RI measurement can be supported. The sidelink CSI-RS can be confined within resources of the PSSCH transmission. Support can be provided at least for the use of TX-RX geographical distance in determining whether to report HARQ-ACK information for groupcast.

In a resource pool and within the slots associated with the resource pool, PSFCH resources can be (pre)configured periodically with a period of N slot(s), N is configurable with values of 1 and at least one more value greater than 1. In addition, the configuration can include the possibility of no resource for PSFCH such as for example configuring N with value 0. When the configuration includes the possibility of no resource for PSFCH, HARQ-ACK information reporting for all transmissions in the resource pool can be disabled. In addition, a PSFCH with HARQ-ACK information for a PSSCH reception in a resource pool can be restricted to only be transmitted in the same resource pool.

At least TDM between PSCCH/PSSCH and PSFCH can be supported and there may be no simultaneous transmission of PSCCH/PSSCH and PSFCH.

SL open-loop power control can be supported. For unicast, groupcast, broadcast, open-loop power control can be based on the pathloss between a transmitter UE and the gNB (DL pathloss), if the transmitter UE is in-coverage, at least to mitigate interference to UL receptions at the gNB. The gNB can enable and disable open-loop power control based on DL pathloss. At least for unicast, open-loop power control can also based on the pathloss between a transmitter UE and a receiver UE (SL pathloss). Configuration or pre-configuration can enable or disable open-loop power control based on the SL pathloss.

For sidelink transmit power control, a total sidelink transmit power can be same in symbols used for PSCCH/PSSCH transmissions in a slot. A maximum SL transmit power can be configured or preconfigured to a transmitter UE. For SL open-loop power control, a transmitter UE can be configured to use DL pathloss (between transmitter UE and gNB) only, SL pathloss (between transmitter UE and receiver UE) only, or both DL pathloss and SL pathloss. When the SL open-loop power control is configured to use both DL pathloss and SL pathloss, a minimum of the power values given by open-loop power control based on DL pathloss and the open-loop power control based on SL pathloss can be used.

Various embodiments of the present disclosure provide a method and apparatus for NR V2X sidelink communication aspects. More specifically, various embodiments of the present disclosure provide sidelink HARQ-ACK information reporting for groupcast, position information, signaling position information, position information and data multiplexing in a PSSCH, associating PSCCH/PSSCH reception resources with PSFCH transmission resources, TX-RX geographical distance based HARQ-ACK information reporting, and RSRP based HARQ-ACK information reporting.

As described herein, various embodiments of the present disclosure provide a sidelink HARQ-ACK information reporting for groupcast. For example, sidelink HARQ-ACK information reporting for groupcast can be provided when a receiver UE transmits only HARQ-ACK information with NACK value.

For sidelink HARQ-ACK information reporting only with NACK value, one PRB can be sufficient for the corresponding PSFCH transmission. For example, if multiple UEs share a same PSFCH, the in-band emission (IBE) may be high enough to constitute a larger interference to a neighboring frequency resource. If a PSCCH/PSSCH transmission is over multiple PRBs, and even multiple subchannels, the associated number of PSFCHs can be more than one. Then, the receiver UEs can share a pool of PSFCHs and a smaller number of UEs can transmit PSFCH. Accordingly, a resulting IBE can become smaller.

Figure 9:
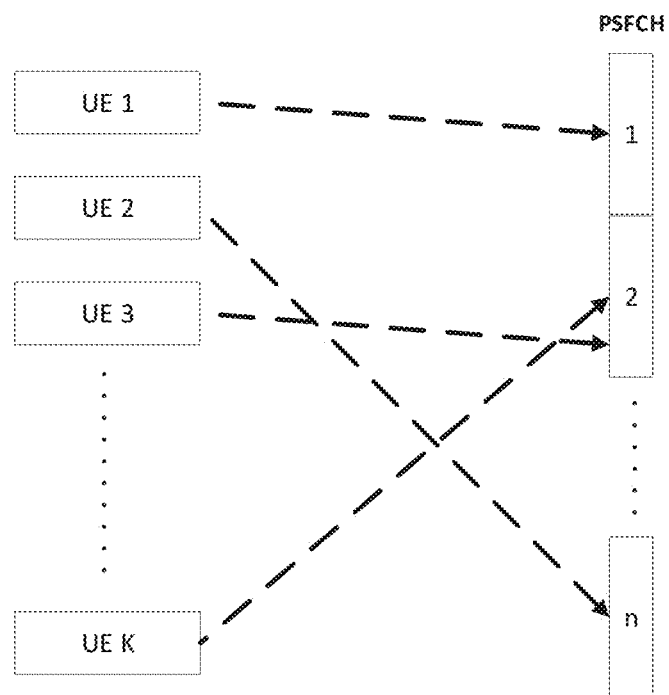
FIG. 9 illustrates random selection by UEs of a PSFCH resource according to various embodiments of the present disclosure.

In some embodiments, each receiver UE 116 randomly selects a PSFCH resource for transmission in the PSFCH pool. FIG. 9 illustrates random selection by UEs of a PSFCH resource according to various embodiments of the present disclosure. The embodiment of random selection shown in FIG. 9 is for illustration only. Other embodiments can be used without departing from the scope of the present disclosure.

As shown in FIG. 9, UE 1 selects PSFCH resource 1, UE 2 selects PSFCH resource n, UE 3 selects PSFCH resource 2, and UE K also selects PSFCH resource 2. Accordingly, each UE 1, 2, 3, and K randomly selects PSFCH resource 1, 2, or n in the PSFCH resource pool for PSFCH transmission with HARQ-ACK information having a NACK value. However, these embodiments should not be construed as limiting and any random selection can be performed without departing from the scope of the present disclosure. As described herein, any of the UEs 1, 2, 3, or K can be any of the UEs 111-118 described herein.

In some embodiments, receiver UEs can select a resource for a PSFCH transmission according to predefined mapping rules. For example, if a UE ID is assigned for each receiver UE by PC5-RRC, each receiver UE can select a PSFCH resource in the PSFCH resource pool according to pre-defined mapping rules. The predefined mapping rules can map each PSFCH resource in the PSFCH resource pool to each receiver UE. The predefined mapping rules can be obtained by a UE ID modulo a number of PSFCH resources. In some embodiments, the predefined mapping rules can be obtained and then stored in the memory 260 of the UE 116.

Figure 10:
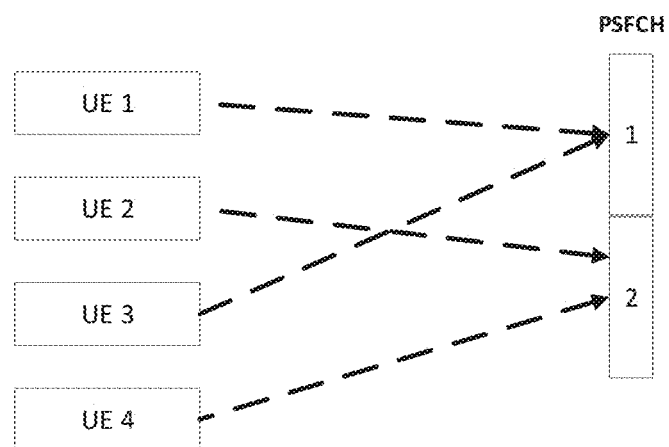
FIG. 10 illustrates selection, by UEs, of PSFCH resources according to predefined rules according to various embodiments of the present disclosure.

FIG. 10 illustrates selection by UEs of PSFCH resources according to predefined rules according to various embodiments of the present disclosure. In particular, FIG. 10 illustrates each UE selecting a PSFCH resource in the PSFCH resource pool for PSFCH transmission with HARQ-ACK information having a NACK value according to a pre-defined rule that maps each UE to a PSFCH resource in the PSFCH resource pool. The embodiment of selection shown in FIG. 10 is for illustration only. Other embodiments can be used without departing from the scope of the present disclosure.

As shown in FIG. 10, UE 1 and UE 3 each select PSFCH resource 1 according to the predefined mapping rule and UE 2 and UE 4 each select PSFCH resource 2 according to the predefined mapping rule.

In some embodiments, sidelink HARQ-ACK information reporting for groupcast can include either an ACK value or a NACK value. In these embodiments, each receiver UE 116 is implicitly assigned a separate PSFCH resource to report HARQ-ACK information. Because of limited PSFCH resources, one or more receiver UEs may not be assigned a separate PSFCH resource. Accordingly, in some scenarios, each receiver UE needs to use a separate PSFCH but there may not be enough PSFCH resources for all receiver UEs.

In one embodiment, there can be a shared resource for PSFCH resource for PSFCH transmission with HARQ-ACK information having ACK value and another shared PSFCH resource for PSFCH transmission with HARQ-ACK information having NACK value where receiver UEs that are not assigned a dedicated PSFCH can use either resource for PSFCH transmission with ACK value or NACK value.

Figure 11:
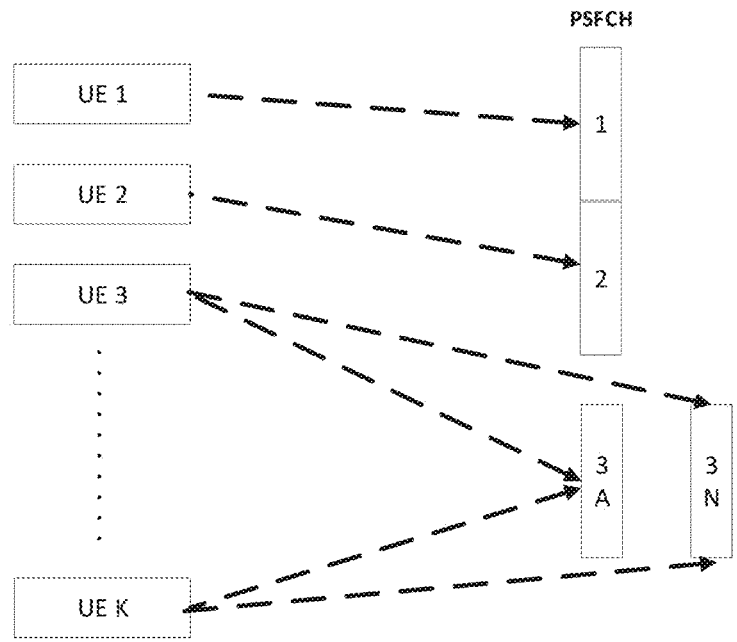
FIG. 11 illustrates assignments of UEs to PSFCH resources according to various embodiments of the present disclosure.

FIG. 11 illustrates assignments of UEs to PSFCH resources according to various embodiments of the present disclosure. The embodiment of assignments shown in FIG. 11 is for illustration only. Other embodiments can be used without departing from the scope of the present disclosure.

As shown in FIG. 11, UE 1 is assigned to PSFCH resource 1 and UE 2 is assigned to PSFCH resource 2. UE 3 and UE K are each assigned to PSFCH resource 3A for when the HARQ-ACK information has ACK value and to PSFCH resource 3N when the HARQ-ACK information has NACK value.

In another embodiment, all the receiver UEs can share one or a pool of PSFCH resources for PSFCH transmission with HARQ-ACK information having ACK value and the other one or another pool of PSFCH resources for PSFCH transmission with HARQ-ACK information having NACK value. In some embodiments, in a pool of PSFCH resources, the receiver UE can randomly select a resource from the pool. In other embodiments, the receiver UE can select a first or second resource for HARQ-ACK information with ACK or NACK value, respectively, according to a mapping rule that maps each UE to a PSFCH resource in the PSFCH pool according to the HARQ-ACK information value. For example, the mapping can be obtained by a UE ID mod (number of PSFCH resources), where the mod operation is Modulus after division. In some embodiments, the mapping rules can be obtained and then stored in the memory 260 of the UE 116.

Figure 12:
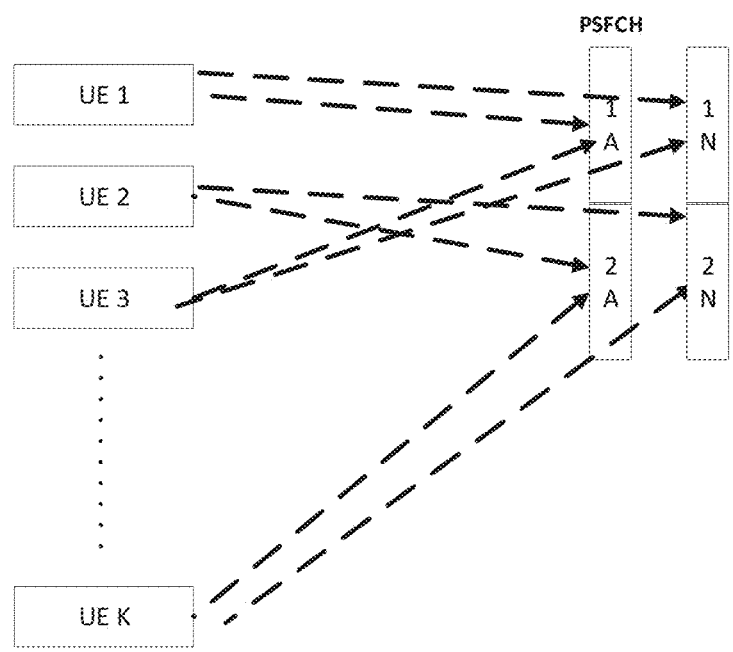
FIG. 12 illustrates random selection by UEs of a resource for a PSFCH transmission according to a HARQ-ACK information value according to various embodiments of the present disclosure.

FIG. 12 illustrates random selection by UEs of a resource for a PSFCH transmission according to a HARQ-ACK information value according to various embodiments of the present disclosure. The embodiment of random selection shown in FIG. 12 is for illustration only. Other embodiments can be used without departing from the scope of the present disclosure.

As shown in FIG. 12, UEs 1 through K randomly select resource for PSFCH transmission with HARQ-ACK information having ACK value and a resource for PSFCH transmission with HARQ-ACK information having NACK value from a pool of resources for PSFCH transmission with ACK value and a pool of resources for PSFCH transmission with NACK value, respectively. In particular, UE 1 and UE 3 each randomly select PSFCH resource 1A (for ACK value) and PSFCH resource 1N (for NACK value) and UE 2 and UE K each randomly select PSFCH resource 2A (for ACK value) and PSFCH resource 2N for NACK value. However, these embodiments should not be construed as limiting and any random selection can be performed without departing from the scope of the present disclosure.

Some embodiments can include operations for sidelink HARQ-ACK information reporting for groupcast PSSCH where a receiver UE can transmit HARQ-ACK information with ACK value or NACK value or only with NACK value. For example, each receiver UE can be implicitly assigned a separate PSFCH resource to report HARQ-ACK information with ACK value or NACK value. Considering limited PSFCH resources, one or more receiver UEs may not be able to be assigned a separate PSFCH resource.

In one embodiment, there can be at least a shared PSFCH resource for HARQ-ACK transmission with only NACK value where receiver UEs that are not assigned a dedicated PSFCH resource can use the shared resource for PSFCH transmission with only NACK value.

Figure 13:
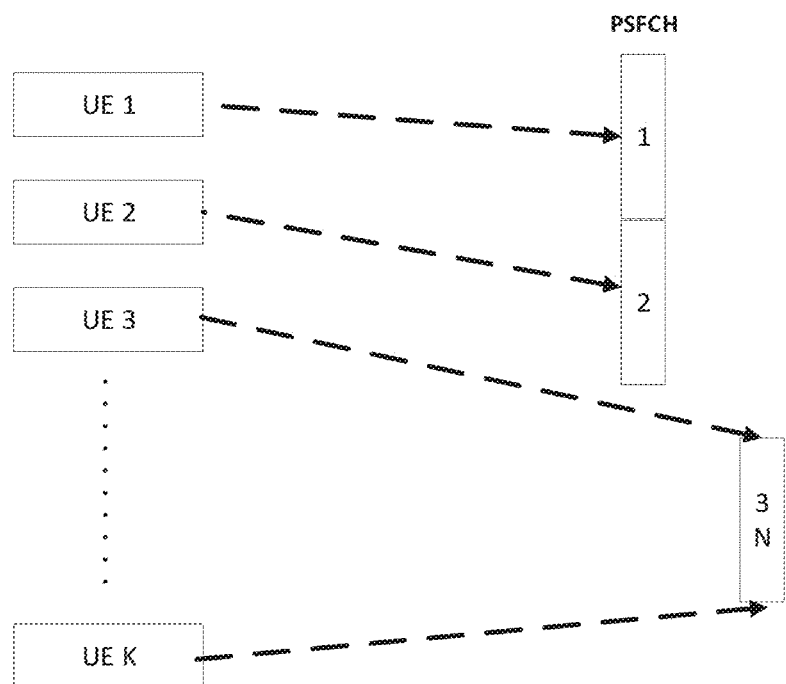
FIG. 13 illustrates assignments of UEs to PSFCH resources according to various embodiments of the present disclosure.

FIG. 13 illustrates assignments of UEs to PSFCH resources according to various embodiments of the present disclosure. The embodiment of the assignments shown in FIG. 13 is for illustration only. Other embodiments can be used without departing from the scope of the present disclosure.

As shown in FIG. 13, UE 1 is assigned to PSFCH resource 1 and UE 2 is assigned to PSFCH resource 2. UE 3 through UE K are assigned to PSFCH resource 3N for PSFCH transmission with only NACK value.

Various embodiments of the present disclosure provide position information of a receiver UE and transmitter UE. For TX-RX geographical distance based HARQ-ACK information reporting, the receiver UE within a certain distance from the transmitter UE transmits PSFCH with HARQ-ACK information to the transmitter UE, whereas the receiver UE beyond the certain distance from the transmitter UE does not transmit PSFCH to the transmitter UE. To support Tx-Rx geographical distance based HARQ-ACK information reporting, the receiver UE needs to know position information for the transmitter UE. The receiver UE can then calculate the distance from the transmitter UE based on the position information received from the transmitter UE. As described herein, both the receiver UE and the transmitter UE can be any of the UEs 111-115. In various embodiments, at least one of the receiver UE and the transmitter UE can be the UE 118 when the various embodiments are implemented in V2X communication.

In some embodiments, the position information can be GPS position information. For example, the position information can be GPS DD (decimal degrees) or DMS (degrees, minutes, seconds) location information with full or reduced precision. For GPS information, 1 degree is equal to 60 minutes, and 1 minutes is equal to 60 seconds. Decimal Degrees=degrees+(minutes/60)+(seconds/3600).

Various embodiments of the present disclosure provide mechanisms for signaling position information of a receiver UE and a transmitter UE. To support Tx-Rx geographical distance based HARQ-ACK information reporting, position information of the transmitter UE is signaled to the receiver UE. Various approaches allow the position information to be signaled from the transmitter UE to the receiver UE.

In some embodiments, the position information can require a few tens of bits. The position information is not signaled frequently because the position of the UE may not change significantly within seconds. Reserving a few tens of bits in a SCI format provided by a PSCCH is material overhead. Therefore, the position information of the transmitter UE can be included in a PSSCH. A field of one bit in the SCI format provided by a PSCCH scheduling a PSSCH can indicate presence or absence of the position information of the transmitter UE. When the bit of the field indicates presence of the position information, the receiver UE extracts the position information from the PSSCH and uses the position information to calculate the distance from the transmitter UE. When the bit of the field indicates absence of the position information, the receiver UE does not extract the position information from the PSSCH reception.

Figure 14:
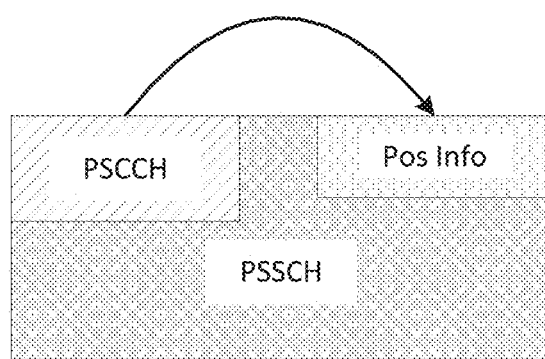
FIG. 14 illustrates a field in a SCI format provided in a PSCCH reception indicating presence or absence of position information in a PSSCH reception scheduled by the SCI format according to various embodiments of the present disclosure.

FIG. 14 illustrates a field in a SCI format provided in a PSCCH reception indicating presence or absence of position information in a PSSCH reception scheduled by the SCI format according to various embodiments of the present disclosure. The embodiment shown in FIG. 14 is for illustration only. Other embodiments can be used without departing from the scope of the present disclosure.

As shown in FIG. 14, the SCI format in a PSCCH reception indicates presence or absence of the position information in a PSSCH reception scheduled by the SCI format.

In other embodiments, each PSSCH reception can include position information. For example, presence or absence of position information in a PSSCH reception can be configured by higher layers and stored in the memory 260. As another example, each PSSCH reception can always include position information.

In other embodiments, a SCI format includes a first stage SCI format and a second stage SCI format, and the second stage SCI format provides the position information. Further, presence or absence of the position information in the second stage SCI format can be indicated by the first stage SCI format.

Various embodiments of the present disclosure provide mechanisms for multiplexing position information and data information in a PSSCH. The position information can be encoded separately from the data information and then multiplexed with the data information in a same PSSCH. For the mapping on resource elements of the PSSCH, the encoded data information is rate matched to the encoded position information. The encoded position information bits can be mapped on one or some of the PSSCH resource elements. When a CSI report, CSI-RS, or PTRS exists in a same PSSCH, resource elements for the encoded position information bits do not overlap with the resource elements for the CSI report, or the CSI-RS, or the PTRS. In various embodiments, for encoding position information, when position information bits are between 3 and 11, Reed Muller Code can be used and when position information bits are more than 11 bits, Polar code can be used.

In other embodiments, the position information can be provided by a MAC-CE message in the PSSCH.

In other embodiments, the position information can be provided by an RRC message in the PSSCH.

Various embodiments of the present disclosure provide mechanisms to associate PSCCH/PSSCH resources with PSFCH resources. In particular, various embodiments of the present disclosure support, in a resource pool and within slots associated with the resource pool, PSFCH resources to be (pre)configured periodically with a period of N slot(s). In some embodiments, the entire bandwidth of subchannels can be used for PSFCH resources at slots where PSFCH resources are configured.

If the period of PSFCH transmission is N=1 slot, PSFCH resources are associated with a number of PRBs equal to the PSCCH/PSSCH subchannel size in PRBs. For a PSCCH/PSSCH transmission over more than one subchannel, PSFCH resources corresponding to PRBs over all subchannels allocated for PSCCH/PSSCH.

Figure 15:
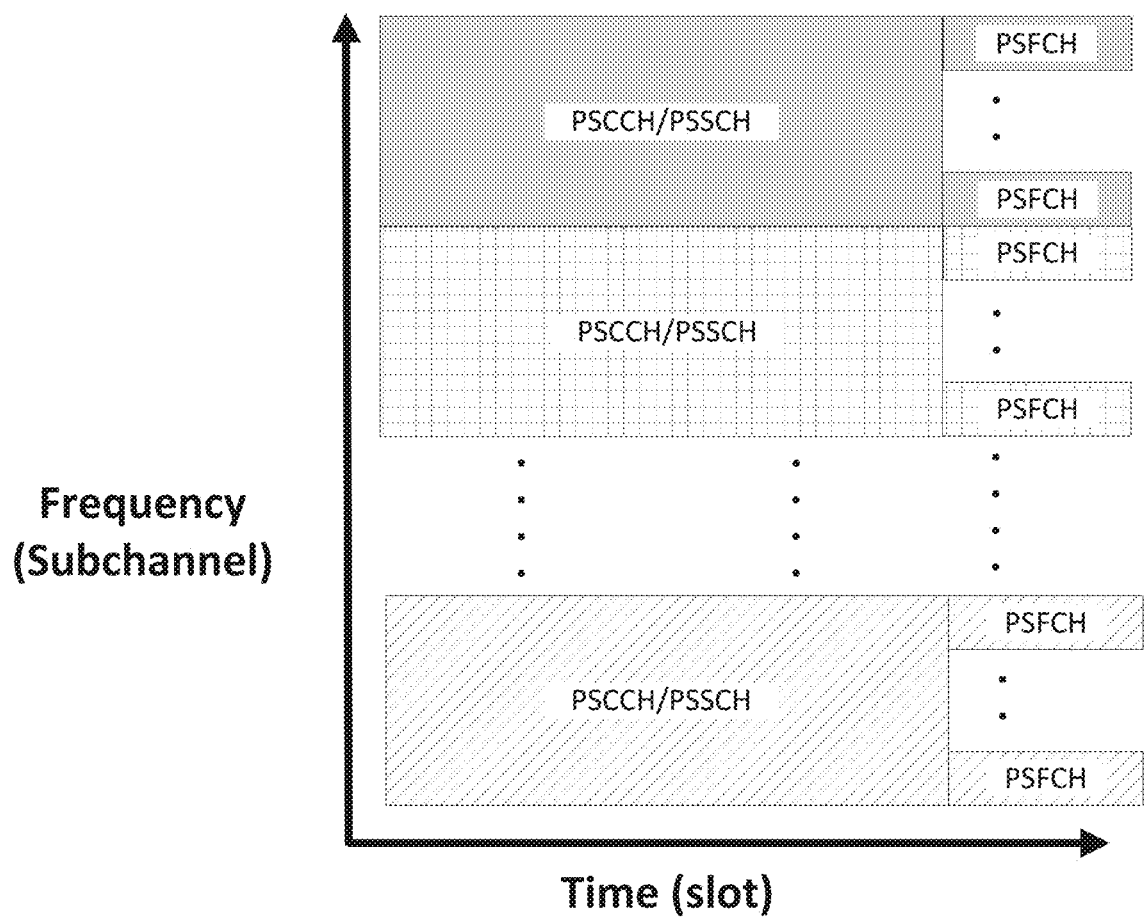
FIG. 15 illustrates a mapping between PSCCH/PSSCH resources and PSFCH resources according to various embodiments of the present disclosure.

FIG. 15 illustrates a mapping between PSCCH/PSSCH resources and PSFCH resources according to various embodiments of the present disclosure. The embodiment shown in FIG. 15 is for illustration only. Other embodiments can be used without departing from the scope of the present disclosure.

As shown in FIG. 15, the PSCCH/PSSCH resource can have associated PSFCH resources in the same frequency resources. The PSFCH resources are illustrated in the same shade as the associated PSCCH/PSSCH resource and each PSCCH/PSSCH subchannel is represented by a separate block.

Figure 16:
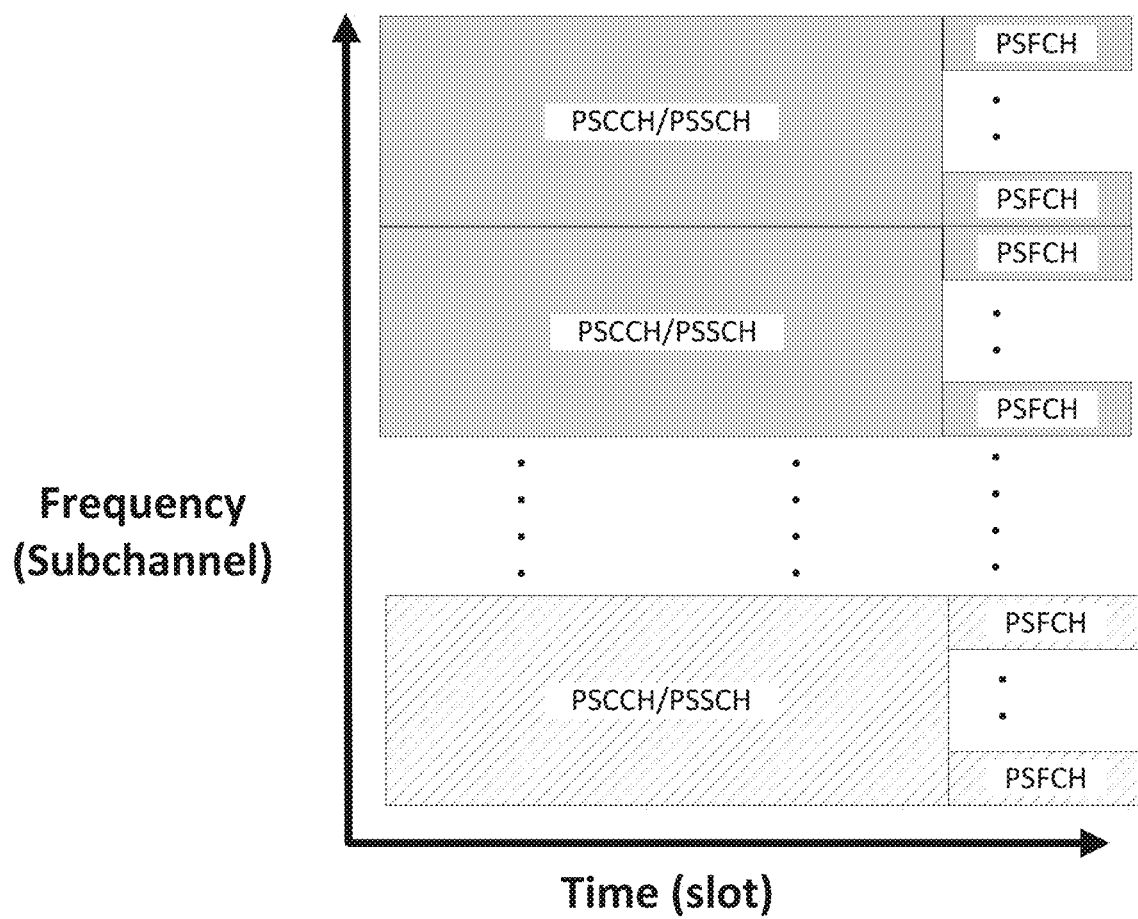
FIG. 16 illustrates a mapping of PSCCH/PSSCH resources to PSFCH resources according to various embodiments of the present disclosure.

FIG. 16 illustrates a mapping of PSCCH/PSSCH resources to PSFCH resources according to various embodiments of the present disclosure. The embodiment shown in FIG. 16 is for illustration only. Other embodiments can be used without departing from the scope of the present disclosure.

As shown in FIG. 16, a PSCCH/PSSCH reception can be over multiple subchannels and associated PSFCH resources are mapped to the same frequency resources as for the multiple subchannels. In other words, the associated PSFCH resources correspond to a same number of PRBs as for the subchannels of the PSCCH/PSSCH reception. In FIG. 16, PSFCH resources are shown in the same shade as the associated resources for a corresponding PSCCH/PSSCH reception, each PSCCH/PSSCH subchannel is represented by a block, and each same PSCCH/PSSCH subchannel is marked in the same shade.

In some embodiments, the associated PSFCH resource may not necessarily be located in a same frequency resource as a subchannel for a corresponding PSCCH/PSSCH reception. For example, a PSFCH resource can be located in a subchannel that has an offset in frequency to a subchannel of the associated PSCCH/PSSCH reception. The offset in frequency can be preconfigured or configured by higher layers.

In some embodiments, a PSFCH resource associated with a PSCCH/PSSCH reception may not be located in a same time slot as the PSCCH/PSSCH reception. For example, the PSFCH resource can be located in a slot that has a slot offset to the slot of the PSCCH/PSSCH reception. The slot offset can be preconfigured or configured by higher layers. The UE transmits a PSFCH in a first slot that is after a slot of a PSCCH/PSSCH reception by a number of slots equal to the slot offset and has an allocation for PSFCH resources.

In some embodiments, when a period of PSFCH resources is N>1 slot, each PSCCH/PSSCH subchannel can be associated with only a part of the number of PRBs of a subchannel of an associated PSCCH/PSSCH reception. All PSCCH/PSSCH subchannels over N slots that are associated with PSFCH resources in a same subchannel share a same PSFCH resource pool in a same subchannel. For a PSCCH/PSSCH reception over more than one subchannel, the number of PSFCH resources that are allocated are the number of associated PRBs in each PSCCH/PSSCH subchannel multiplied by the number of PSCCH/PSSCH subchannels.

Figure 17:
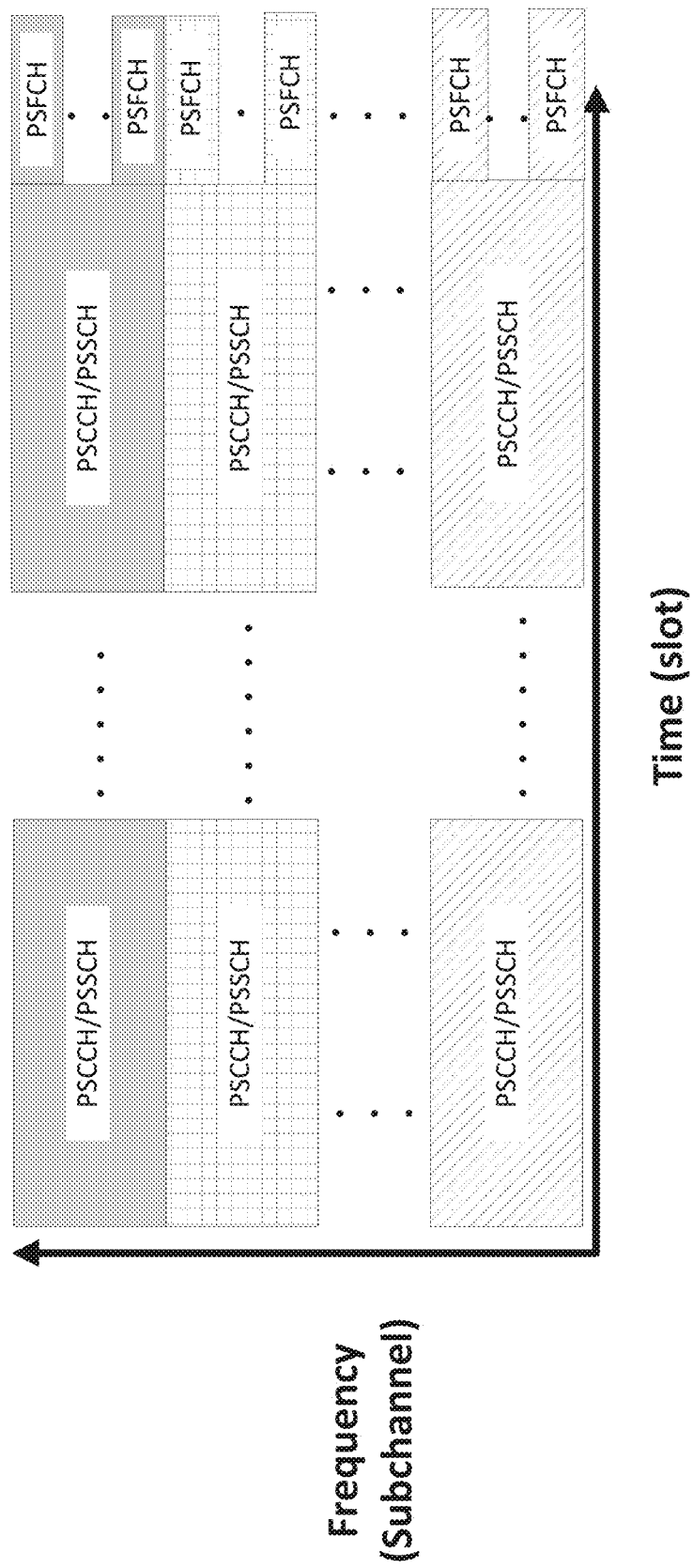
FIG. 17 illustrates a mapping of PSCCH/PSSCH resources with associated PSFCH resources in different slots according to various embodiments of the present disclosure.

FIG. 17 illustrates a mapping of PSCCH/PSSCH resources with associated PSFCH resources in different slots according to various embodiments of the present disclosure. The embodiment shown in FIG. 17 is for illustration only. Other embodiments can be used without departing from the scope of the present disclosure.

As shown in FIG. 17, a PSCCH/PSSCH reception can have associated PSFCH resources in same frequency resources. The PSFCH resources are shown in the same shade as the associated PSCCH/PSSCH resources, each PSCCH/PSSCH subchannel is represented by a block, and PSCCH/PSSCH subchannels in different slots are associated with the pool of PSFCHs in a same subchannel.

In some embodiments, the PSFCH resources may not be located in a same frequency resource as the associated PSCCH/PSSCH resources. For example, the PSFCH resource can be located in a subchannel that has an offset in frequency to the subchannel of the associated PSCCH/PSSCH reception. The offset in frequency can be preconfigured or configured by higher layers.

In some embodiments, the PSFCH resource may not be located in the same time slot as the associated PSCCH/PSSCH reception. For example, the PSFCH resource can be located in a slot that has a slot offset to the slot of the associated PSCCH/PSSCH reception. The slot offset can be preconfigured or configured by higher layers. The UE transmits a PSFCH in a first slot that is after a slot of a PSCCH/PSSCH reception by a number of slots equal to the slot offset and has an allocation for PSFCH resources.

The PSCCH/PSSCH subchannels in N slots that are associated with the PSFCH resources in a same subchannel can share a same PSFCH resource pool in a same subchannel.

In one embodiment, a PSCCH/PSSCH subchannel in slot i is associated with PSFCH resources in the PRBs that have a PRB index in a subchannel N*k+i mod (subchannel size in number of PRBs), where mod operation is Modulus after division and k is integer and where the PRB index is valid in a subchannel.

Figure 18:
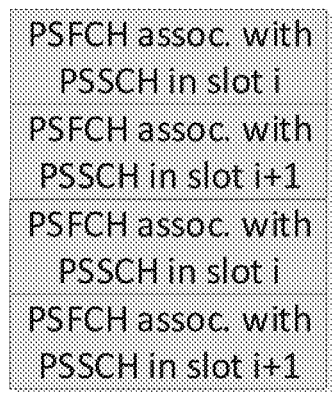
FIG. 18 illustrates a mapping between a PSCCH/PSSCH subchannel in a slot and a PSFCH resource according to various embodiments of the present disclosure.

FIG. 18 illustrates a mapping between a PSCCH/PSSCH subchannel in a slot and a PSFCH resource according to various embodiments of the present disclosure. The embodiment shown in FIG. 18 is for illustration only. Other embodiments can be used without departing from the scope of the present disclosure.

In FIG. 18, PSFCH resources exist with a period of N=2 slots and a number of PRBs in a subchannel is 4. PRB 0 and 2 are associated with a PSSCH reception in slot i and PRB 1 and 3 are associated with a PSSCH reception in slot i+1.

In another embodiment, a PSCCH/PSSCH subchannel in slot i is associated with PSFCH resources in PRBs that have a PRB index in a subchannel: i mod (subchannel size in number of PRBs)*X+k, where the mod operation is Modulus after division and k is from 0 to X−1. X can be a floor for the ratio of subchannel size in number of PRBs divided by N, or a ceiling for the ratio of subchannel size in number of PRBs divided by N.

Figure 19:
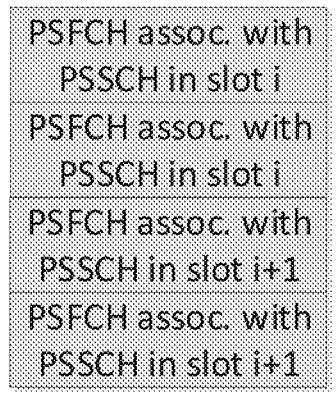
FIG. 19 illustrates a mapping for a PSCCH/PSSCH subchannel in a slot to PSFCH resources according to various embodiments of the present disclosure.

FIG. 19 illustrates a mapping for a PSCCH/PSSCH subchannel in a slot to PSFCH resources according to various embodiments of the present disclosure. The embodiment shown in FIG. 19 is for illustration only. Other embodiments can be used without departing from the scope of the present disclosure.

In FIG. 19, PSFCH resources exist with a period of N=2 slots and a number of PRBs in a subchannel is 4. PRB 0 and 1 are associated with a PSSCH reception in slot i and PRB 2 and 3 are associated with a PSSCH reception in slot i+1.

Other embodiments can utilize similar principles as illustrated in FIGS. 18 and 19. For example, a PSFCH resource is characterized by time, frequency, and code resource. Each PSFCH resource in terms of time, frequency, and code resource is configured to be associated with a PSCCH/PSSCH reception.

Various embodiments of the present disclosure provide TX-RX geographical based HARQ-ACK information reporting and/or RSRP based HARQ-ACK information reporting. For TX-RX geographical distance based HARQ-ACK information reporting, a receiver UE within a distance from a transmitter UE transmits a PSFCH with HARQ-ACK information to the transmitter UE. In contrast, a receiver UE beyond a distance from the transmitted UE does not transmit a PSFCH to the transmitter UE. For RSRP based HARQ-ACK information reporting, a receiver UE having RSRP from a transmitter UE larger than a predetermined RSRP value transmits a PSFCH with HARQ-ACK information to the transmitter UE. In contrast, a receiver UE having RSRP from the transmitter UE smaller than a predetermined RSRP value does not transmit PSFCH to the transmitter UE.

In some embodiments, one HARQ-ACK information reporting method may be not sufficient. For example, only zone ID information may be provided in a SCI format or in a PSSCH from a transmitter UE. The receiver UE derives an estimate of the distance from the transmitter UE based upon the zone ID transmitted from the transmitter UE in the SCI format or in the PSSCH.

FIG. 20 illustrates UEs marked in various geographical zones according to various embodiments of the present disclosure. The embodiment of the UEs shown in FIG. 20 is for illustration only. Other embodiments can be used without departing from the scope of the present disclosure.

In FIG. 20, when the receiver UE is located in Zone 2 marked in shade, the receiver UE receives PSCCH/PSSCH from the transmitter UE located in Zone 1 marked in shade. Based upon the Zone ID information in a SCI format or in a PSSCH received from the transmitter UE, the receiver UE derives a distance from the transmitter UE and determines that the distance is small because Zone 2 and Zone 1 are neighboring zones. Then, the receiver UE determines to transmit a PSFCH with HARQ-ACK information. However, the actual distance value between the transmitter UE and the receiver UE can be large. Accordingly, various embodiments of the present disclosure provide TX-RX geographical based HARQ-ACK information reporting and/or RSRP based HARQ-ACK information reporting.

In some embodiments, a RSRP between the transmitter UE and receiver UE can be used as an additional decision metric for a distance between a receiver UE and a transmitter UE. The receiver UE can determine whether to transmit PSFCH with HARQ-ACK information to the transmitter UE based on the distance information derived from the zone ID but also based on the RSRP. The procedure can be defined as:

If the distance between a transmitter UE and a receiver UE derived from, for example, a Zone ID provided in a SCI format scheduling a PSSCH reception by the receiver UE is below a predetermined distance value
   if the RSRP between the transmitter UE and the receiver UE is larger than a predetermined RSRP value
     the receiver UE transmits PSFCH with HARQ-ACK information to the transmitter
UE
   else
     the receiver UE does not transmit PSFCH to the transmitter UE
   end
end
else
   if the RSRP between the transmitter UE and the receiver UE is larger than a predetermined RSRP value
     the receiver UE transmits a PSFCH with HARQ-ACK information to the transmitter UE
   else
     the receiver UE does not transmit PSFCH to the transmitter UE
   end
end As described herein, various embodiments of the present disclosure provide PSFCH resource association for unicast and groupcast HARQ-ACK information reporting Option 1 with and without reservation signal, indication of a HARQ-ACK information reporting option for Groupcast and Unicast, and multiple HARQ-ACK information reporting for a same UE.

For example, embodiments of the present disclosure provide a PSFCH resource association for unicast and groupcast HARQ-ACK information reporting Option 1 without a reservation signal. These embodiments include indicating a PSFCH frequency resource by a SCI format scheduling an associated PSSCH reception from a set of PSFCH frequency resources. The PSFCH frequency resource can be (pre)configured or predefined. The PSFCH frequency resource can be (pre)configured from a set of PSFCH frequency resources.

Embodiments of the present disclosure further provide PSFCH resource association for unicast and groupcast HARQ-ACK information reporting Option 1 with a reservation signal. The PSFCH frequency resource is indicated by an associated reservation signal from a set of PSFCH frequency resources.

Embodiments of the present disclosure further provide an indication for a HARQ-ACK information reporting option for groupcast and for unicast PSSCH receptions. The HARQ-ACK information reporting option for groupcast can be indicated by a SCI format scheduling an associated PSSCH reception. When the reservation signal is used to reserve resources for transmission, the HARQ-ACK information reporting option can be indicated by an associated reservation signal. For unicast, a SCI format scheduling an associated PSSCH reception can indicate whether the PSCCH/PSSCH is a unicast type or a groupcast type. When the reservation signal is used to reserve resources for transmission, the reservation signal can be used to indicate whether a PSCCH/PSSCH reception is a unicast type or a groupcast type.

Embodiments of the present disclosure further provide mechanisms for multiple PSFCH transmissions with respective multiple HARQ-ACK information to a same UE. The PSFCH frequency resources that can be used for transmission of the multiple PSFCHs can be (pre)configured or predefined. The PSFCH frequency resource for the multiple PSFCH transmissions can be indicated by the SCI format scheduling the associated PSSCH receptions with corresponding HARQ-ACK information provided by PSFCH transmissions in a same PSFCH period. When a reservation signal is used to reserve PSCCH/PSSCH/PSFCH resources, the PSFCH frequency resource used for multiple PSFCH transmissions can be indicated by the reservation signal that indicates the associated PSCCHs/PSSCHs with corresponding HARQ-ACK information provided by PSFCH transmissions in a same PSFCH transmission period.

As described herein, various embodiments of the present disclosure provide a PSFCH resource association HARQ-ACK information reporting Option 1 for unicast and groupcast. There may be multiple PSFCH resources implicitly associated with PSSCH/PSSCH reception of unicast type or groupcast type for HARQ-ACK information reporting Option 1 in a PSFCH period (N>1) of slots, but only one PSFCH resource is used for PSFCH transmission with the HARQ-ACK information. Accordingly, these embodiments of the present disclosure recognize and take into account the need to specify a PSFCH resource for a UE to use for PSFCH transmission with HARQ-ACK information when there are multiple implicitly associated PSFCH resources for a PSSCH/PSSCH reception.

In one embodiment, the PSFCH frequency resource can be indicated by a SCI format scheduling an associated PSSCH reception. The PSFCH frequency resource indicated by the SCI format may be selected from a set of implicitly associated PSFCH frequency resources. When a receiver UE does not receive or detect the SCI format, the receiver UE can still use the implicitly associated PSFCH frequency resources to transmit PSFCH without any resource conflict.

Figure 21:
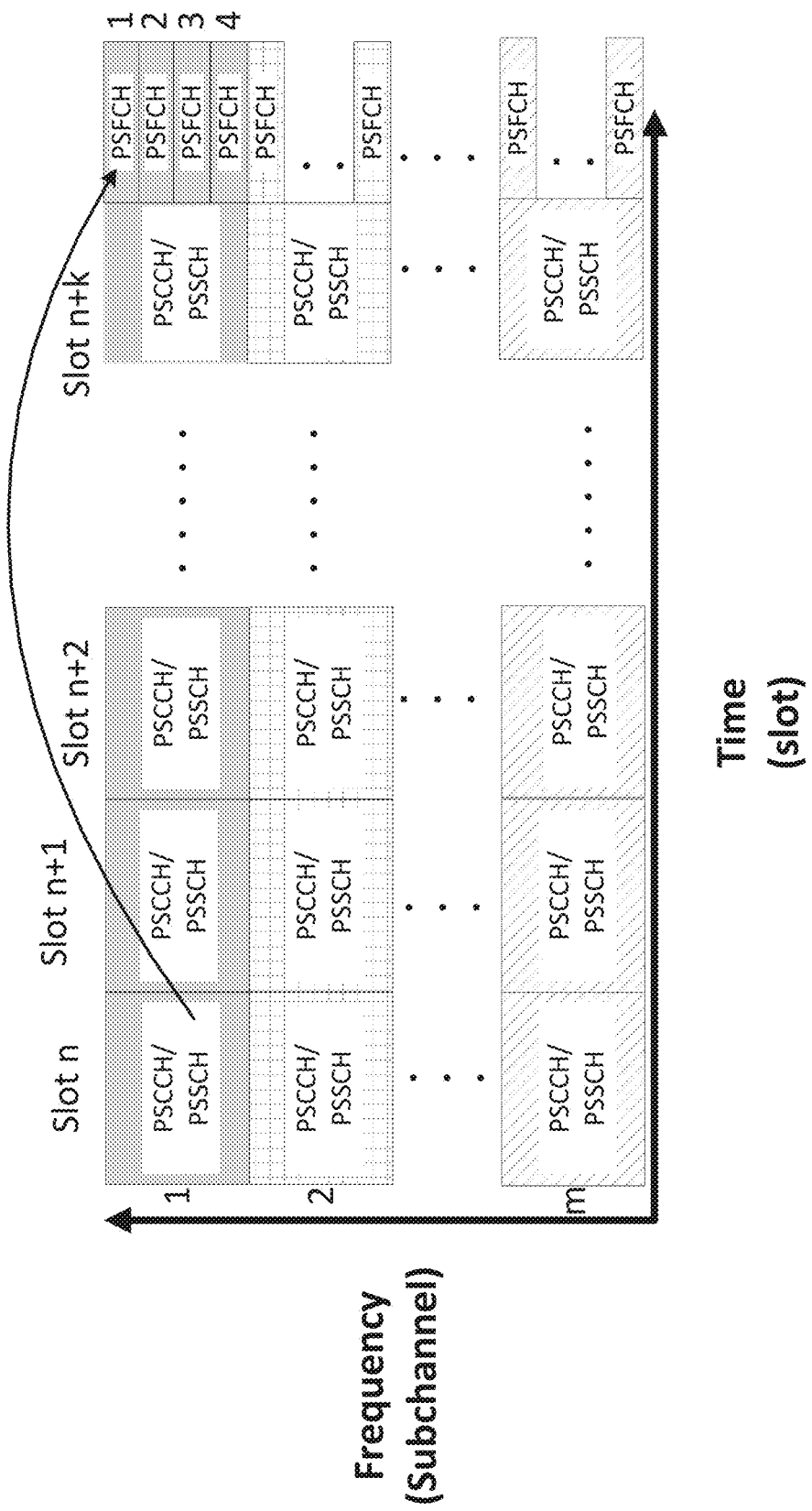
FIG. 21 illustrates an association between a PSCCH/PSSCH reception at a subchannel in a slot and a corresponding PSFCH resource according to various embodiments of the present disclosure.

FIG. 21 illustrates an association between a PSCCH/PSSCH reception at a subchannel in a slot and a corresponding PSFCH resource according to various embodiments of the present disclosure. The embodiment shown in FIG. 21 is for illustration only. Other embodiments can be used without departing from the scope of the present disclosure.

As shown in FIG. 21, PSCCH/PSSCH reception at sub-channel 1 in slot n has implicitly associated PSFCH resources 1 and 2 in slot n+k and a PSCCH/PSSCH reception at sub-channel 1 in slot n+1 has implicitly associated PSFCH resources 3 and 4 in slot n+k. If the PSCCH/PSSCH reception at sub-channel 1 in slot n is unicast type or groupcast type with HARQ-ACK information reporting Option 1, only one resource is need for a PSFCH transmission with HARQ-ACK information in response to the PSCCH/PSSCH reception. If the associated PSFCH resource 1 in slot n+k is indicated by the SCI format provided by the PSCCH reception at sub-channel 1 in slot n, the other PSFCH resources 2, 3, and 4 in slot n+k can be used for PSFCH transmissions to other UEs that transmit PSCCH/PSSCH at sub-channel 1 in slot n+1.

The PSFCH frequency resource that the SCI format indicates among implicitly associated PSFCH resources can be the PRB index or a PRB group index in a subchannel if a UE is configured for PSFCH transmission over one PRB or over multiple PRBs, respectively. For a sub-channel size of 4 PRBs, two PRBs are implicitly associated with a PSCCH/PSSCH reception. Accordingly, one bit in the SCI format can indicate the PRB index within the implicit set. For example, a bit value of 0 indicates the Pt PRB index and a bit value 1 indicates the $2^{nd}$ PRB index in the implicitly associated PSFCH resources. For example, as shown in FIG. 21, PRB index 1 is indicated by the SCI format scheduling an associated PSSCH reception. Therefore, the PSFCH frequency resource in the first PRB in the subchannel of implicitly associated PSFCH resources is used for HARQ-ACK information reporting in a PSFCH transmission. When the PRB group index is used for indication, 0 indicates the $1^{st}$ PRB group ($1^{st\ PRB\ index\ and}$ $2^{nd}$ PRB index in the implicit set of the sub-channel of PSFCH) and 1 indicates the $2^{nd}$ PRB group ($3^{rd}$ PRB index and $4^{th}$ PRB index in the implicit set of the sub-channel of PSFCH). The PSFCH resource that is indicated by the SCI format can be only in the frequency domain, or either in the frequency domain or code domain resource (e.g., cyclic shift of a sequence), or in both frequency and code domains.

In another embodiment, the PSFCH frequency resource can be (pre)configured or predefined. The PSFCH frequency resource can be (pre)configured from a set of implicitly associated PSFCH frequency resources. The PSFCH frequency resource that can be (pre)configured may be selected from a set of implicitly associated PSFCH frequency resources. The SCI format scheduling a PSSCH reception indicates whether the PSSCH reception is of unicast type, of groupcast type with HARQ-ACK information reporting Option 1, or groupcast HARQ-ACK information reporting Option 2. When decoding the associated SCI format, other UEs can know the PSFCH frequency resource to be used from the (pre)configuration.

For example, by (pre)configuration or predefinition, the $1^{st}$ PRB index in the implicitly associated PSFCH resources is used to transmit PSFCH for unicast type and groupcast type with HARQ-ACK information reporting Option 1 in a PSFCH period of N>1 slots. Similar, the PSFCH resource that is (pre)configured can be either in the frequency domain, or in code domain resource (e.g., cyclic shift of a sequence), or in both domains.

As described herein, various embodiments of the present disclosure provide a reservation signal to indicate a PSFCH resource. The reservation signal can be transmitted a few slots prior to a PSCCH/PSSCH transmission to indicate a reserved PSCCH/PSSCH resource for the transmission. Multiple PSFCH resources can be implicitly associated with PSSCH/PSSCH for unicast type and groupcast type HARQ-ACK information reporting Option 1 in a PSFCH period of N>1 slots, but only one PSFCH resource is used for PSFCH transmission with corresponding HARQ-ACK information. A reservation signal can be used to indicate a PSFCH resource for the receiver UE(s) to use for PSFCH transmission among a set of implicitly associated PSFCH frequency resources. When a second UE receives and decodes the reservation signal to obtain the PSFCH resource information, the second UE can use the remaining PSFCH frequency resources in the same PSFCH slot for a PSFCH transmission.

Figure 22:
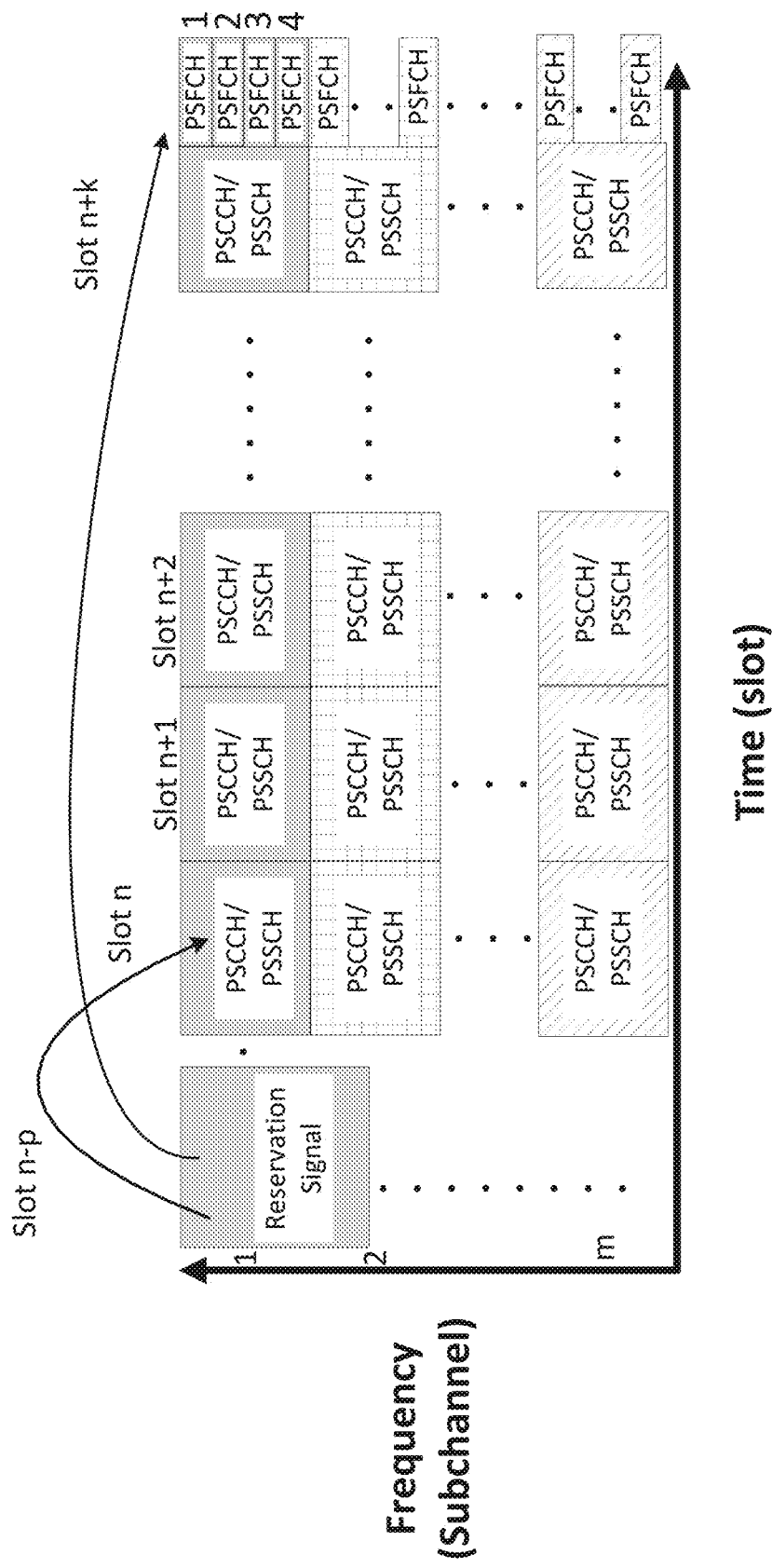
FIG. 22 illustrates an association of PSFCH resources reserved by a reservation signal with a PSCCH/PSSCH reception in a subchannel in a slot according to various embodiments of the present disclosure.

FIG. 22 illustrates an association of PSFCH resources reserved by a reservation signal with a PSCCH/PSSCH reception in a subchannel in a slot according to various embodiments of the present disclosure. The embodiment shown in FIG. 22 is for illustration only. Other embodiments can be used without departing from the scope of the present disclosure.

As shown in FIG. 22, a PSCCH/PSSCH reception at sub-channel 1 in slot n has implicitly associated PSFCH resources 1 and 2 in slot n+k and a PSCCH/PSSCH at sub-channel 1 in slot n+1 has implicitly associated PSFCH resources 3 and 4 in slot n+k. If the PSCCH/PSSCH reception at sub-channel 1 in slot n is unicast type or groupcast type with HARQ-ACK information reporting Option 1, one PSFCH resource is needed by the receiver UE to transmit a PSFCH with corresponding HARQ-ACK information. The PSCCH/PSSCH resource at sub-channel 1 in slot n is reserved by a reservation signal in slot n-p. If the associated PSFCH resource 1 or 3 in slot n+k is indicated by the reservation signal in slot n-p, the PSFCH resources 2, 3, and 4 in slot n+k can be used by other UEs to transmit PSFCH. Compared with embodiments that do not include a reservation signal, other UEs can have more time to determine available PSFCH resources because that information can be obtained by decoding a reservation signal that is received a few slots earlier than the associated PSCCH/PSSCH reception.

In some embodiments, a PSFCH frequency resource that a reservation signal indicates among implicitly associated PSFCH resources can be a PRB index or a PRB group index in a subchannel if a PSFCH transmission can be configured to be over one PRB or over multiple PRBs. For example, as shown in FIG. 22, the PRB index 1 is indicated in the reservation signal, so the PSFCH frequency resource in the first PRB in the subchannel of implicitly associated PSFCH resources is used for PSFCH transmission with HARQ-ACK information.

In embodiments where the PRB group index is used for indication, a bit value of 0 can indicate the $1^{st}$ PRB group ($1^{st}$ PRB index and $2^{nd}$ PRB index in the implicit set of the sub-channel of PSFCH) and a bit value of 1 can indicate the $2^{nd}$ PRB group ($3^{rd}$ PRB index and $4^{th}$ PRB index in the implicit set of the sub-channel of PSFCH). The PSFCH resource that is indicated by a reservation signal can be either in the frequency domain, or in the code domain (e.g., cyclic shift of a sequence), or in both the frequency and code domains.

As described herein, various embodiments of the present disclosure provide an indication for a HARQ-ACK information reporting option for groupcast and unicast. In some embodiments, there can be two HARQ-ACK information reporting options for groupcast, and one option can be indicated by a SCI format scheduling an associated PSSCH reception. A motivation for the HARQ-ACK information reporting option for groupcast to be indicated by a SCI format scheduling an associated PSSCH reception is that when s number of receiver UEs is more than s maximum number of PSFCH resources in an associated PSFCH slot, s transmitter UE can notify the receiver UEs to use HARQ-ACK information reporting Option 1. Otherwise, HARQ-ACK information reporting Option 2 can be indicated by the transmitter UE to be used by the receiver UEs. When a reservation signal is used to reserve resources for transmission, the HARQ-ACK information reporting option can be indicated by the associated reservation signal.

For unicast, a SCI format in a PSCCH reception that schedules a PSSCH reception can indicate whether or not the PSCCH/PSSCH reception is of unicast type. When a reservation signal is used to reserve resources for PSCCH/PSSCH transmission, the reservation signal can be used to indicate whether or not the PSCCH/PSSCH reception is of unicast type.

As described herein, various embodiments of the present disclosure provide mechanisms for a receiver UE to report multiple HARQ-ACK information bits to a transmitter UE. When multiple HARQ-ACK information bits are reported to a transmitter UE, there may be multiple implicitly associated PSFCH resources, for example in different sub-channels, in a same PSFCH period of N>1 slots. If only one PSFCH resource can be used for reporting of multiple HARQ-ACK information bits in each slot, the one PSFCH resource should be specified.

Figure 23:
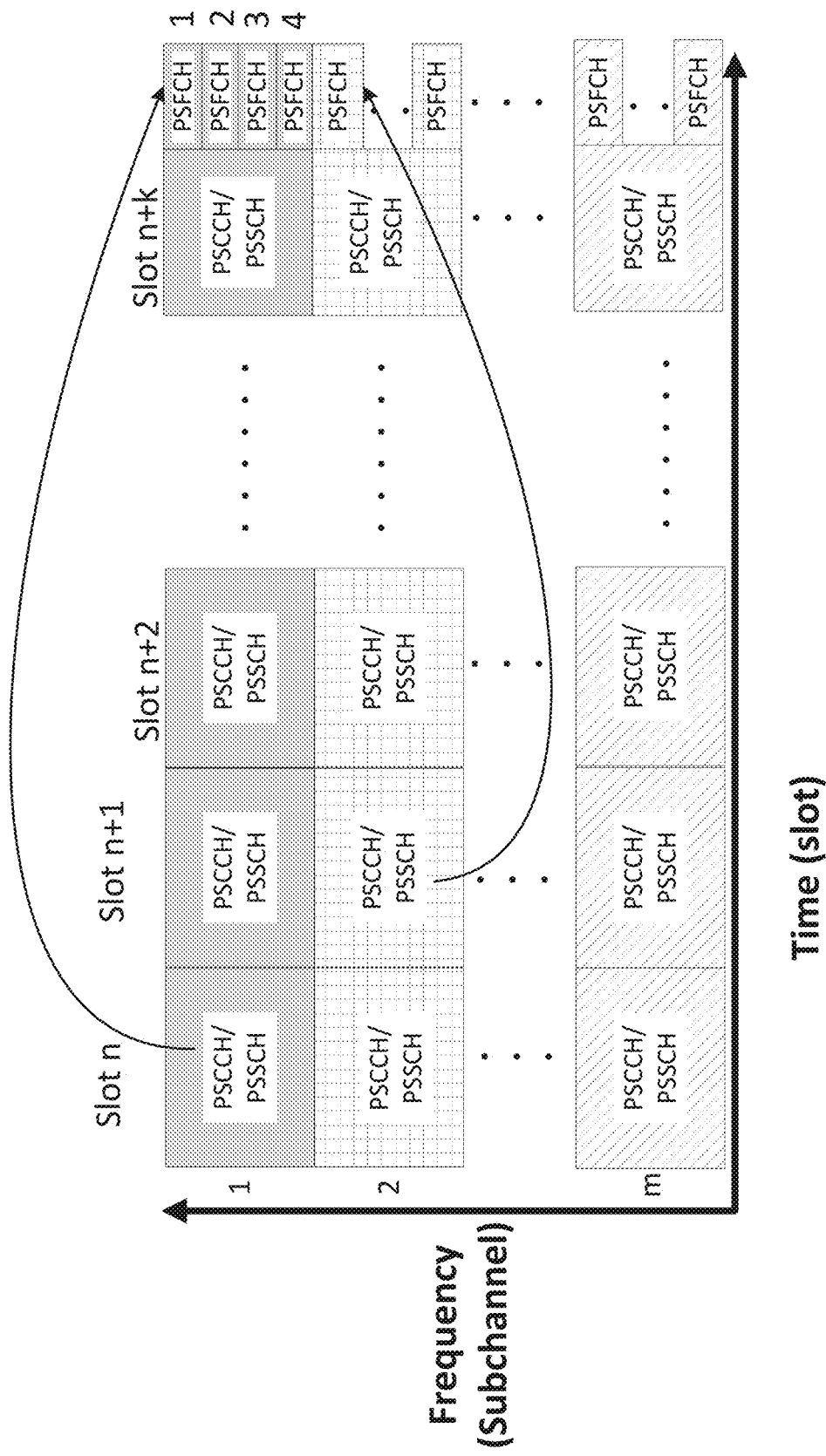
FIG. 23 illustrates a determination for a PSFCH recourse in response to multiple PSCCH/PSSCH receptions according to various embodiments of the present disclosure.

FIG. 23 illustrates a determination for a PSFCH recourse in response to multiple PSCCH/PSSCH receptions according to various embodiments of the present disclosure. The embodiment shown in FIG. 23 is for illustration only. Other embodiments can be used without departing from the scope of the present disclosure.

A PSCCH/PSSCH reception at sub-channel 1 in slot n has implicitly associated PSFCH resources in sub-channel 1. A PSCCH/PSSCH reception at sub-channel 2 in slot n+1 has implicitly associated PSFCH resources in sub-channel 2. The PSCCH/PSSCH receptions in both slots are transmitted from a same transmitter UE, are received by a same receiver UE, and the associated PSFCH resources for both receptions are in a same slot. When the receiver UE provides multiple HARQ-ACK information bits to the transmitter UE, the PSFCH resource that is indicated by an associated reservation signal can be either in the frequency domain, or in the code domain resource (e.g., cyclic shift of a sequence), or in both frequency and code domains.

In some embodiments, a PSFCH frequency resource that can be used for a PSFCH transmission with multiple HARQ-ACK information bits can be (pre)configured or predefined. For example, the PSFCH frequency resource for transmission can be associated with a last PSCCH/PSSCH reception, or a first received PSCCH/PSSCH reception. For example, as shown in FIG. 23, by (pre)configuration or predefinition, the PSFCH frequency resource for PSFCH transmission is respectively associated with the PSCCH/PSSCH reception at sub-channel 1 in slot n, or the PSCCH/PSSCH reception at sub-channel 2 in slot n+1 when the PSFCH frequency resource for PSFCH transmission is associated with the last received PSCCH/PSSCH or the first received PSCCH/PSSCH.

In other embodiments, a PSFCH frequency resource for PSFCH transmission with multiple HARQ-ACK information bits can be indicated by a SCI format in an associated PSCCH/PSSCH reception. When a receiver UE fails to detect a SCI format in a PSFCH period of N>1 slots, the receiver UE can still use the correct PSFCH resource for transmission. The PSFCH frequency resource is indicated by a slot index in the PSFCH period of N>1 slots. For example, a slot index with value 0 indicates the first slot in the PSFCH period for a PSFCH transmission.

Figure 24:
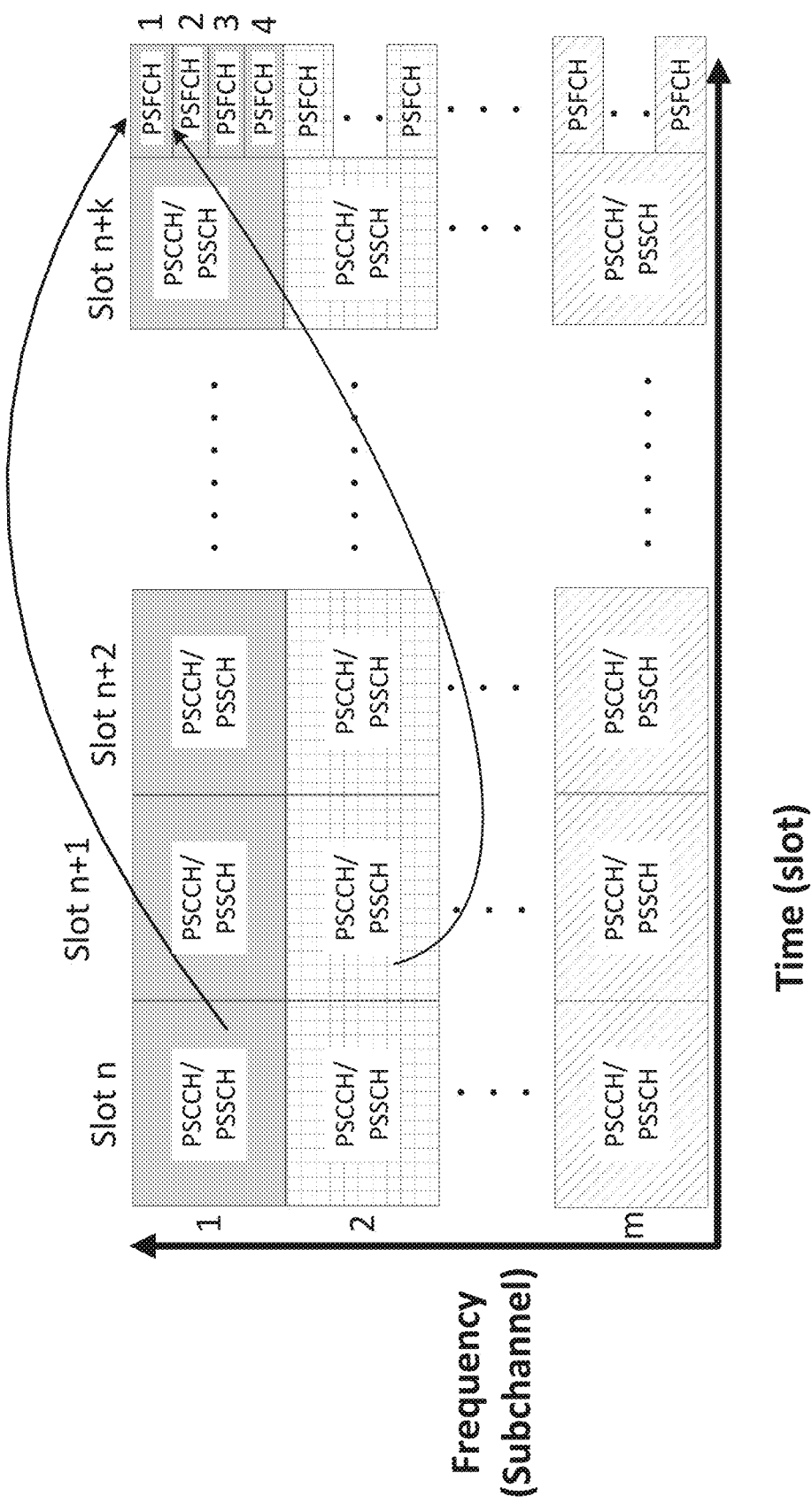
FIG. 24 illustrates an indication of a second slot for a PSFCH transmission in response to a PSCCH/PSSCH reception at a subchannel in a first slot according to various embodiments of the present disclosure.

FIG. 24 illustrates an indication of a second slot for a PSFCH transmission in response to a PSCCH/PSSCH reception at a subchannel in a first slot according to various embodiments of the present disclosure. The embodiment shown in FIG. 24 is for illustration only. Other embodiments can be used without departing from the scope of the present disclosure.

As shown in FIG. 24, the PSFCH frequency resource for PSFCH transmission in a second slot is associated with a PSCCH/PSSCH reception at sub-channel 1 in a first slot by an indication in each associated PSCCH/PSSCH (i.e., PSCCH/PSSCH at sub-channel 1 in slot n and PSCCH/PSSCH at sub-channel 2 in slot n+1).

In other embodiments, when a reservation signal is used to reserve PSCCH/PSSCH/PSFCH resources, the reservation signal can indicate a PSFCH frequency resource for a PSFCH transmission with multiple HARQ-ACK information bits. The PSFCH frequency resource is indicated by a slot index in the PSFCH period of N>1 slots. For example, a slot index with value 0 indicates that the implicitly associated PSFCH for the PSCCH/PSSCH in the first slot in the PSFCH period is used for PSFCH transmission.

Figure 25:
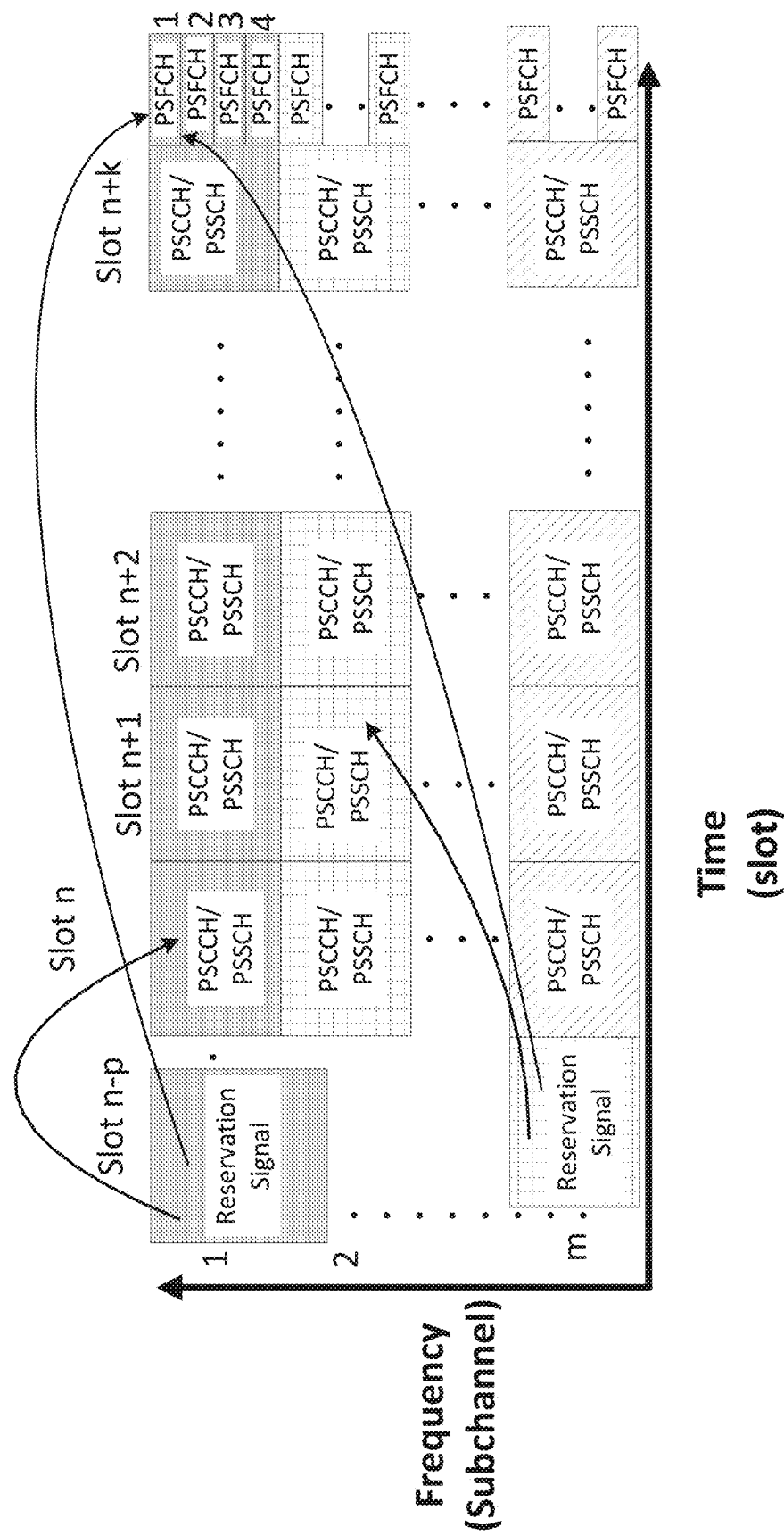
FIG. 25 illustrates an indication by a reservation signal of a second slot for PSFCH transmission in response to a PSCCH/PSSCH reception at a subchannel in a first slot according to various embodiments of the present disclosure.

FIG. 25 illustrates an indication by a reservation signal of a second slot for PSFCH transmission in response to a PSCCH/PSSCH reception at a subchannel in a first slot according to various embodiments of the present disclosure. The embodiment shown in FIG. 25 is for illustration only. Other embodiments can be used without departing from the scope of the present disclosure.

As shown in FIG. 25, the PSFCH frequency resource for a PSFCH transmission in response to an associated PSCCH/PSSCH reception at sub-channel 1 in slot n is indicated by each associated reservation signal (i.e., reservation signal for PSCCH/PSSCH reception at sub-channel 1 in slot n and PSCCH/PSSCH reception at sub-channel 2 in slot n+1).

As described herein, various embodiments of the present disclosure provide mechanisms for PSFCH power control, power control parameter configuration, CSI-RS power control, CSI-RS transmission/reception, CSI reporting, power control for a reservation signal, configuration of a maximum UE transmit power, power sharing between uplink and sidelink transmissions, and power sharing between transmissions with resource allocation Mode 1 and Mode 2. The various embodiments can be implemented in a UE, such as the UE 116, for NR V2X power control and for a NR V2X sidelink HARQ procedure.

For example, embodiments of the present disclosure include PSFCH power control. In these embodiments, for groupcast HARQ-ACK information reporting Option 1, the $\alpha_{sl}$ and/or $P_{O\_PSFCH\_sl}$ is configured by PC5 higher layer signaling and the $\alpha_{sl}$ and/or $P_{O\_PSFCH\_sl}$ is configured/indicated by a DCI format. The $\alpha_{sl}$ and/or $P_{O\_PSFCH\_sl}$ for a receiver UE is separately configured from the power control parameters for transmission of PSCCH/PSSCH channels.

Embodiments of the present disclosure further include power control parameter configurations. In these embodiments, $\alpha_{sl}$, $P_{O\_sl}$, $\alpha_c$, and $P_{O\_c}$ are configured based on a zone where a UE is located.

Embodiments of the present disclosure further include CSI-RS power control, where a CSI-RS transmission power is either fixed or indicated.

Embodiments of the present disclosure further include triggering of a CSI-RS transmission where a SCI format scheduling a PSSCH transmission can indicate whether or not a CSI-RS is also transmitted. Embodiments of the present disclosure further include CSI reporting where a SCI format can indicate whether a CSI-RS report is included in a PSSCH transmission.

Embodiments of the present disclosure further provide power control for a reservation signal transmission. In these embodiments, the power of the reservation signal can be calculated by the open-loop power control based on DL pathloss only when DL pathloss is available. The configuration of power control parameters for a reservation signal can be separate from the configuration for other channels such as PSCCH/PSSCH, or PSFCH.

Embodiments of the present disclosure further provide a configuration for a maximum UE transmit power $P_{CMAX}$. $P_{CMAX}$ can depend on a service type, priority of service, or channel status, and can be configured accordingly. Embodiments of the present disclosure further provide power sharing between uplink and sidelink transmissions by a UE by considering one or more of priorities, interference, and congestion. Embodiments of the present disclosure further provide power sharing between two modes, described herein as Mode 1 and Mode 2, by considering one or more of priorities, interference, and congestion.

As described herein, various embodiments of the present disclosure provide mechanisms for PSFCH power control. For HARQ-ACK information reporting Option 1 for groupcast, the receiver UE, such as the UE 116, transmits only HARQ-ACK information with value NACK to the transmitter UE, such as one of the UEs 111-115 and 118. Because the HARQ-ACK information with value NACK from different receiver UEs is transmitted in a same PSFCH resource, the sidelink interference caused by the PSFCH transmissions in the PSFCH resource to neighboring RBs can be large. Accordingly, the sidelink pathloss from the transmitter UE to different receiver UEs is included in the power control formula, shown in Equation 1.

$$P_{PSFCH} = \min(P_{CMAX}, P_{O\_PSFCH\_c} + 10 \log_{10}(2^\mu \cdot M_{PFCH}) + \alpha_c \cdot PL_c, P_{O\_PSFCH\_sl} + 10 \log_{10}(2^\mu \cdot M_{PSFCH}) + \alpha_{sl} \cdot PL_{sl})[dBm] \quad \text{Equation 1}$$

In Equation 1, $P_{PSFCH}$ is the PSFCH transmission power, $P_{CMAX}$ is a maximum (pre)configured UE transmit power, $M_{PSFCH}$ is a bandwidth of the PSFCH resource assignment expressed in number of resource blocks, and $\alpha_c$ and $P_{O\_PSFCH\_C}$ are an uplink pathloss compensation factor and a power value, respectively, that are provided by higher layers. $PL_c$ is the estimated pathloss between the gNB and the transmitter UE. $\alpha_{sl}$ and $P_{O\_PSFCH\_S1}$ are a sidelink pathloss compensation factor and a power setting that are provided by higher layers. $PL_{sl}$ is the pathloss between the transmitter UE and the receiver UE. µ is related to the subcarrier spacing where µ=0, 1, 2, 3 corresponds to subcarrier spacing of 15, 30, 60 and 120 kHz respectively.

The receiver UE performs power control without being able to account for the combined power of the PSFCH receptions from multiple receiver UEs at the transmitter UE. Accordingly, embodiments provide mechanisms for controlling a received power of a PSFCH transmission that occurs only when a receiver UE indicates a NACK value for a TB reception and uses a resource that can be common for PSFCH transmissions from multiple UEs.

In one embodiment, at least one of the $\alpha_{sl}$ or $P_{O\_PSFCH\_sl}$ can be configured to a receiver UE by a transmitter UE. The configuration can be performed by PC5 higher layer signaling and stored in the memory 260 of the transmitter UE. When a large number of receiver UEs transmit respective PSFCHs to convey respective NACK values in a same PSFCH resource, the transmitter UE can measure the received signal strength. When the received signal strength is large, the transmitter UE can configure smaller values for the $\alpha_{sl}$ and/or $P_{O\_PSFCH\_sl}$ parameters to the receiver UEs. When the received signal strength is small, the transmitter UE can configure larger values for the $\alpha_{sl}$ and/or $P_{O\_PSFCH\_sl}$ parameters to the receiver UEs.

For example, an index to the entry of the $\alpha_{sl}$ and/or $P_{O\_PSFCH\_sl}$ configuration table can be used in the signaling to indicate corresponding $\alpha_{sl}$ and/or $P_{O\_PSFCH\_sl}$ values. Table 1 is an example of indexes that can be signaled by a transmitter UE to receiver UEs and correspond to $\alpha_{sl}$ and/or $P_{O\_PSFCH\_sl}$ values. The index shown in Table 1 can be stored in the memory 260.

TABLE 1

| Index | $\alpha_{sl}$ | $P_{O\_PSFCH\_sl}$ |
|---|---|---|
| 0 | xx | xx |
| 1 | xx | xx |
| 2 | xx | xx |
| ... | ... | ... |

In another embodiment, the $\alpha_{sl}$ and/or $P_{O\_PSFCH\_sl}$ can be indicated in a SCI format in a PSCCH transmission by the transmitter UE. When a large number of receiver UEs transmit PSFCH in a same resource to convey a NACK value to the transmitter UE, the transmitter UE can measure the received signal strength. When the received signal strength is large, the transmitter UE can indicate in a SCI format a smaller value for the $\alpha_{s1}$ and/or $P_{O\_PSFCH\_sl}$ parameters to the receiver UEs by indicating a corresponding index in a predetermined/preconfigured Table. When the received signal strength is small, the transmitter UE can indicate in the SCI format a larger value for the $\alpha_{sl}$ and/or $P_{O\_PSFCH\_sl}$ parameters to the receiver UEs.

For example, an index to the entry of the $\alpha_{sl}$ and/or $P_{O\_PSFCH\_sl}$ configuration table can be used to indicate corresponding $\alpha_{sl}$ and/or $P_{O\_PSFCH\_sl}$ values. Table 2 is an example of an index corresponding to $\alpha_{sl}$ and/or $P_{O\_PSFCH\_sl}$. The index shown in Table 2 can be stored in the memory 260.

TABLE 2

| Index | $\alpha_{sl}$ | $P_{O\_PSFCH\_sl}$ |
|---|---|---|
| 0 | xx | xx |
| 1 | xx | xx |
| 2 | xx | xx |
| ... | ... | ... |

In another embodiment, at least one of the $\alpha_{sl}$ or $P_{O\_PSFCH\_sl}$ for a receiver UE is separately configured from the power control parameters of PSCCH/PSSCH channels. The $\alpha_{sl}$ and/or $P_{O\_PSFCH\_sl}$ for a receiver UE is separately configured for HARQ-ACK information reporting option 2 in groupcast. For example, Table 3 shows power control parameters of PSCCH/PSSCH and PSFCH according to various groupcast HARQ-ACK information reporting options. Table 3 can be stored in the memory 260.

TABLE 3

| Physical layer channels | groupcast HARQ options | Index | $\alpha_{sl}$ | $P_{O\_sl}$ |
|---|---|---|---|---|
| PSCCH/PSSCH | N/A | 0 | xx | xx |
|  |  | 1 | xx | xx |
|  |  | 2 | xx | xx |
|  |  | ... | ... | ... |
| PSFCH | Option 1 | 0 | xx | xx |
|  |  | 1 | xx | xx |
|  |  | ... | ... | ... |
| PSFCH | Option 2 | 0 | xx | xx |
|  |  | 1 | xx | xx |
|  |  | ... | ... | ... |

As described herein, various embodiments of the present disclosure provide power control for sidelink transmissions. For example, the UE transmit power for a sidelink transmission can be determined based on Equation 2, provided below.

$$P_{SL} = \min(P_{CMAX}, P_{O\_c} + 10\log_{10}(2^{\mu} \cdot M) + \alpha_c \cdot PL_c, P_{O\_sl} + 10\log_{10}(2^{\mu} \cdot M)\alpha_{sl} \cdot PL_{sl})[dBm] \quad \text{Equation 2}$$

In Equation 2, $P_{SL}$ is a UE transmit power for the sidelink transmission, $P_{CMAX}$ is a maximum (pre)configured UE power, and M is a bandwidth of the sidelink resource assignment expressed in number of resource blocks. $\alpha_c$ and $P_{O\_c}$ are an uplink pathloss scaling factor and a power setting and are provided by higher layers. $PL_c$ is an estimated pathloss between the gNB and the transmitter UE. $\alpha_{sl}$ and $P_{O\_sl}$ are a sidelink pathloss scaling factor and a power setting and are provided by higher layers. $PL_{sl}$ is the pathloss between the transmitter UE and the receiver UE. $\mu$ is related to the subcarrier spacing where $\mu=0, 1, 2, 3$ corresponds to subcarrier spacing of 15, 30, 60, and 120 kHz respectively.

When a transmission power of a UE, such as the UE 116, considers both the Uu pathloss between the gNB 102 and the UE 116 and the sidelink pathloss between the UE 116 and the receiver UE(s), if the Uu path loss is lower than sidelink pathloss, the power is bounded by the power calculated based on the Uu pathloss. Then, the transmission power can be lower than required for the sidelink and cause decoding errors. Accordingly, embodiments of the present disclosure provide a refined mechanism for calculating a sidelink transmission power.

For example, $\alpha_{s1}$ and $P_{O\_sl}$, $\alpha_c$ and $P_{O\_c}$ can be configured based on the zone where a UE is located. In a zone near the gNB, $\alpha_c$ and $P_{O\_c}$ can be configured to have larger values. In a zone far from the gNB, $\alpha_c$ and $P_{O\_c}$ can be configured to have smaller values.

For each resource pool, a UE can be provided separate configurations for the $\alpha_{s1}$, and $P_{O\_sl}$, $\alpha_c$, and $P_{O\_c}$ values. The configurations can also be separate per zone ID. The power control parameters can be configured as shown in Table 4 where each zone ID corresponds to a set of power control parameters $\alpha_c$ and $P_{O\_c}$.

TABLE 4

| Zone ID | $\alpha_c$ | $P_{O\_c}$ |
|---|---|---|
| 0 | xx | xx |
| 1 | xx | xx |
| 2 | xx | xx |
| ... | ... | ... |

The configuration of the power control parameters can be separate among resource pools as shown in Table 5 below.

TABLE 5

| Resource Pool ID | Zone ID | $\alpha_c$ | $P_{O\_c}$ |
|---|---|---|---|
| 0 | 0 | xx | xx |
|  | 1 | xx | xx |
|  | 2 | xx | xx |
|  | ... | ... | ... |
| 1 | 0 | xx | xx |
|  | 1 | xx | xx |
|  | ... | ... | ... |
| ... | ... | ... | ... |

As described herein, various embodiments of the present disclosure provide mechanisms for CSI-RS power control. In one embodiment, a receiver UE can calculate a pathloss based on a CSI-RS transmission from a transmitter UE. A transmission power of CSI-RS can be fixed, or derived from a PSSCH transmission power, or configured by higher layers, or indicated by a SCI format for example by indicating a table entry for a CSI-RS transmission power or by indicating an offset relative to the PSSCH transmission power. In another embodiment, the CSI-RS transmission power is always same as that the PSSCH transmission power in the PSSCH resource where CSI-RS is transmitted.

As described herein, various embodiments of the present disclosure provide mechanisms for a CSI-RS transmission. For example, periodic or semi-persistent CSI-RS transmission can be supported when a periodic or semi-persistent resource is allocated for a UE. In this case, a SCI format can indicate whether a periodic or semi-persistent CSI-RS is transmitted in the allocated periodic or semi-persistent resource. When there is no data in a periodic PSCCH/PSSCH periodic or semi-persistent resource, only CSI-RS is transmitted in the PSCCH/PSSCH periodic or semi-persistent resource.

In one embodiment, when a SCI format indicates the periodic or semi-persistent PSCCH/PSSCH resource allocation, the SCI format can also indicate that CSI-RS is transmitted periodically or semi-persistently. In various embodiments, the indication can be in the first stage SCI format or in the second stage SCI format when a 2-stage SCI format is used.

As described herein, various embodiments of the present disclosure provide mechanisms for CSI reporting. For example, periodic or semi-persistent CSI reporting can be supported when a periodic or semi-persistent resource is allocated for a UE. In this case, a SCI format can indicate whether periodic or semi-persistent CSI reporting is transmitted in the allocated periodic or semi-persistent resource. When there is no data in a periodic PSCCH/PSSCH periodic or semi-persistent resource, CSI reporting alone is transmitted in the PSCCH/PSSCH periodic or semi-persistent resource.

In one embodiment, when a SCI format indicates the periodic or semi-persistent PSCCH/PSSCH resource allocation, the SCI format can indicate the CSI reporting is transmitted periodically or semi-persistently. In various embodiments, the indication can be in the first stage SCI format or in the second stage SCI format when a 2-stage SCI format is used.

As described herein, various embodiments of the present disclosure provide mechanisms for reservation signal power control. A reservation signal can be a broadcast signal. The power of the reservation signal can be calculated by the open-loop power control based on DL pathloss when DL pathloss is available. The configuration of power control parameters for a reservation signal can be separate from other channels such as PSCCH/PSSCH or PSFCH.

As described herein, various embodiments of the present disclosure provide a maximum UE transmit power. For example, $P_{CMAX}$ can refer to the maximum (pre)configured UE power in the power control formula. In some embodiments, multiple maximum UE transmit powers $P_{CMAX}$ can be (pre)configured for different conditions. $P_{CMAX}$ can be determined based on one or more of a type of service, priority of service, or channel status. A UE, such as the UE 116, can use a configured $P_{CMAX}$ depending upon different conditions. For example, in a congested situation, the UE 116 can use a lower $P_{CMAX}$. For broadcast services, the UE 116 can use a higher $P_{CMAX}$. For a higher priority service, the UE 116 can use a higher $P_{CMAX}$.

For example, for the UE 116, $P_{CMAX}$ can be configured based on Table 6 below. The contents of Table 6 can be stored in the memory 260.

TABLE 6

| Index | $P_{CMAX}$ | Type of Service | CBR | Priority |
|---|---|---|---|---|
| 0 | xx | xx | xx | xx |
| 1 | xx | xx | xx | xx |
| 2 | xx | xx | xx | xx |
| ... | ... | ... | ... | ... |

As described herein, various embodiments of the present disclosure provide mechanisms for power sharing between uplink and sidelink transmissions. For example, power sharing between uplink and sidelink transmissions can be applied for simultaneous transmissions for both uplink and sidelink. The transmission power for uplink is calculated as a linear value of $\overline{P}_{UL}$ and the transmission power for sidelink is calculated as a linear value of $\overline{P}_{SL}$, $\overline{P}_{MAX}$ is a linear value of the configured, or preconfigured, maximum UE transmit power. In each method, the UE 116 can additionally consider congestion (CBR) to determine whether to drop a packet or use reduced power for transmission.

There can be several ways for the UE 116 to determine a transmit power on the uplink and the sidelink. For example, if $\overline{P}_{UL}$ $\overline{P}_{SL} \leq \overline{P}_{MAX}$, $\overline{P}_{UL}$ and $\overline{P}_{SL}$ are used for the respective uplink and sidelink UE transmit power. If $\overline{P}_{UL}+\overline{P}_{SL}>\overline{P}_{MAX}$, the UE 116 can reduce the transmission power of $\overline{P}_{SL}$, for sidelink so that $\overline{P}_{UL}+\overline{P}_{SL} \leq \overline{P}_{MAX}$ If $\overline{P}_{UL}+\overline{P}_{SL}>\overline{P}_{MAX}$, the UE 116 can reduce the transmission power of $\overline{P}_{UL}$ for uplink so that $\overline{P}_{UL}$ $\overline{P}_{SL} \leq \overline{P}_{MAX}$. Further, if the reduced sidelink transmission power is below a threshold value $\overline{P}_{SL\_TH}$, the UE 116 can drop the sidelink transmission and trigger a resource selection, or reselection, procedure.

If $\overline{P}_{UL}+\overline{P}_{SL}>\overline{P}_{MAX}$, the UE 116 reduces the transmission power of $\overline{P}_{SL}$, for sidelink so that $\overline{P}_{UL}+\overline{P}_{SL} \leq \overline{P}_{MAX}$ Further, if the reduced sidelink transmission power is below a threshold value $\overline{P}_{SL\_TH}$ and sidelink transmission priority is below a priority value $TH_{pri}$, the UE 116 can drop the sidelink transmission and trigger resource (re)selection procedure. If the reduced sidelink transmission power is below a threshold value $\overline{P}_{SL\_TH}$ and sidelink transmission priority is above or equal to a priority value $TH_{pri}$, the UE 116 transmits with the reduced transmission power of $\overline{P}_{SL}$.

If $\overline{P}_{UL}+\overline{P}_{SL}>\overline{P}_{MAX}$P and the sidelink transmission priority is above or equal to a priority value $TH_{pri}$, the UE 116 reduces the transmission power of $\overline{P}_{UL}$ for uplink so that $\overline{P}_{UL}$ $\overline{P}_{SL} \leq \overline{P}_{MAX}$ If the sidelink transmission priority is below a priority value $TH_{pri}$, the UE 116 reduces the transmission power of $\overline{P}_{SL}$, for sidelink so that $\overline{P}_{UL}+\overline{P}_{SL} \leq \overline{P}_{MAX}$ If $\overline{P}_{UL}+\overline{P}_{SL}>\overline{P}_{MAX}$P and the sidelink transmission priority is above or equal to a priority value $TH_{pri}$, the UE 116 reduces the transmission power of $\overline{P}_{UL}$ for uplink so that $\overline{P}_{UL}+\overline{P}_{SL} \leq \overline{P}_{MAX}$ If the sidelink transmission priority is below a priority value $TH_{pri}$, the UE 116 reduces the transmission power of $\overline{P}_{SL}$, for sidelink so that $\overline{P}_{UL}+\overline{P}_{SL} \leq \overline{P}_{MAX}$ If the reduced sidelink transmission power is below a threshold value $\overline{P}_{SL\_TH}$, the UE 116 can drop the sidelink transmission and trigger a resource selection, or reselection, procedure.

If $\overline{P}_{UL}+\overline{P}_{SL}>\overline{P}_{MAX}$ and the sidelink transmission priority is above or equal to a priority value $TH_{pri}$, the UE 116 reduces the transmission power of $\overline{P}_{UL}$ for uplink so that $\overline{P}_{UL}+\overline{P}_{SL} \leq \overline{P}_{MAX}$ If the sidelink transmission priority is below a priority value $TH_{pri}$, the UE 116 reduces the transmission power of $\overline{P}_{SL}$, for sidelink so that $\overline{P}_{UL}+\overline{P}_{SL} \leq \overline{P}_{MAX}$. If the reduced sidelink transmission power is below a threshold value $\overline{P}_{SL\_TH}$ and sidelink transmission priority is below a priority value $TH_{pri2}$, the UE 116 can drop the sidelink transmission and trigger resource selection, or reselection, procedure. If the reduced sidelink transmission power is below a threshold value $\overline{P}_{SL\_TH}$ and sidelink transmission priority is above or equal to a priority value $TH_{pri2}$, the UE 116 transmits with the reduced transmission power of $\overline{P}_{SL}$.

If $\overline{P}_{UL}+\overline{P}_{SL}>\overline{P}_{MAX}$, the UE 116 can scale the transmission power of $\overline{P}_{UL}$ and $\overline{P}_{SL}$ for uplink and sidelink so that $\overline{P}_{UL}+\overline{P}_{SL} \leq \overline{P}_{MAX}$. If the reduced sidelink transmission power is below a threshold value $\overline{P}_{SL\_TH}$, the UE 116 can drop the sidelink transmission and trigger resource (re)selection procedure.

If $\overline{P}_{UL}+\overline{P}_{SL}>\overline{P}_{MAX}$, the UE 116 scales the transmission power of $\overline{P}_{UL}$ and $\overline{P}_{SL}$ for uplink and sidelink so that $\overline{P}_{UL}+\overline{P}_{SL} \leq \overline{P}_{MAX}$ If the reduced sidelink transmission power is below a threshold value $\overline{P}_{SL\_TH}$ and sidelink transmission priority is below a priority value $TH_{pri}$, the UE 116 can drop the sidelink transmission and trigger resource selection, or reselection, procedure. If the reduced sidelink transmission power is below a threshold value $\overline{P}_{SL\_TH}$ and sidelink transmission priority is above or equal to a priority value $TH_{pri}$, the UE 116 transmits with the reduced transmission power of $\overline{P}_{SL}$.

As described herein, various embodiments of the present disclosure provide power sharing between Mode 1 and Mode 2. When there is a simultaneous transmission for both Mode 1 and Mode 2 for a particular UE 116, power between Mode 1 and Mode 2 is shared. The transmission power for Mode 1 is calculated as a linear value of $\overline{P}_{M1}$ and the transmission power for sidelink is calculated as a linear value of $\overline{P}_{M2}$. $\overline{P}_{MAX}$ is a linear value of the configured or preconfigured maximum UE transmit power. In each method, the UE 116 can additionally consider congestion (CBR) to determine whether to drop a packet or use reduced power for transmission.

If $\overline{P}_{M1}+\overline{P}_{M2} \leq \overline{P}_{MAX}$, $\overline{P}_{M1}$ and $\overline{P}_{M2}$ are used for the respective uplink and sidelink UE transmit power. If $\overline{P}_{M1}+\overline{P}_{M2} > \overline{P}_{MAX}$, the UE 116 can reduce the transmission power of $\overline{P}_{M1}$ for sidelink so that $\overline{P}_{M1}+\overline{P}_{M2} \leq \overline{P}_{MAX}$. If $\overline{P}_{M1}+\overline{P}_{M2} > \overline{P}_{MAX}$ the UE 116 can reduce the transmission power of $\overline{P}_{M2}$ for sidelink so that $\overline{P}_{M1}+\overline{P}_{M2} < \overline{P}_{MAX}$. If $\overline{P}_{M1}+\overline{P}_{M2} > \overline{P}_{MAX}$, when Mode 1 transmission has a higher priority than Mode 2 transmission, the UE 116 reduces the transmission power of $\overline{P}_{M2}$ for sidelink so that $\overline{P}_{M1}+\overline{P}_{M2} < \overline{P}_{MAX}$. When Mode 2 transmission has a higher priority than Mode 1 transmission, the UE 116 reduces the transmission power of $\overline{P}_{M1}$ for sidelink so that $\overline{P}_{M1}+\overline{P}_{M2} < \overline{P}_{MAX}$.

If $\overline{P}_{M1}+\overline{P}_{M2} > \overline{P}_{MAX}$, the UE 116 reduces the transmission power of $\overline{P}_{M1}$ for sidelink so that $\overline{P}_{M1}+\overline{P}_{M2} < \overline{P}_{MAX}$. If the reduced sidelink transmission power $\overline{P}_{M1}$ is below a threshold value $\overline{P}_{SL\_TH}$, the UE 116 can drop the sidelink transmission and trigger resource selection, or reselection, procedure.

If $\overline{P}_{M1}+\overline{P}_{M2} > \overline{P}_{MAX}$, the UE 116 reduces the transmission power of $\overline{P}_{M2}$ for sidelink so that $\overline{P}_{M1}+\overline{P}_{M2} \leq \overline{P}_{MAX}$. If the reduced sidelink transmission power $\overline{P}_{M2}$ is below a threshold value $\overline{P}_{SL\_TH}$, the UE 116 can drop the sidelink transmission and trigger resource selection, or reselection, procedure.

If $\overline{P}_{M1}+\overline{P}_{M2} > \overline{P}_{MAX}$, when Mode 1 transmission has a higher priority than Mode 2 transmission, the UE 116 reduces the transmission power of $\overline{P}_{M2}$ for sidelink so that $\overline{P}_{M1}+\overline{P}_{M2} \leq \overline{P}_{MAX}$. If the reduced sidelink transmission power $\overline{P}_{M2}$ is below a threshold value $\overline{P}_{SL\_TH2}$, the UE 116 can drop the sidelink transmission and trigger resource (re)selection procedure. When Mode 2 transmission has a higher priority than Mode 1 transmission, the UE 116 reduces the transmission power of $\overline{P}_{M1}$ for sidelink so that $\overline{P}_{M1}+\overline{P}_{M2} < \overline{P}_{MAX}$. If the reduced sidelink transmission power $\overline{P}_{M1}$ is below a threshold value $\overline{P}_{SL\_TH1}$ the UE 116 can drop the sidelink transmission and trigger resource selection, or reselection, procedure.

If $\overline{P}_{M1}+\overline{P}_{M2} > \overline{P}_{MAX}$, the UE 116 scales the transmission power of $\overline{P}_{M1}$ and $\overline{P}_{M2}$ for sidelink so that $\overline{P}_{UL}+\overline{P}_{SL} \leq \overline{P}_{MAX}$. If $\overline{P}_{M1}+\overline{P}_{M2} > \overline{P}_{MAX}$, the UE 116 scales the transmission power of $\overline{P}_{M1}$ and $\overline{P}_{M2}$ for sidelink so that $\overline{P}_{UL}+\overline{P}_{SL} \leq \overline{P}_{MAX}$. If the reduced sidelink transmission power $\overline{P}_{M1}$ is below a threshold value $\overline{P}_{SL\_TH}$, the UE 116 can drop the sidelink transmission and trigger resource selection, or reselection, procedure. If the reduced sidelink transmission power $\overline{P}_{M2}$ is below a threshold value $\overline{P}_{SL\_TH2}$, the UE 116 can drop the sidelink transmission and trigger resource selection, or reselection, procedure.

If $\overline{P}_{M1}+\overline{P}_{M2} > \overline{P}_{MAX}$, the UE 116 scales the transmission power of $\overline{P}_{M1}$ and $\overline{P}_{M2}$ for sidelink so that $\overline{P}_{UL}+\overline{P}_{SL} \leq \overline{P}_{MAX}$. If the reduced sidelink transmission power $\overline{P}_{M1}$ is below a threshold value $\overline{P}_{SL\_TH1}$ and sidelink transmission priority is below a priority value $TH_{pri1}$, the UE 116 can drop the sidelink transmission and trigger resource selection, or reselection, procedure. If the reduced sidelink transmission power $\overline{P}_{M2}$ is below a threshold value $\overline{P}_{SL\_TH2}$ and sidelink transmission priority is below a priority value $TH_{pri2}$, the UE 116 can drop the sidelink transmission and trigger resource selection, or reselection, procedure.

Various embodiments of the present disclosure provide mechanisms for NR sidelink power saving operation. As described herein, RRC can control configuration of DRX operation. The DRX operation can be controlled by configuring timers. In particular, drx-onDurationTimer is the timer for the duration at the beginning of a DRX Cycle, drx-SlotOffset is the timer for the delay in slots before starting the drx-onDurationTimer, and drx-InactivityTimer is the timer for the duration after the PDCCH occasion in which a PDCCH indicates an initial UL or DL user data transmission for the MAC entity. drx-RetransmissionTimerDL (per DL HARQ process) is the timer for the maximum duration until a DL retransmission is received, drx-RetransmissionTimerUL (per UL HARQ process) is the timer for the maximum duration until a grant for UL retransmission is received, and drx-LongCycle is the timer for the Long DRX cycle. drx-ShortCycle can be an option timer for the Short DRX cycle, drx-ShortCycleTimer can be an optional timer for the duration the UE follows for the Short DRX cycle, drx-HARQ-RTT-TimerDL (per DL HARQ process) can be the timer for the minimum duration before a DL assignment for HARQ retransmission is expected by the MAC entity, and drx-HARQ-RTT-TimerUL (per UL HARQ process) is the timer for the minimum duration before a UL HARQ retransmission grant is expected by the MAC entity.

When a DRX cycle is configured, the Active Time includes time while drx-onDurationTimer or drx-InactivityTimer or drx-RetransmissionTimerDL or drx-RetransmissionTimerUL or ra-ContentionResolutionTimer is running, a Scheduling Request is sent on PUCCH and is pending, or a PDCCH indicating a new transmission addressed to the C-RNTI of the MAC entity has not been received after successful reception of a Random Access Response for the preamble not selected by the MAC entity.

When the DRX is configured, the MAC entity can follow the following procedure.

1>if a drx-HARQ-RTT-TimerDL expires:
   2>if the data of the corresponding HARQ process was not successfully decoded:
      3>start the drx-RetransmissionTimerDL for the corresponding HARQ process.

1>if an drx-HARQ-RTT-TimerUL expires:
   2>start the drx-RetransmissionTimerUL for the corresponding HARQ process.

1>if a DRX Command MAC CE or a Long DRX Command MAC CE is received:
   2>stop drx-onDurationTimer;
   2>stop drx-InactivityTimer.

1>if drx-InactivityTimer expires or a DRX Command MAC CE is received:
  2>if the Short DRX cycle is configured:
    3>start or restart drx-ShortCycleTimer;
    3>use the Short DRX Cycle.
  2>else:
    3>use the Long DRX cycle.
1>if drx-ShortCycleTimer expires:
  2>use the Long DRX cycle.
1>if a Long DRX Command MAC CE is received:
  2>stop drx-ShortCycleTimer;
  2>use the Long DRX cycle.
1>if the Short DRX Cycle is used, and [(SFN*10)+ subframe number] modulo (drx-ShortCycle)=(drx-StartOffset) modulo (drx-ShortCycle); or
1>if the Long DRX Cycle is used, and [(SFN*10)+ subframe number] modulo (drx-LongCycle)=drx-StartOffset:
  2>if drx-SlotOffset is configured:
    3>start drx-onDurationTimer after drx-SlotOffset.
  2>else:
    3>start drx-onDurationTimer.
1>if the MAC entity is in Active Time:
  2>monitor the PDCCH;
  2>if the PDCCH indicates a DL transmission or if a DL assignment has been configured:
    3>start the drx-HARQ-RTT-TimerDL for the corresponding HARQ process immediately after the corresponding PUCCH transmission;
    3>stop the drx-RetransmissionTimerDL for the corresponding HARQ process.
  2>if the PDCCH indicates a UL transmission or if a UL grant has been configured:
    3>start the drx-HARQ-RTT-TimerUL for the corresponding HARQ process immediately after the first repetition of the corresponding PUSCH transmission;
    3>stop the drx-RetransmissionTimerUL for the corresponding HARQ process.
  2>if the PDCCH indicates a new transmission (DL or UL):
    3>start or restart drx-InactivityTimer.
1>else (i.e. not part of the Active Time):
  2>not report CQI/PMI/RI on PUCCH.

As described herein, V2X includes communications between Pedestrian UEs and Vehicular UEs, (V2P). Whereas a vehicular UE, such as the UE 118, is assumed to be attached the vehicle's power supply, and thus to have no particular battery life concerns, the situation is different for a P-UE. A P-UE could be, for example, a conventional smartphone running suitable applications or a specialized device attached to a pedestrians clothing. In either case, battery life is a consideration so that the device can provide the V2P services for a reasonable length of time without need of re-charging and without imposing such battery drain that V2P applications could become unattractive. In some embodiments, the P-UE can be the UE 116 described herein.

A UE can perform sensing continuously in a 1000 ms historical window, implying an amount of ongoing power consumption due to the sensing procedure. A P-UE may not support sidelink reception so the P-UE is only broadcasting packets relating to its own location and direction. This type of P-UE can be allowed to select transmission resources randomly, with no sensing procedure. For a P-UE that does support sidelink reception, the P-UE can be configured, or preconfigured, to perform partial sensing. In partial sensing, the P-UE monitors only a subset of the subframes/slots in the typically 1000 ms sensing window. The UE implementation can choose a number of subframes/slots to monitor by trading off reliability of transmissions and power savings, subject to monitoring a configured or preconfigured minimum number of subframes/slots. A pre-configuration can also set how far into the past the sensing window extends and require that the UE performs partial sensing in a number of truncated sensing windows.

Accordingly, various embodiments of the present disclosure provide mechanisms for sidelink power saving operation and an enhanced resource allocation for power saving UEs. The power saving operation can apply to UEs, such as pedestrian UEs, that communicate in sidelink and have a requirement on lower power consumption. In particular, the present disclosure provides support of DRX operation, a power saving signal or channel, support of DRX operations with a reservation signal, and resource allocation.

Sidelink DRX parameters are configured by sidelink higher layers for out-of-coverage or in-coverage Mode 2 UEs. For in-coverage Mode 1 UEs, DRX parameters can be configured by Uu and/or sidelink higher layers. The Uu link and the sidelink for a UE can be configured to use a same or separate set of DRX parameters. Sidelink DRX parameters are configured by Uu higher layers for in-coverage Mode 1 UEs. The configuration can be provided to both the transmitter UE and the power saving/receiver UE in their respective Uu links when RRC is established with the gNB, or the configuration can be provided only to the power saving/receiver UE in the Uu link, while the configuration for the transmitter UE is provided in the sidelink by the power saving/receiver UE when PC5-RRC is established.

A power saving signal or channel can be configured by higher layers and transmitted by a transmitter UE for triggering a receiver UE whether or not to monitor a subsequent On Duration time in a next DRX cycle (or a number of next DRX cycles). The configuration for the sidelink power saving signal or channel can be provided by PC5 higher layers when a unicast connection is established among the UEs. For out-of-coverage UEs or Mode 2 UEs, the power saving signal or channel can be independent from a Uu link power saving signal or channel and can be provided by a SCI format in a PSCCH or by a MAC CE or RRC signaling in a PSSCH. For in-coverage Mode 1 UEs, a DCI format in a PDCCH can provide power saving information for both Uu and sidelink. When a DCI format in a PDCCH indicates to the UE to wake up for sidelink, the UE monitors PSCCH in the sidelink according to the sidelink DRX cycle configuration. When a DCI format in a PDCCH indicates to the UE to wake up for Uu link, the UE monitors PDCCH in Uu link according to the Uu link DRX cycle configuration. When a DCI format in a PDCCH indicates to the UE to wake up for both Uu link and sidelink, the UE monitors both PDCCH in Uu link according to the Uu link DRX cycle and PSCCH in sidelink according to the sidelink DRX cycle.

For in-coverage Mode 1 UEs, a DCI format provided by a PDCCH can indicate to a UE to monitor PSCCH in the sidelink while a same or different DCI format provided by a PDCCH can indicate to the UE to monitor PDCCH in the Uu link. For an in-coverage Mode 1 UE, different power saving signals or channels for sidelink and Uu link can be used to indicate to the UE to monitor PSCCH and to monitor PDCCH, respectively, in a next respective DRX cycle. For in-coverage Mode 1 UEs, the configuration for an in-coverage sidelink power saving signal or channel can be provided to a receiver UE by Uu higher layers after the UE establishes RRC connection. The configuration can be provided to both the transmitter UE and the receiver UE in their respective Uu links, or the configuration for sidelink power saving signal or channel can be provided only to the receiver UE in the Uu link, while the configuration for sidelink power saving signal or channel for the transmitter UE can be provided in the sidelink by the receiver UE after PC5-RRC is established.

A reservation signal can also be used as a sidelink power saving signal or channel to indicate to a UE to wake up for monitoring PSCCH in the On Duration time of a next DRX cycle.

For resource allocation, when the DRX procedure is used in sidelink, the partial set of slots used for sensing and measurements can be selected from slots that are configured to be active in each DRX cycle within a sensing window, such as a drx-onDurationTimer.

As described herein, various embodiments of the present disclosure provide mechanisms to support DRX operation in sidelink. The DRX mechanism can reduce power consumption for UEs in unicast. In particular, a UE, such as the UE 116, wakes and receives or transmits signals only during a small percentage of time in a DRX cycle. During the remainder of the DRX cycle, the UE 116 can enter a sleeping mode if there is no data to transmit or receive. As described herein, any UE 111-118 that can communicate with a power saving UE can be a transmitter UE.

In some embodiments, such as for a Mode 2 UE that is either out of coverage or in coverage, the DRX parameters can be configured by higher layers of a sidelink after the UE establishes unicast RRC connection. The DRX parameters that can be configured include various timers. For example, drx-onDurationTimer is a timer for the On Duration at the beginning of a DRX Cycle, drx-SlotOffset is a timer for the delay in slots before starting the drx-onDurationTimer, and drx-InactivityTimerSL is a timer for the duration after the PSCCH occasion in which a PSCCH indicates an initial sidelink PSSCH user data transmission for the MAC entity or there is an initial PSSCH user data transmitted by the UE 116. drx-RetransmissionTimerSL (per Sidelink HARQ process, retransmission is from the transmitter UE to the power saving UE) is a timer for the maximum duration until a sidelink retransmission is received, when HARQ-ACK information reporting is enabled. drx-RetransmissionTimerSL is disabled when HARQ-ACK information reporting is disabled.

drx-RetransmissionTimerSL2 (per Sidelink HARQ process, retransmission is from the power saving UE to the transmitter UE) is a timer for the maximum duration until a sidelink retransmission is sent, when HARQ-ACK information reporting is enabled. drx-RetransmissionTimerSL2 is disabled when HARQ-ACK information reporting is disabled. drx-LongCycleStartOffset is a timer for the Long DRX cycle drx-LongCycle and for drx-StartOffset, that defines the subframe/slot where the Long and Short DRX Cycle starts. drx-ShortCycle is an optional timer for the Short DRX cycle. drx-ShortCycleTimer is an optional timer for the duration the UE shall follow the Short DRX cycle. drx-HARQ-RTT-TimerSL (per SL HARQ process, retransmission is from the transmitter UE to the power saving UE) is a timer for the minimum duration before a sidelink assignment for HARQ retransmission is expected by the MAC entity. drx-HARQ-RTT-TimerSL2 (per SL HARQ process, retransmission is from the power saving UE to the transmitter UE) is a timer for a minimum duration before sidelink HARQ-ACK information for HARQ retransmission is expected by the MAC entity. In some embodiments, different UEs 111-118 can be configured with different drx-StartOffset values for UE resource allocation to avoid resource conflict.

In some embodiments, for in-coverage Mode 1 UEs, the DRX parameters can be configured by Uu and/or sidelink higher layers. The Uu link and the sidelink for a UE, such as the UE 116, can be configured to use a same set of DRX parameters. A DRX parameter can have different functionality depending on whether or not the DRX parameter is for the sidelink or for the Uu link because sidelink DRX is considered for in-coverage UEs. For example, drx-RetransmissionTimerDL can be interpreted as per DL HARQ process where retransmission is from the gNB 102 to the UE 116, or per SL HARQ process where retransmission is from the transmitter UE to the power saving UE. The DRX parameters can include various timers. For example, drx-onDuration Timer is a timer for the On Duration at the beginning of a DRX Cycle, drx-SlotOffset is a timer for the delay in slots before starting the drx-onDurationTimer, and drx-InactivityTimer is a timer for a duration after a PDCCH monitoring occasion where a UE receives a PDCCH with a DCI format that indicates an initial TB transmission in a PDSCH or a PUSCH for the MAC entity or after a PSCCH monitoring occasion where a UE receives a PSCCH with a SCI format that indicates an initial TB transmission in a PSSCH for the MAC entity or there is an initial TB transmission in a PSSCH by the UE 116.

drx-RetransmissionTimerDL (per DL HARQ process or per SL HARQ process where retransmission is from the transmitter UE to the power saving UE) is a timer for a maximum duration until a DL retransmission for a TB is received or a maximum duration until a sidelink retransmission for a TB is received, when HARQ-ACK information reporting is enabled. drx-RetransmissionTimerDL is disabled for sidelink when HARQ-ACK information reporting is disabled. drx-RetransmissionTimerUL (per UL HARQ process or per SL HARQ process where retransmission is from the power saving UE to the transmitter UE) is a timer for a maximum duration until a grant for UL retransmission is received or a maximum duration until a sidelink retransmission is sent, when HARQ-ACK information reporting is enabled. drx-RetransmissionTimerUL is disabled for sidelink when HARQ-ACK information reporting is disabled.

drx-LongCycleStartOffset is a timer for the Long DRX cycle drx-LongCycle and drx-StartOffset, that defines a subframe/slot where the Long and Short DRX Cycle starts. drx-ShortCycle is an optional timer for the Short DRX cycle. drx-ShortCycleTimer is an optional timer for a duration the UE follows the Short DRX cycle. drx-HARQ-RTT-TimerDL (per DL HARQ process or per sidelink HARQ process where retransmission is from the transmitter UE to the power saving UE) is a timer for the minimum duration before a DL assignment for HARQ retransmission is expected by the MAC entity or a minimum duration before a sidelink assignment for HARQ retransmission is expected by the MAC entity. drx-HARQ-RTT-TimerUL (per UL HARQ process or sidelink HARQ process where retransmission is from the power saving UE to the transmitter UE) is a timer for a minimum duration before a UL HARQ retransmission grant is expected by the MAC entity or a minimum duration before a sidelink HARQ-ACK information for HARQ retransmission is expected by the MAC entity.

As described herein, for in-coverage Mode 1 UEs, the DRX parameters can be configured by Uu and/or sidelink higher layers. The Uu link and the sidelink for a UE can be configured to use a separate set of DRX parameters, in addition to common DRX parameters for Uu link, such as drx-onDurationTimer, drx-SlotOffset, drx-LongCycleStartOffset, drx-ShortCycle, drx-ShortCycleTimer. The configured DRX parameters can include various timers.

For example, drx-onDurationTimer is a timer for the On Duration at the beginning of a DRX Cycle. drx-onDurationTimer can be common for Uu link and sidelink. drx-SlotOffset is a timer for a delay in slots before starting the drx-onDurationTimer. drx-SlotOffset can be common for Uu link and sidelink. drx-InactivityTimer is a timer for a duration after a PDCCH monitoring occasion where a DCI format in a PDCCH indicates an initial transmission for a TB in a PUSCH or PDSCH for the MAC entity. drx-InactivityTimerSL is a timer for a duration after a PSCCH monitoring occasion where a SCI format in a PSCCH indicates an initial TB transmission in a PSSCH for the MAC entity or there is an initial TB transmission in a PSSCH by the UE 116.

drx-RetransmissionTimerDL (per DL HARQ process) is a timer for a maximum duration until a retransmission for a TB in the DL is received. drx-RetransmissionTimerUL (per UL HARQ process) is a timer for a maximum duration until a grant for a TB retransmission in the UL is received. drx-RetransmissionTimerSL (per Sidelink HARQ process where retransmission is from the transmitter UE to the power saving UE) is a timer for a maximum duration until a sidelink retransmission for a TB is received, when HARQ-ACK information reporting is enabled. drx-RetransmissionTimerSL can be disabled when HARQ-ACK information reporting is disabled. drx-RetransmissionTimerSL2 (per Sidelink HARQ process where retransmission is from the power saving UE to the transmitter UE) is a timer for a maximum duration until a sidelink retransmission is sent, when HARQ-ACK information reporting is enabled. drx-RetransmissionTimerSL2 can be disabled when HARQ-ACK information reporting is disabled. drx-LongCycleStartOffset is a timer for the Long DRX cycle drx-LongCycle and drx-StartOffset that defines a slot/subframe where the Long and Short DRX Cycle starts. drx-LongCycleStartOffset can be common for Uu link and sidelink. drx-ShortCycle is an optional timer for the Short DRX cycle and can be common for Uu link and sidelink. drx-ShortCycleTimer is an optional timer for a duration a UE follows the Short DRX cycle and can be common for Uu link and sidelink.

drx-HARQ-RTT-TimerDL (per DL HARQ process) is a timer for a minimum duration before a DL assignment for HARQ retransmission is received by the MAC entity. drx-HARQ-RTT-TimerUL (per UL HARQ process) is a timer for a minimum duration before a UL HARQ retransmission grant is received by the MAC entity. drx-HARQ-RTT-TimerSL (per SL HARQ process where retransmission is from the transmitter UE to the power saving UE) is a timer for a minimum duration before a sidelink assignment for HARQ retransmission is received by the MAC entity. drx-HARQ-RTT-TimerSL2 (per sidelink HARQ process where retransmission is from the power saving UE to the transmitter UE) is a timer for a minimum duration before a sidelink HARQ-ACK information for HARQ retransmission is received by the MAC entity.

In some embodiments, there can be multiple sidelink connections between a UE, such as the UE 116, and other UEs, such as the UE 118. In these embodiments, the UE 116 can use a same set of DRX parameters for all sidelink connections with the other UEs 118. If the UE 116 operates in Mode 2, the configuration can be provided to other UEs 118 in sidelink by the UE 116.

In embodiments where UEs are in a groupcast or broadcast, a DRX mechanism can reduce power consumption. Since all UEs in a groupcast or broadcast are simultaneously active for receiving data from another UE, the DRX cycle for the UEs can be same. For example, the same timer such as drx-onDurationTimer, drx-SlotOffset, drx-LongCycleStartOffset, drx-ShortCycle, and drx-ShortCycleTimer can be used. For Mode 2 UEs in the group, the configuration can be provided to UEs in the group in sidelink by one of the UEs in the group. Further, the information can be provided by a groupcast or broadcast PSSCH.

In embodiments where UEs are in-coverage Mode 1 UEs, a configuration for DRX parameters can be provided to a power saving UE by Uu higher layers after the UE establishes RRC connection with a gNB. For example, the configuration can be provided to both a transmitter UE 118 and a power saving UE 116 in their respective Uu links. As another example, the configuration can be provided only to the power saving UE 116 in the Uu link while the configuration for the transmitter UE 118 can be provided in the sidelink by the power saving UE 116 after PC5-RRC is established. The configuration procedure can also be applied to UEs in groupcast or broadcast PSSCH receptions.

Various embodiments of the present disclosure provide mechanisms for a power saving signal or channel. For example, to reduce power consumption, as in a NR Uu link, a power saving signal or channel can be configured by higher layers and transmitted by one or more transmitter UEs to indicate, to a UE, whether or not to monitor PSCCH during the On Duration time in a next DRX cycle (or a configured number of next DRX cycles).

In some embodiments, such as for out-of-coverage UEs or Mode 2 UEs, the power saving signal or channel can be independent from a Uu link power saving signal or channel and can be provided by a SCI format in a PSCCH or by a PSSCH.

Figure 26:
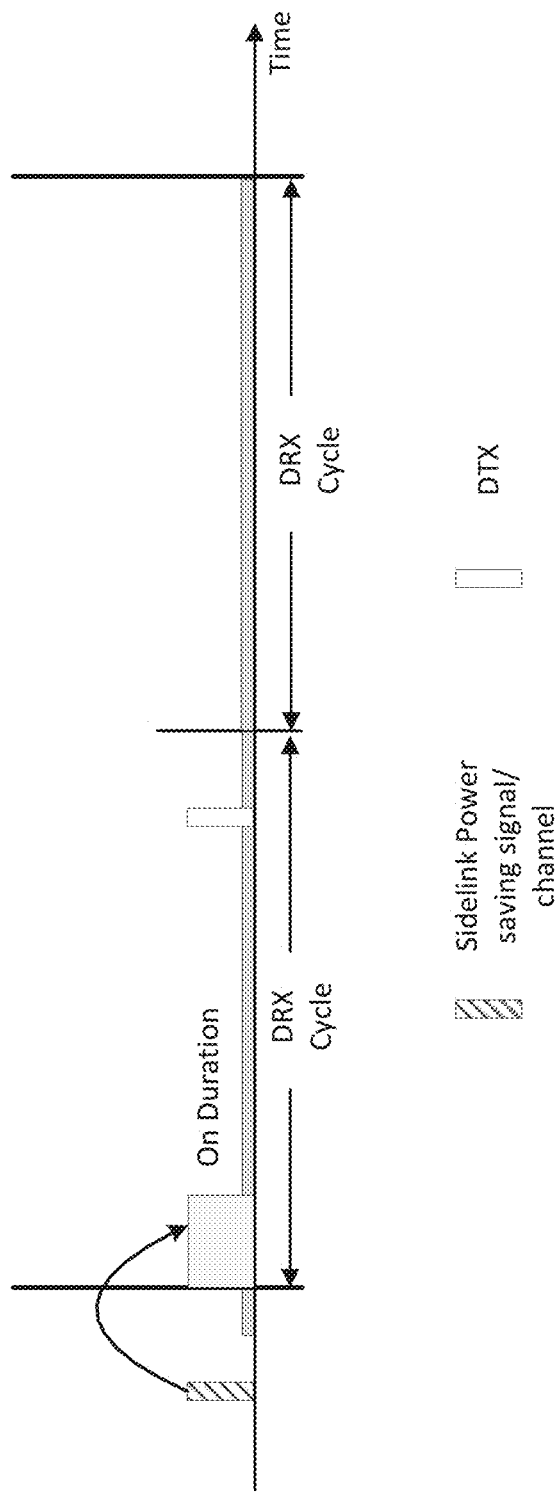
FIG. 26 illustrates a sidelink power saving signal or channel according to various embodiments of the present disclosure.

FIG. 26 illustrates a sidelink power saving signal or channel according to various embodiments of the present disclosure. More particularly, FIG. 26 illustrates an example of a sidelink power saving signal or channel that wakes up a UE to monitor PSCCH in a subsequent On Duration time of a next DRX cycle. The embodiment of the sidelink power saving signal or channel shown in FIG. 26 is for illustration only. Other embodiments can be used without departing from the scope of the present disclosure.

As shown in FIG. 26, when there is no data to transmit to the power saving UE 116 in a next DRX cycle, the UE 118 can transmit a power saving signal or channel to the power saving UE 116 so that the power saving UE 116 does not wake up (does not monitor PSCCH) in the next DRX cycle.

In some embodiments, the configuration illustrated in FIG. 26 can be provided by PC5 higher layers after a unicast connection is established among UEs on the sidelink. The configuration for the sidelink power saving signal or channel can include one or more of a monitoring periodicity, a monitoring time offset relative to the start of a DRX cycle, and a monitoring pattern within a slot. The monitoring pattern can indicate at least one of time domain or frequency domain location within a slot for power saving signal/channel monitoring. The monitoring periodicity can also have values that are integer multiples of the length of the DRX cycle.

In some embodiments, information fields of a SCI format used to provide power saving information can include dynamic DRX parameters, such as the length of onDurationTimer, drx-InactivityTimer, and DRX cycle. The information fields can further include an indication of a carrier where the UE switches from a dormant state to monitor PSCCH when the UE is configured for operation with carrier aggregation (or where the UE switches to a dormant state if the UE was previously in an active state for monitoring PSCCH). The information fields can further include an indication of a BWP where the UE monitors PSCCH when the UE is configured for operation with multiple BWPs or of a BWP where the UE does not monitor PSCCH. The information fields can further include information related to decoding of PSCCH that provides a SCI format for PSSCH scheduling such as one or more of the staring symbol of the PSCCH, the number of symbols of the PSCCH, and the starting subchannel/RB and number of RBs that the PSCCH occupies, to dynamically control a number of PSCCH decoding operations a UE needs to perform in the following DRX cycle.

In embodiments where the power saving signal or channel is provided by an SCI format or by a PSSCH, the information provided by the SCI format can be configured by higher layers.

In some embodiments, there can be multiple sidelink connections between the UE 116 and other UEs 118. In these embodiments, the UE 116 can use a same set of DRX parameters for all sidelink connections with other UEs and the UEs can use a same resource for a transmission of a power saving signal or channel if the power saving signal or channel from other vehicle UEs provides a same information, such as whether or not to monitor PSCCH during the On Duration time in a next DRX cycle, without carrying some transmitter UE specific information. If the power saving signal or channel from other UEs does not provide same information, or if the transmissions from the other UEs in a same resource cannot be combined by the receiver UE 116, the UEs can use different resources for transmission of their respective power saving signal or channel.

In some embodiments, a power saving signal or channel can be used to reduce power consumption for a group of UEs in a groupcast or broadcast mode. Since all UEs in a group are waken up to monitor PSCCH simultaneously by a power saving signal or channel, the power saving signal or channel configuration can be same for all UEs in the group.

In embodiments where a UE is an in-coverage Mode 1 UE, a power saving signal or channel can have a same structure as a Uu link power saving signal or channel. For example, a power saving signal or channel can be a DCI format in a PDCCH that is applicable to one or both of the Uu link and the sidelink transmission/reception. Same DRX cycle parameters can be configured for sidelink and Uu link. In embodiments where a UE operates in a shared carrier for Uu link and sidelink and any one of the power saving signal or channel indicates to the UE to wake up to monitor PSSCH in a next DRX cycle, the UE wakes up to monitor PSSCH in the next DRX cycle. In embodiments where the UE operates in different carriers for Uu link and sidelink, the UE wakes up to monitor PDCCH or PSSCH (when so indicated) in respective carriers indicated by the power saving signal or channel.

Figure 27:
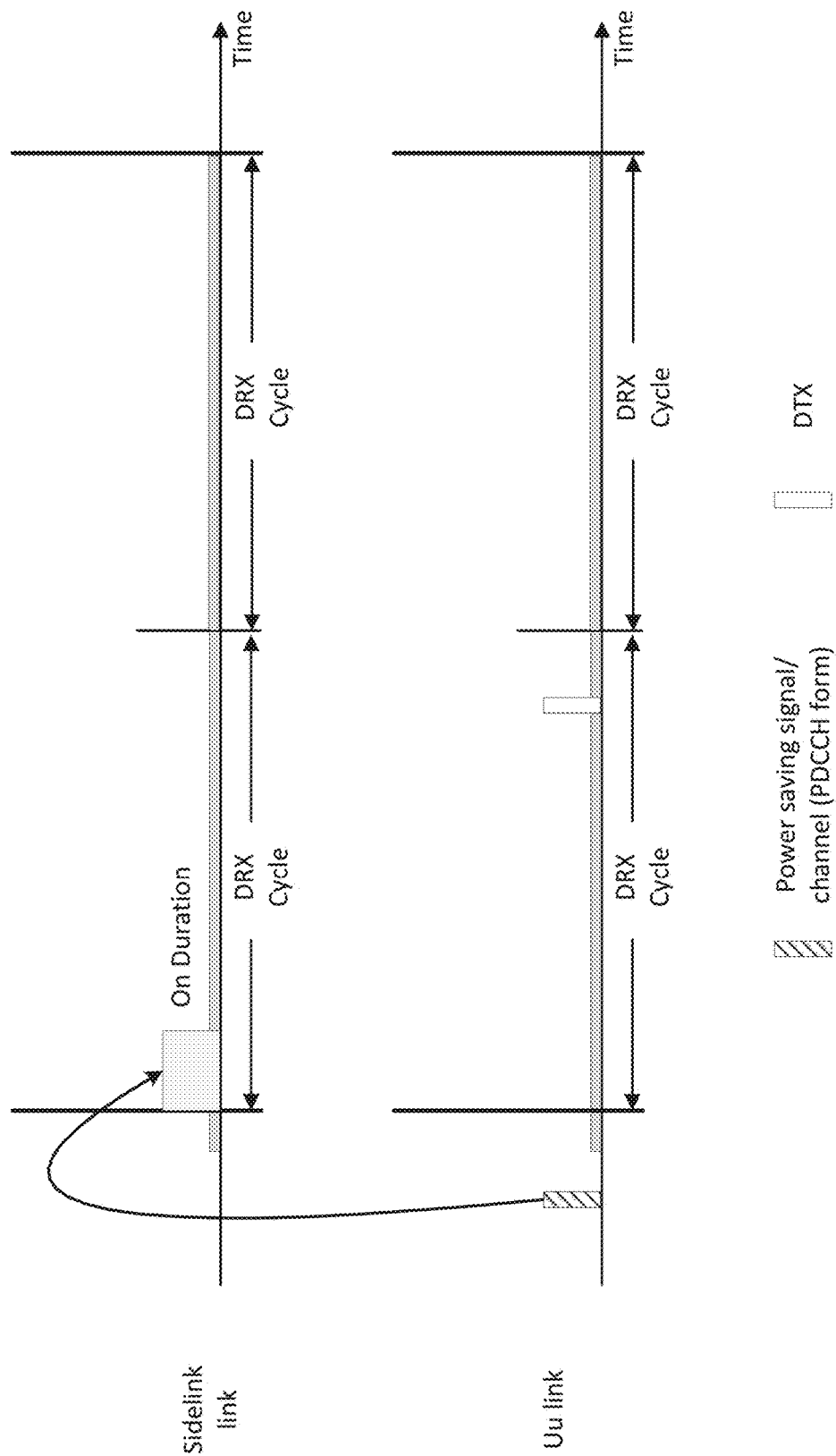
FIG. 27 illustrates a Mode 1 power saving signal or channel for a PDCCH according to various embodiments of the present disclosure.

FIG. 27 illustrates a Mode 1 power saving signal or channel for a PDCCH according to various embodiments of the present disclosure. The embodiment of the Mode 1 power saving signal or channel shown in FIG. 27 is for illustration only. Other embodiments can be used without departing from the scope of the present disclosure.

As shown in FIG. 27, a Uu link power saving signal or channel triggers a UE to monitor PSCCH in the sidelink. In the example illustrated in FIG. 27, the sidelink and Uu link operate in different carriers.

Figure 28:
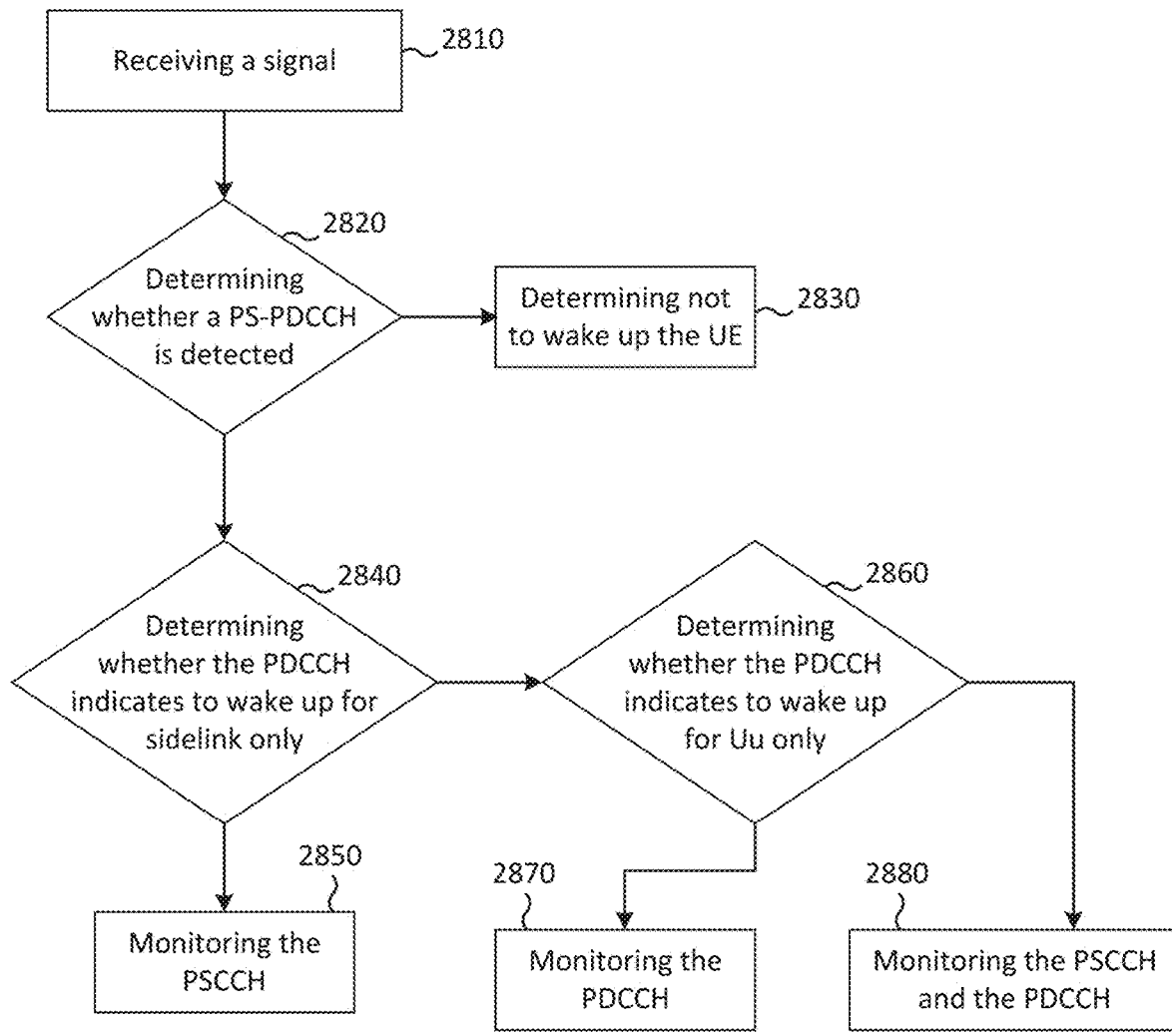
FIG. 28 illustrates a method for indicating to a UE whether or not to monitor PDCCH or PSSCH in next respective DRX cycles on the Uu link or the sidelink through a DCI format in a PDCCH power saving signal or channel in Mode 1 sidelink according to various embodiments of the present disclosure.

FIG. 28 illustrates a method for indicating to a UE whether or not to monitor PDCCH or PSSCH in next respective DRX cycles on the Uu link or the sidelink through a DCI format in a PDCCH power saving signal or channel in Mode 1 sidelink according to various embodiments of the present disclosure. Although described herein as being implemented by the UE 116, the method 2800 illustrated in FIG. 28 can be implemented by one or more of the UEs 111-116 and a corresponding method can be performed by one or more of the gNBs 101-103 described in FIG. 1. Other embodiments can be used without departing from the scope of the present disclosure.

In operation 2810, a UE, such as the UE 116, receives a signal. The signal can be transmitted from a gNB, such as the gNB 102, or from another UE, such as the UE 118.

In operation 2820, the UE 116 determines whether a DCI format providing power saving information in a PDCCH (PS-PDCCH) is detected as the signal received in operation 2810. If a DCI format in a PS-PDCCH is not detected, the UE 116 proceeds to operation 2830 and determines to not wake up. If a DCI format in a PS-PDCCH is detected, the UE 116 proceeds to operation 2840.

In operation 2840, the UE 116 determines whether the DCI format in the PS-PDCCH indicates to the UE to wake up for sidelink only. If the UE 116 determines the DCI format in the PS-PDCCH indicates to wake up for sidelink only, the UE 116 proceeds to operation 2850 and monitors the PSCCH in sidelink. If the UE 116 determines that the DCI format in the PS-PDCCH does not indicate to wake up for sidelink only, the UE 116 proceeds to operation 2860 and determines whether the DCI format in the PS-PDCCH indicates to wake up for the Uu link only.

If the UE 116 determines, in operation 2860, that the DCI format in the PS-PDCCH indicates to wake up for the Uu link only, in operation 2870 the UE 116 monitors PDCCH in the Uu link. If the 116 determines, in operation 2860, that the DCI format in the PS-PDCCH does not indicate to wake up for the Uu link only, in operation 2880 the UE 116 determines that the DCI format in the PS-PDCCH indicates to the UE 116 to wake up for both the Uu link and the sidelink. Accordingly, the UE 116 monitors both the PDCCH in the Uu link and the PSCCH in the sidelink. If the DCI format indicates to the UE to not wake up for either the Uu link or the sidelink, the UE does not monitor PDCCH or PSCCH, respectively, in next corresponding DRX cycles.

In another embodiment, a separate power saving signal or channel for sidelink can be used to trigger PSCCH monitoring in a next DRX cycle. For example, a SCI format in a PS-PSCCH can indicate to the UE 116 whether or not to wake up. As another alternative, a combination of a SCI format in a PS-PSCCH and an information element in PS-PSSCH can be the power saving channels. In addition to whether or not the UE 116 needs to monitor PSCCH in a next DRC cycle, the power saving information can include an adaptation of parameters for PSSCH reception such as a number of MIMO layers or a minimum time separation between a PSCCH reception and corresponding scheduled PSSCH. A configuration for reception of a power saving signal or channel at sidelink and a configuration for the associated information can be same for out-of-coverage UEs or Mode 2 UEs as for Mode 1 UEs.

In various embodiments, the DRX cycle parameters for sidelink and Uu link can be the same or different. The UE can wake up independently by respective power saving signals or channels in Uu link and sidelink. The structure of the power saving signal or channel can also be different in the Uu link and the sidelink. For example, a DCI format in a PS-PDCCH can be used in the Uu link while a sequence through a signal can be used in the sidelink.

In embodiments where a UE, such as the UE 116, operates in a shared carrier for Uu link and sidelink, a configuration for DRX cycle parameters can be common for sidelink and Uu link. It is also possible that a configuration for DRX cycle parameters is separately provided for the Uu link and for the sidelink and the parameter values can be same or different. When any one of the power saving signal or channel indicates to the UE 116 to wake up in a next DRX cycle, the UE 116 wakes up in next DRX cycle for both Uu link to monitor PDCCH and sidelink to monitor PSSCH; otherwise, the UE does not wake up and does not monitor either of PDCCH and PSCCH.

In embodiments where a UE, such as the UE 116, operates in different carriers for Uu link and sidelink, a configuration for DRX cycle parameters can be separate or common for sidelink and Uu link. The UE 116 wakes up in the carrier indicated by respective power saving signals/channels. The UE 116 can benefit by reduced power consumption on either the Uu link or the sidelink from respective power saving signals/channels that are mutually independent.

Figure 29:
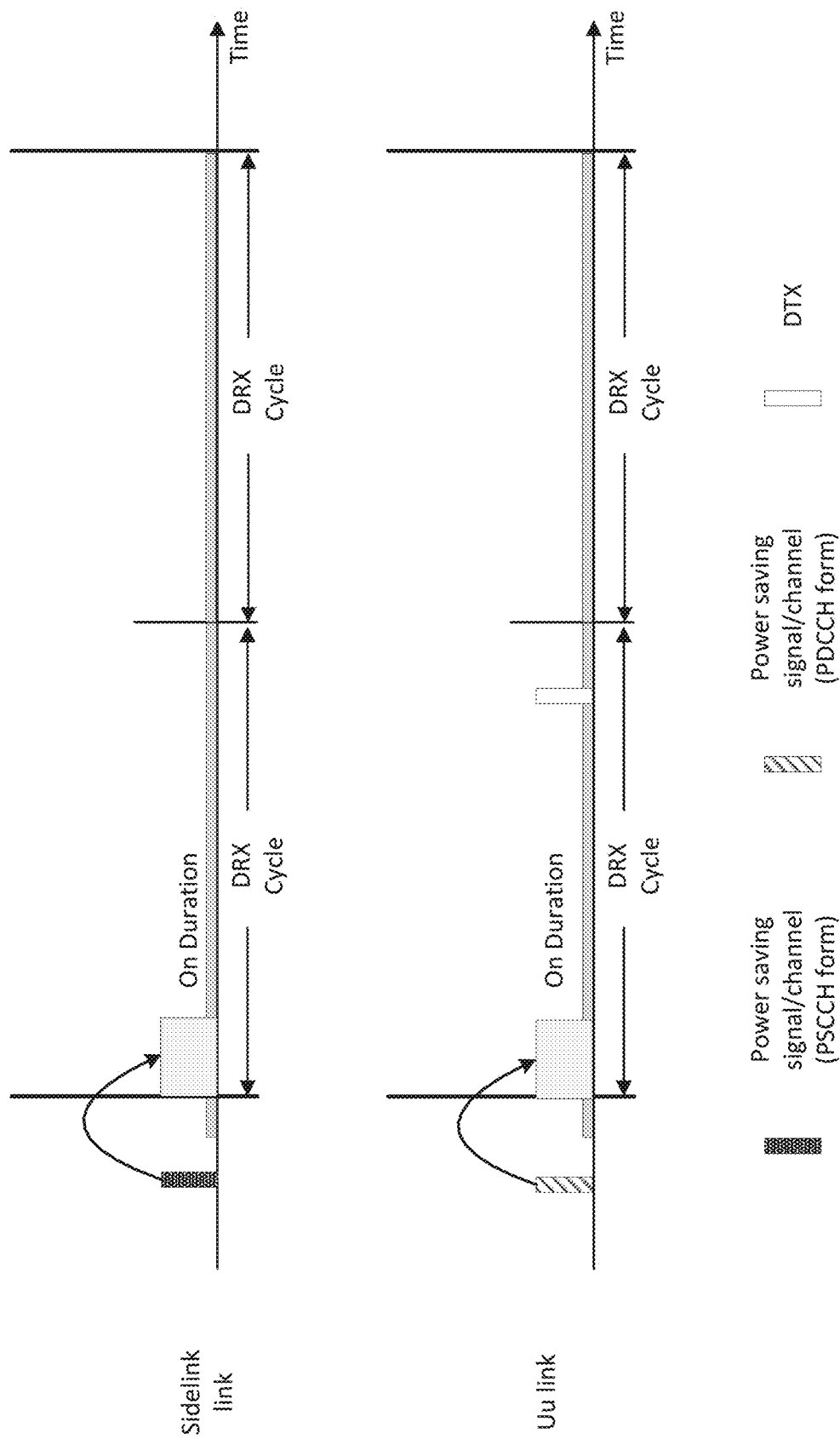
FIG. 29 illustrates a method of a Mode 1 power saving signal or channel for PSCCH and PDCCH according to various embodiments of the present disclosure.

FIG. 29 illustrates a method of a Mode 1 power saving signal or channel for PSCCH and PDCCH according to various embodiments of the present disclosure. The embodiment of the method shown in FIG. 29 is for illustration only. Other embodiments can be used without departing from the scope of the present disclosure.

In some embodiments, as shown in FIG. 29, a sidelink power saving signal or channel indicates whether or not the UE 116 monitors PSCCH in a next DRX cycle in the sidelink and a Uu link power saving signal or channel indicates whether or not the UE 116 monitors PDCCH in a next DRX cycle in the Uu link where the sidelink and Uu link operate in different carriers and DRX cycle configurations are same or different for the sidelink and Uu link.

In other embodiments, a separate power saving signal or channel for sidelink and for Uu link can be used to indicate to the UE 116 whether or not to monitor PSCCH in a next DRX cycle in the sidelink or PDCCH in a next DRX cycle in the Uu link. For example, the power saving signal or channel for sidelink can be provided by a separate DCI format in a PDCCH than the DCI format for Uu link. The separate power saving signals or channels for sidelink and Uu link can be configured to be in a same or in a different BWP or carrier. DRX cycle parameters for sidelink and Uu link can be provided by a common configuration from higher layers or by separate configurations from higher layers.

In embodiments where the UE 116 operates in a shared carrier for Uu link and sidelink, DRX cycle parameters can be provided by a common configuration by higher layers for sidelink and Uu link. When any one of the power saving signal or channel indicates to the UE 116 to wake up in a next DRX cycle, the UE 116 wakes up in the next DRX cycle for both Uu link to monitor PDCCH and sidelink to monitor PSCCH. If the indication is for the UE to now wake up, the UE does not monitor PDCCH or PSCCH.

In embodiments where the UE 116 operates in different carriers for Uu link and sidelink, DRX cycle parameters can be provided by same or separate configurations from higher layers for sidelink and Uu link. The UE 116 wakes up in the carrier indicated by respective power saving signals or channels. For example, a DCI format in a PDCCH or a DCI format in another PDCCH can indicate to the UE 116 the carriers and/or cells to monitor PDCCH or the carriers to monitor PSCCH, respectively. Then, the UE 116 can benefit by reduced power consumption from independent power saving signals or channels.

Figure 30:
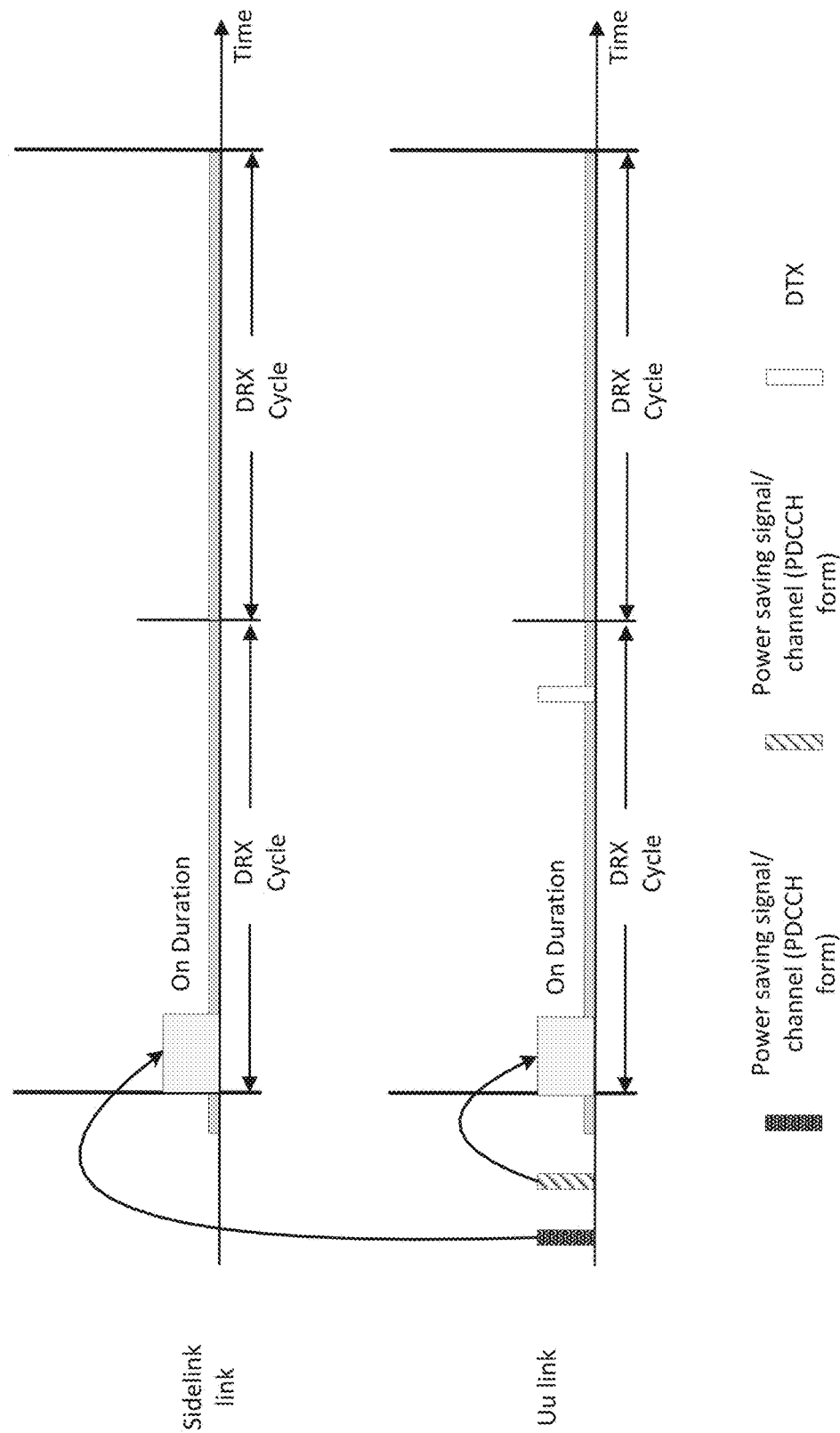
FIG. 30 illustrates a use of separate Mode 1 power savings channels for sidelink and Uu link according to various embodiments of the present disclosure.

FIG. 30 illustrates a use of separate Mode 1 power savings channels for sidelink and Uu link according to various embodiments of the present disclosure. The embodiment of the Mode 1 power saving signal or channel shown in FIG. 30 is for illustration only. Other embodiments can be used without departing from the scope of the present disclosure.

As shown in FIG. 30, a first DCI format in a PDCCH indicates to the UE 116 whether or not to monitor PSCCH in a next DRX cycle in the sidelink and a second DCI format in a PDCCH indicates to the UE 116 whether or not to monitor PDCCH in a next DRX cycle in the Uu link where the sidelink and the Uu link operate on different carriers while the UE can receive the power saving channels on the same carrier.

In some embodiments, the configuration for an in-coverage sidelink power saving signal or channel can be provided to the UE 116 by Uu higher layers after the UE 116 establishes an RRC connection with the gNB. For example, the configuration can be provided to both the transmitter UE 118 and to the power saving UE 116 in their respective Uu links.

Figure 31:
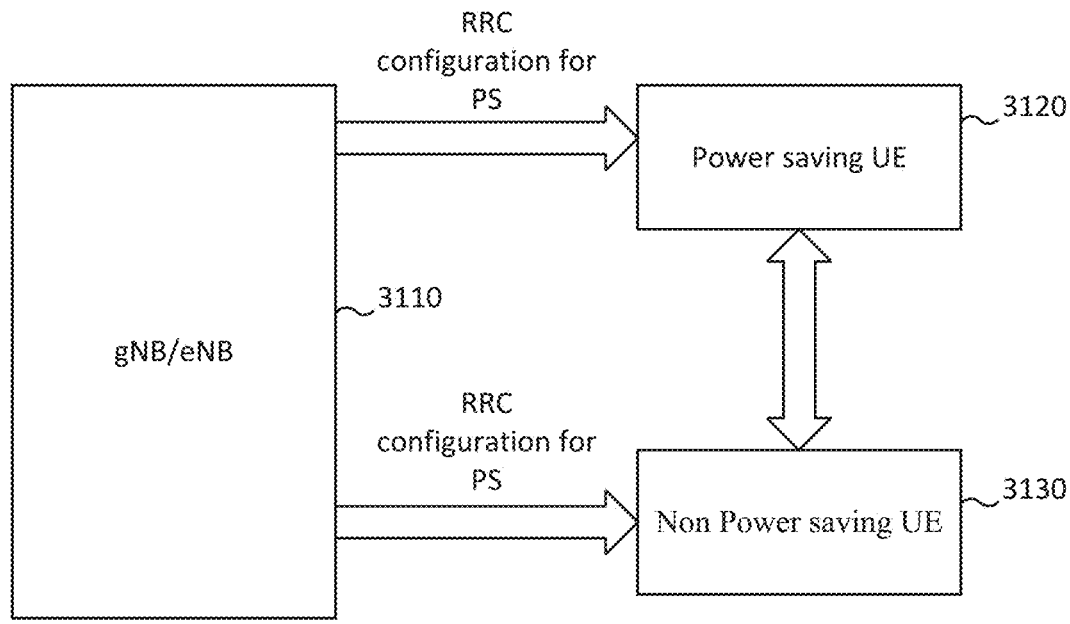
FIG. 31 illustrates an RRC configuration for power saving signals or channels according to various embodiments of the present disclosure.

FIG. 31 illustrates an RRC configuration for power saving signals or channels according to various embodiments of the present disclosure. The embodiment of the RRC configuration shown in FIG. 31 is for illustration only. Other embodiments can be used without departing from the scope of the present disclosure.

FIG. 31 illustrates a gNB 3110, a power saving UE 3120, and a non-power saving UE 3130. The gNB 3110 can be the gNB 102. Both the power saving UE 3120 and the non-power saving UE 3130 can be one of the UEs 111-118. As shown in FIG. 31, the gNB 3110 provides a power saving configuration for both the power saving UE 3120 and the non-power saving UE 3130.

In some embodiments, the configuration for a sidelink power saving signal or channel is provided only to the power saving UE in the Uu link, while the configuration for sidelink power saving signal or channel for the transmitter UE is provided in the sidelink by the receiver UE after a PC5-RRC connection is established.

Figure 32:
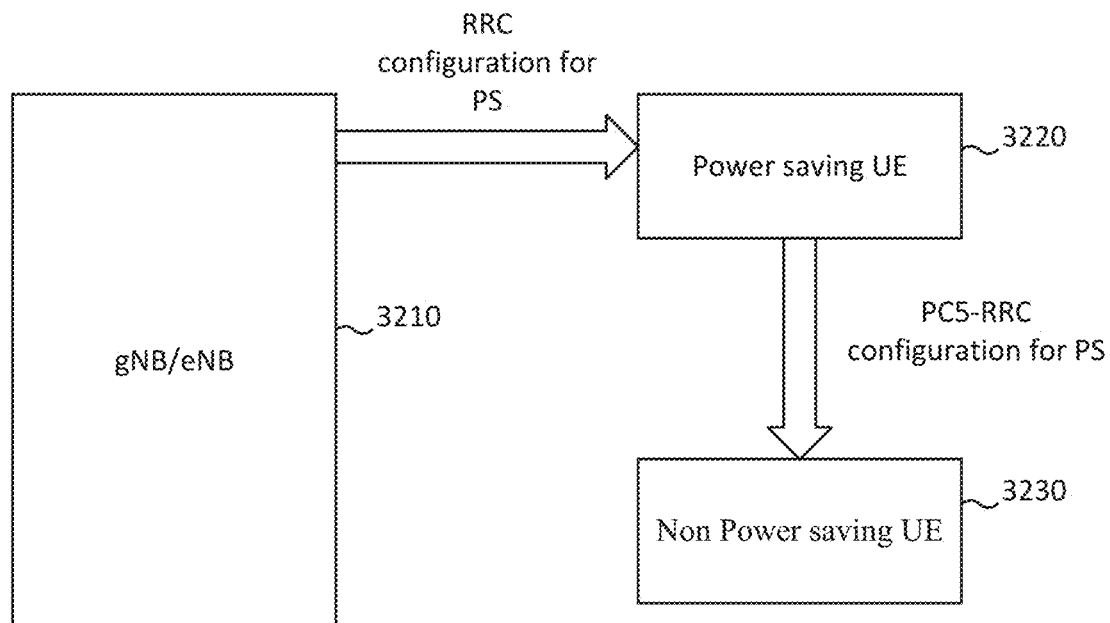
FIG. 32 illustrates an RRC and PC5-RRC configuration for a power saving signal or channel according various embodiments of the present disclosure.

FIG. 32 illustrates an RRC and PC5-RRC configuration for a power saving signal or channel according various embodiments of the present disclosure. The embodiment of the RRC and PC5-RRC configurations shown in FIG. 32 is for illustration only. Other embodiments can be used without departing from the scope of the present disclosure.

FIG. 32 illustrates a gNB 3210, a power saving UE 3220, and a non-power saving UE 3230. The gNB 3210 can be the gNB 102. Both the power saving UE 3220 and the non-power saving UE 3230 can be one of the UEs 111-118. The gNB 3210 provides a configuration for a power saving signal or channel reception by a power saving UE 3220 and the power saving UE 3220 provides a power saving configuration for the non-power saving UE 3230 to transmit a power saving signal or channel.

In some embodiments, the configuration for a sidelink power saving signal or channel to a Mode 1 UE can include whether the power saving channel is a PDCCH or a PSCCH. When the power saving channel is a PDCCH, the configuration can also include corresponding PDCCH monitoring parameters when the PDCCH for sidelink power savings is not same as the PDCCH for Uu link power savings.

In some embodiments, the configuration for the Mode 1 PSCCH sidelink power saving signal or channel can include one or more of monitoring periodicity, monitoring offset relative to the start of a next DRX cycle, or monitoring pattern within a slot. The monitoring pattern can indicate a time domain and/or a frequency domain location within a slot for power saving signal monitoring. The monitoring periodicity can also have values that are integer multiples of the length of the DRX cycle.

In some embodiments, the configuration for monitoring a Mode 1 PDCCH sidelink power saving channel can be same as for monitoring a Uu PDCCH power saving channel. The UE-specific configuration of search space sets for a DCI format in a PDCCH can be used to enable UE power savings for the UE to monitor outside Active Time. The CORESET(s) for the PDCCH reception outside Active Time can include at least one of the CORESET(s) configured for PDCCH monitoring inside Active Time.

In some embodiments, information fields of the DCI format in the PDCCH that are used to enable the UE power savings can include a field (when the PDCCH provides a DCI format for power saving in both the sidelink and the Uu link) that indicates PSCCH monitoring in sidelink only, PDCCH/PSCCH monitoring in both sidelink and Uu link, or PDCCH monitoring in Uu link only. For example, the field can have 2 bits wherein a first bit indicates whether or not the UE monitors PDCCH in a next DRX cycle for the Uu link and a second bit indicates whether or not the UE monitors PSCCH in a next DRX cycle for the sidelink. When the UE is configured for carrier aggregation operation in the sidelink, a field in the DCI format (when the sidelink power saving signal/channel is a PDCCH) or the SCI format (when the sidelink power saving signal or channel is a PSCCH) that indicates the carrier or carriers where the UE wakes up to monitor PSCCH or where the UE does not wake up to monitor PSCCH. When the UE is configured for multiple BWPs operation in the sidelink, a field in the DCI format (when the sidelink power saving signal or channel is a PDCCH) or SCI format (when the sidelink power saving signal/channel is a PSCCH) can indicate the BWP where the UE monitors PSCCH or the BWP where the UE remains in a dormant state and does not monitor PSCCH.

Information fields can further include dynamic DRX parameters, such as the length of onDurationTimer, drx-InactivityTimer, and DRX cycle. Information fields can further include information related to the decoding of a PSCCH that provides a SCI format for PSSCH scheduling, such as a starting symbol of the PSCCH reception, a number of symbols of the PSCCH, and a starting RB and a number of RBs for the PSCCH reception.

Various embodiments of the present disclosure provide support of a DRX operation with a reservation signal. A reservation signal can be used to reserve resources for an initial transmission of a TB in a PSCCH. The reservation signal can be a SCI format in a PSCCH that does not schedule a PSSCH transmission or be an SCI format in a PSCCH that schedules a PSSCH transmission. The reservation signal can be used as a sidelink power saving signal or channel to indicate to a UE whether or not to monitor PSCCH in the subsequent On Duration time of next DRX cycle.

Figure 33:
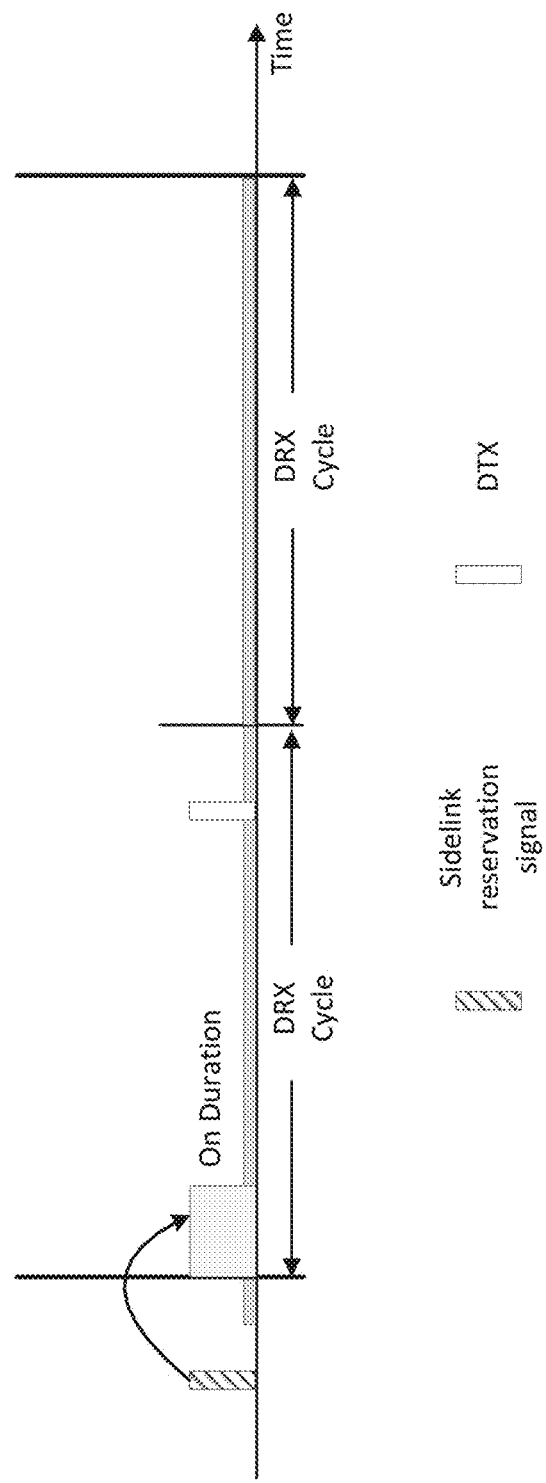
FIG. 33 illustrates a sidelink power saving signal or channel in a form of a reservation signal according to various embodiments of the present disclosure.

FIG. 33 illustrates a sidelink power saving signal or channel in a form of a reservation signal according to various embodiments of the present disclosure. The embodiment of the sidelink power saving signal or channel shown in FIG. 33 is for illustration only. Other embodiments can be used without departing from the scope of the present disclosure.

The sidelink power saving signal or channel in the form of the reservation signal illustrated in FIG. 33 can indicate to a UE, such as the UE 116, whether or not to monitor PSCCH in the subsequent On Duration time of a next DRX cycle. In embodiments where there is no data to transmit to the UE 116 in the next DRX cycle, a UE, such as the UE 118, may not transmit a reservation signal so that UE 116 does not wake up in next DRX cycle. A behavior of a UE when the UE does not detect a reservation signal or a SCI format providing an indication for whether or not the UE monitors PSCCH in a next DRX cycle can be configured to the UE to be either that the UE monitors PSCCH or that the UE does not monitor PSCCH in the next DRX cycle.

In some embodiments, the configuration for the sidelink power saving signal or channel in a form of a reservation signal can be provided by higher layers after a unicast connection is established among UEs. A configuration for the sidelink power saving signal or channel as a reservation signal can include one or more parameters including monitoring periodicity, monitoring offset relative to the start of a next DRX cycle, and monitoring pattern within a slot for reservation signal. In some embodiments, the monitoring pattern can indicate a time domain and/or a frequency domain location within a slot for power saving signal or channel monitoring (reservation signal). The monitoring periodicity can also be configured to have a same or different value as the length of DRX cycle including an integer multiple of the length of the DRX cycle in a number of slots or in milliseconds.

In some embodiments, additional information fields of a reservation signal for a power saving signal or channel can include DRX parameters, such as a length of onDuration-Timer, drx-InactivityTimer, and DRX cycle. The additional information fields can further include, when the UE 116 is configured for carrier aggregation operation in sidelink, a field in the SCI format that indicates the carrier(s) where the UE 116 monitors PSCCH and the carriers where the UE does not monitor PSCCH in respective DRX cycles. The additional information fields can further include, when the UE 116 is configured for operation in one BWP from multiple BWPs in sidelink, a field in the SCI format that indicates a BWP where the UE 116 monitors PSCCH or a BWP where the UE does not monitor PSCCH. The additional information fields can further include information related to decoding of PSCCH that provides a SCI format for PSSCH scheduling, such as a starting symbol of the PSCCH, a number of symbols of the PSCCH, and a starting subchannel/RB and a number of RBs for the PSCCH reception.

In embodiments where a reservation signal for power saving signal or channel is in a form of a SCI format in a PSCCH, the information that the SCI format provides can be configured to the UE 116 by higher layers. In embodiments where the reservation signal for power saving signal or channel is in a form of a SCI format in a PSCCH that schedules a PSSCH, the information provided by the SCI format and the by the PSSCH payload can be configured to the UE 116 by higher layers.

In embodiments where there are multiple sidelink connections between a UE and other UEs, the UE, such as the UE 116, can be provided a same set of DRX cycle parameters for all the sidelink connections with the other UEs, such as the UE 118. In these embodiments, the power saving signal or channel from different UEs 118 can use different reservation signal resources for transmission. If the UE 116 operates in a Mode 2, the configuration for reservation signal can be provided to other UEs 118 in sidelink by the UE 116.

In some embodiments, a group of UEs can be in a groupcast or broadcast mode. In these embodiments, a reservation signal can be used as a power saving signal or channel to reduce power consumption for the group of UEs. Since all UEs in the group need to be indicated by the reservation signal to either monitor or not monitor PSCCH, a same reservation signal configuration can be provided for all UEs in the group, such as for a monitoring periodicity, a monitoring offset relative to the start of a next DRX cycle, and a monitoring pattern within a slot. For Mode 2 UEs in the group, the configuration for a reservation signal can be provided to UEs in the group in sidelink by a UE in the group.

In embodiments where UEs are in in-coverage Mode 1, a configuration for reservation signal can be provided to a power saving UE by Uu higher layers after the UE establishes RRC connection with a gNB. For example, the configuration can be provided to both a transmitter UE and a power saving UE in their respective Uu links. As another example, the configuration is provided only to the power saving UE in the Uu link while the configuration for the transmitter UE is provided in the sidelink by the power saving UE after PC5-RRC is established. In various embodiments, this configuration procedure can also be applied to UEs in a groupcast or broadcast.

Various embodiments of the present disclosure provide resource allocation for UEs. Partial resource sensing can be used for a UE, such as a pedestrian UE, to reduce power consumption when the UE only senses a partial set of the slots in the sensing window when the UE has data to transmit. When a DRX procedure is introduced in sidelink, the partial set of slots are selected from the slots that are configured to be active in each DRX cycle within the sensing window.

In some embodiments, a UE, such as the UE 116, can determine to decide a resource selection/reselection in slot m. In these embodiments, the UE 116 selects the possible candidate resources, such as Y slots, in a time interval [m+T1, m+T2]. The minimum allowed value of Y can be configured or preconfigured to the UE 116. A selection of Y slots satisfies the constraint that the selected slots fall within the active slots, such as slots in drx-onDurationTimer, in a next DRX cycle. Different UEs can be configured with different drx-StartOffset values so that respective possible Y candidate resources do not entirely overlap, and the resource conflict probability can be reduced.

For any candidate resource in slot n within the set of Y slots, the UE 116 senses at least slot n−P*k that falls within the active slots, such as slots in drx-onDurationTimer, in each DRX cycle in the sensing window to detect whether or not the candidate resource in slot n is reserved by other UEs, where k is configured or pre-configured in a range between [k1, k2], and P is the period of the sensing slots.

Figure 34:
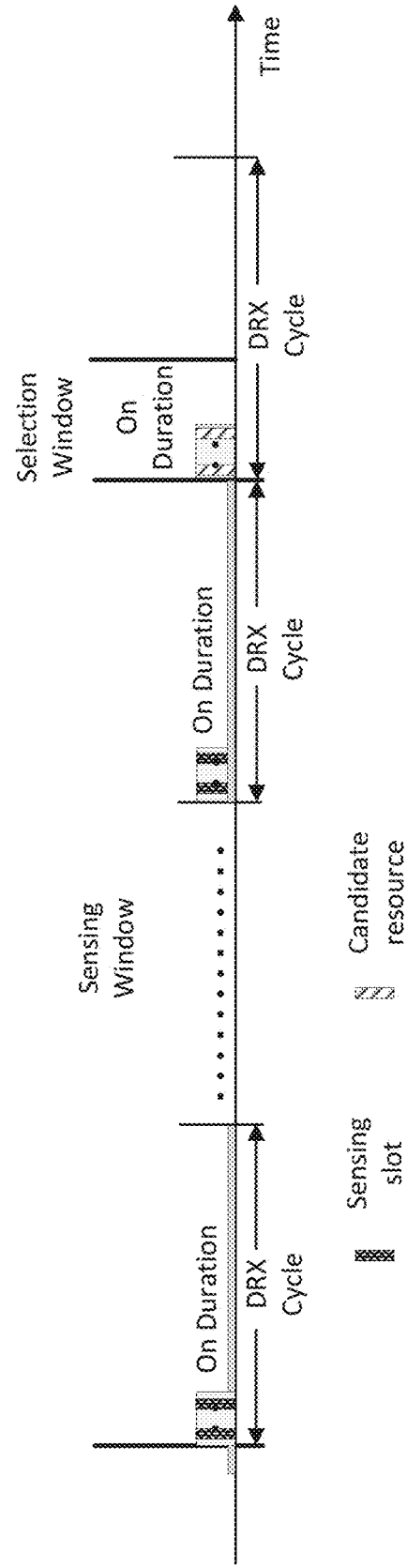
FIG. 34 illustrates partial resource sensing and resource selection or reselection according to various embodiments of the present disclosure.

FIG. 34 illustrates partial resource sensing and resource selection or reselection according to various embodiments of the present disclosure. The embodiment of the partial resource sensing and resource selection or reselection shown in FIG. 34 is for illustration only. Other embodiments can be used without departing from the scope of the present disclosure.

As shown in FIG. 34, sensing slots can be located in each On Duration period in each DRX cycle. Candidate resources can also be located in the On Duration period in a next DRX cycle. Candidate resources in the selection window can be excluded by a UE if the UE detects a SCI format in the sensing slots of the sensing window that indicates that the resource is reserved by another UE. In embodiments where a power saving signal or channel is considered in the DRX procedure and the UE does not monitor PSCCH in a DRX cycle if a power saving signal or channel is not received, the UE can skip the sensing slot in the DRX cycle.

Figure 35:
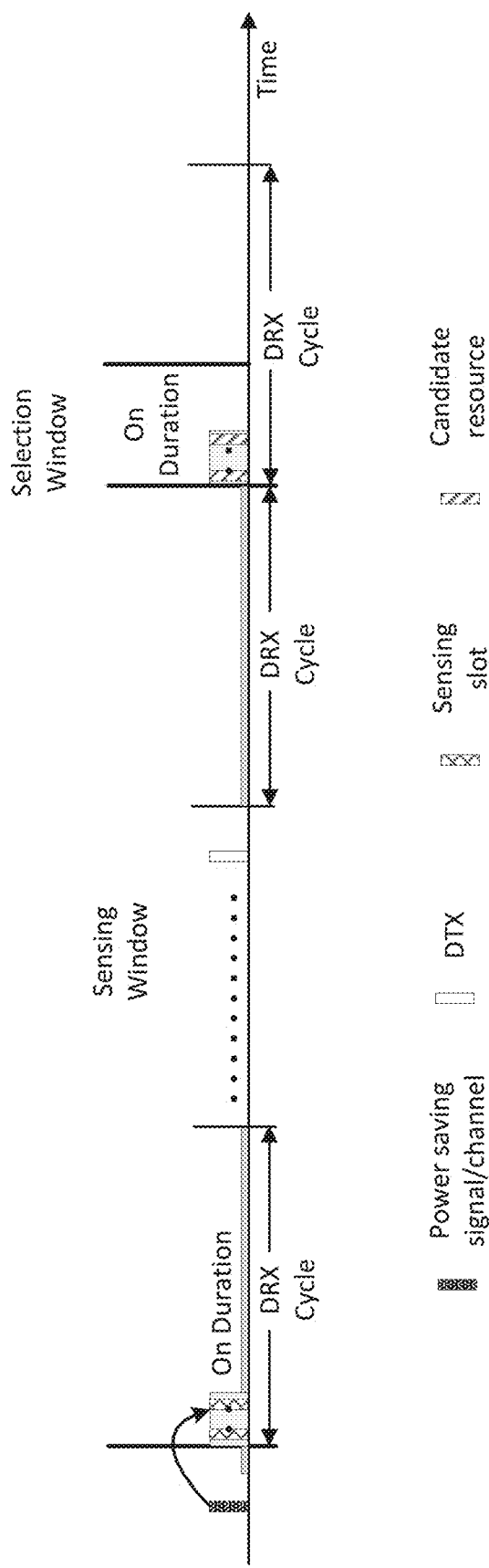
FIG. 35 illustrates partial resource sensing and resource selection or reselection with a power saving signal or channel according to various embodiments of the present disclosure.

FIG. 35 illustrates partial resource sensing and resource selection or reselection with a power saving signal or channel according to various embodiments of the present disclosure. The embodiment of the partial resource sensing and resource selection or reselection shown in FIG. 35 is for illustration only. Other embodiments can be used without departing from the scope of the present disclosure.

As shown in FIG. 35, partial resource sensing and resource selection can be performed when a UE, such as the UE 116, monitors a power saving signal or channel before each DRX cycle. Sensing slots can be located in each On Duration period in each DRX cycle. Candidate resources can be located in the On Duration period in a next DRX cycle. In one DRX cycle, a power saving signal/channel indicates to the UE 116 to monitor PSCCH in the On Duration period. The UE 116 can use for resource sensing slots in a respective DRX cycle. In another DRX cycle, a power saving signal or channel indicates to the UE 116 to not monitor PSCCH in an On Duration period and the UE 116 does not use slots in this DRX cycle for resource sensing. The UE 116 can exclude a candidate resource in a selection or reselection window when a detected SCI format in the sensing slots of the sensing window indicates that the resource is reserved by another UE.

In some embodiments, the UE 116 can skip sensing slots in a DRX cycle when a power saving signal or channel is provided by a DCI format in a PDCCH for Mode 1 operation and the UE 116 does not monitor PSCCH in a DRX cycle when the UE 116 does not detect the DCI format or when the UE 116 detects the DCI format and the indication is to skip PSCCH monitoring.

In various embodiments, a UE can perform RSSI measurements in slots n-P*k that are within the active slots, such as a drx-onDurationTimer, in each DRX cycle in the sensing window. The UE selects one of the candidate resources with the lowest value for the RSSI measurements in the resource selection or reselection window. A RSSI value for each candidate resource in the resource selection or reselection window is a linear average of a RSSI measurement on all subchannels that are occupied by the candidate resource and slots n-P*k that are within the active slots, such as the drx-onDurationTimer, in each DRX cycle in the sensing window. Similar, k can be configured or pre-configured in a range between [k1, k2], wherein P is a period of the sensing slots.

Figure 36:
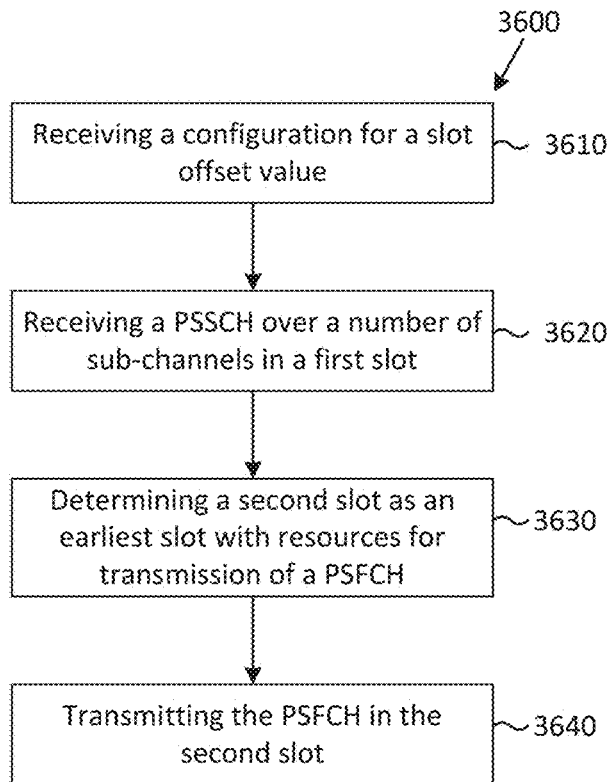
FIG. 36 illustrates a method of providing HARQ-ACK information according to various embodiments of the present disclosure.

FIG. 36 illustrates a method of providing HARQ-ACK information according to various embodiments of the present disclosure. Although described herein as being implemented by the UE 116, the method 3600 illustrated in FIG. 36 can be implemented by one or more of the UEs 111-116 described in FIG. 1. Other embodiments can be used without departing from the scope of the present disclosure.

In operation 3610, a UE, such as the UE 116, receives a configuration for a slot offset value. In operation 3620, the UE 116 receives a PSSCH over a number of sub-channels in a first slot. The PSSCH includes a TB.

In operation 3630, the UE 116 determines a second slot as an earliest slot with resources for transmission of a PSFCH that is after the first slot by a number of slots equal to the slot offset value. The PSFCH can include the HARQ-ACK information that is in response to reception of the TB. In operation 3640, the UE 116 transmits the PSFCH in the second slot.

In some embodiments, the method 3600 further includes receiving a configuration for a number of slots. The resources for the PSFCH transmission can exist with a periodicity equal to the number of slots. When HARQ-ACK information reporting is enabled for groupcast transmissions, the HARQ-ACK information in the PSFCH transmission can include (i) only NACK value(s) or (ii) either ACK or NACK value(s).

In some embodiments, sub-channels and slots are mapped to the resources for the PSFCH transmission first in ascending order of a slot index, starting from a first sub-channel index, and then in ascending order of a sub-channel index, starting from a first slot index.

In some embodiments, the method 3600 further includes determining a number of resources for the PSFCH transmission in a slot for the PSFCH transmission. In some embodiments, the method 3600 further comprises determining to use the slot as the second slot for the PSFCH transmission based on determining that the number of resources is larger than or equal to a value.

In some embodiments, the method 3600 further includes receiving a first SCI format that includes an indication of time resources and of frequency resources for a PSSCH reception, receiving a second SCI format that includes an identity of a zone, determining an indication whether to transmit the PSFCH based on the identity of the zone, and transmitting the PSFCH based on the indication.

Figure 37:
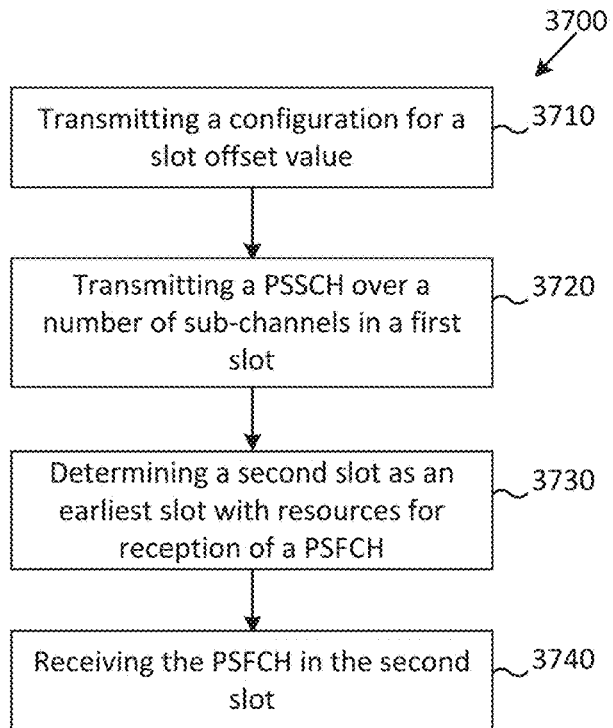
FIG. 37 illustrates a method of obtaining HARQ-ACK information according to various embodiments of the present disclosure.

FIG. 37 illustrates a method of obtaining HARQ-ACK information according to various embodiments of the present disclosure. Although described herein as being implemented by the UE 116, the method 3700 illustrated in FIG. 37 can be implemented by one or more of the UEs 111-116 described in FIG. 1. Other embodiments can be used without departing from the scope of the present disclosure.

In operation 3710, a UE, such as the UE 116, transmits a configuration for a slot offset value. In operation 3720, the UE 116 transmits a PSSCH over a number of sub-channels in a first slot. The PSSCH includes a TB.

In operation 3730, the UE 116 determines a second slot as an earliest slot with resources for the reception of a PSFCH that is after the first slot by a number of slots equal to the slot offset value.

In operation 3740, the UE 116 receives the PSFCH in the second slot. In some embodiments, the PSFCH can include the HARQ-ACK information that is in response to the transmission of the TB.

In some embodiments, the method 3700 further includes transmitting a configuration for a number of slots. The resources for the PSFCH reception can exist with a periodicity equal to the number of slots. When HARQ-ACK information reporting is enabled for groupcast transmissions, the HARQ-ACK information in the PSFCH reception can include (i) only NACK value(s) or (ii) either ACK or NACK value(s).

In some embodiments, sub-channels and slots can be mapped to the resources for the PSFCH reception first in ascending order of a slot index, starting from a first sub-channel index, and then in ascending order of a sub-channel index, starting from a first slot index.

In some embodiments, the method 3700 further includes determining a number of resources for the PSFCH reception in a slot for the PSFCH reception and determining the slot as the second slot for the PSFCH reception based on determining that the number of resources is larger than or equal to a value.

In some embodiments, the method 3700 further includes transmitting a first SCI format that includes an indication of time resources and frequency resources for the PSSCH transmission, transmitting a second SCI format that includes an identity of a zone, determining an indication whether to receive the PSFCH based on the identity of the zone, and receiving the PSFCH based on the indication.

The above flowcharts illustrate examples of methods that can be implemented in accordance with the principles of the present disclosure and various changes could be made to the methods illustrated in the flowcharts. For example, while shown as a series of steps, various steps in each figure could overlap, occur in parallel, occur in a different order, or occur multiple times. In another example, steps may be omitted or replaced by other steps.

Although the present disclosure has been described with an example embodiment, various changes and modifications can be suggested by or to one skilled in the art. It is intended that the present disclosure encompass such changes and modifications as fall within the scope of the appended claims.

What is claimed is:

1. A first user equipment (UE) in a wireless communication system, the first UE comprising:
   a transceiver configured to:
   receive, from a second UE, information indicating an identifier (ID) of the first UE; and
   receive, from the second UE, a physical sidelink shared channel (PSSCH); and
   a processor operably coupled to the transceiver, the processor configured to determine a physical sidelink feedback channel (PSFCH) resource based on a value modulo a number of PSFCH resources, wherein the value is based on the ID of the first UE,
   wherein the transceiver is further configured to transmit, to the second UE, a PSFCH using the PSFCH resource.

2. The first UE of claim 1, wherein:
   the transceiver is further configured to receive information indicating a period of the PSFCH resource in a resource pool, and
   the period of the PSFCH resource is a number of slots.

3. The first UE of claim 2, wherein, when the number of slots is zero, a PSFCH transmission from the first UE in the resource pool is disabled.

4. The first UE of claim 1, wherein the PSFCH resource includes a resource in a first slot after a last slot for a reception of the PSSCH.

5. The first UE of claim 1, wherein:
   the transceiver is further configured to receive, from the second UE, a sidelink control information (SCI) format,
   the processor is further configured to identify a zone identifier (zone ID) included in the SCI format, and
   the zone ID is related to position information of the second UE.

6. The first UE of claim 1, wherein:
   the transceiver is further configured to receive, from the second UE, a sidelink control information (SCI) format related to the PSSCH,
   the SCI format includes information indicating whether the PSSCH is: (i) unicast, (ii) groupcast related to a hybrid automatic repeat request acknowledgement (HARQ-ACK) information reporting of a first option, or (ii) groupcast related to a HARQ-ACK information reporting of a second option,
   the first option corresponds to a PSFCH transmission providing HARQ-ACK information with an ACK or NACK value, and the second option corresponds to a PSFCH transmission providing HARQ-ACK information with a NACK value.

7. A second user equipment (UE) in a wireless communication system, the second UE comprising:
a transceiver configured to:
transmit, to a first UE, information indicating an identifier (ID) of the first UE;
transmit, to the first UE, a physical sidelink shared channel (PSSCH); and
receive, from the first UE, a physical sidelink feedback channel (PSFCH) using at least one PSFCH resource,
wherein the at least one PSFCH resource is determined based on a value modulo a number of PSFCH resources, wherein the value is based on the ID of the first UE.

8. The second UE of claim 7, wherein:
the transceiver is further configured to transmit, to the first UE, configuration information indicating a period of the PSFCH resource in a resource pool, and
the period of the PSFCH resource is a number of slots.

9. The second UE of claim 8, wherein, when the number of slots is zero, a PSFCH reception from the first UE in the resource pool is disabled.

10. The second UE of claim 7, wherein the at least one PSFCH resource includes a resource in a first slot after a last slot for a reception of the PSSCH.

11. The second UE of claim 7, wherein:
the transceiver is further configured to transmit, to the first UE, a sidelink control information (SCI) format, and
the SCI format includes a zone identifier (zone ID) which is related to position information of the second UE.

12. The second UE of claim 7, wherein:
the transceiver is further configured to transmit, to the first UE, a sidelink control information (SCI) format related to the PSSCH,
the SCI format includes information indicating whether the PSSCH is (i) unicast, (ii) groupcast related to a hybrid automatic repeat request acknowledgement (HARQ-ACK) information reporting of a first option, or (iii) groupcast related to a HARQ-ACK information reporting of a second option,
the first option corresponds to a PSFCH transmission providing HARQ-ACK information with an ACK or NACK value, and
the second option corresponds to a PSFCH transmission providing HARQ-ACK information with a NACK value.

13. The second UE of claim 7, further comprising:
a processor operably coupled to the transceiver, the processor configured to:
determine whether a total transmission power of the second UE exceeds a configured maximum transmission power of the second UE, wherein the total transmission power includes a power for an uplink transmission to a base station and a power for a sidelink transmission to the first UE;
when the sidelink transmission has a higher priority than the uplink transmission, reduce the uplink transmission power so that the total transmission power does not exceed the configured maximum transmission power; and
when the uplink transmission has a higher priority than the sidelink transmission, reduce the sidelink transmission power so that the total transmission power does not exceed the configured maximum transmission power,
wherein the transceiver is further configured to perform the uplink transmission and the sidelink transmission simultaneously based on the uplink transmission power and the sidelink transmission power.

14. A method for operating a first user equipment (UE) in a wireless communication system, the method comprising:
receiving, from a second UE, information indicating an identifier (ID) of the first UE;
receiving, from the second UE, a physical sidelink shared channel (PSSCH);
determining a physical sidelink feedback channel (PSFCH) resource based on a value modulo a number of PSFCH resources, wherein the value is based on the ID of the first UE; and
transmitting, to the second UE, a PSFCH using the PSFCH resource.

15. The method of claim 14, further comprising:
receiving information indicating a period of the PSFCH resource in a resource pool, wherein the period of the PSFCH resource is a number of slots.

16. The method of claim 15, wherein, when the number of slots is zero, a PSFCH transmission from the first UE in the resource pool is disabled.

17. The method of claim 14, wherein the PSFCH resource includes a resource in a first slot after a last slot for a reception of the PSSCH.

18. The method of claim 14, further comprising:
receiving, from the second UE, a sidelink control information (SCI) format; and
identifying a zone identifier (zone ID) included in the SCI format, wherein the zone ID is related to position information of the second UE.

19. The method of claim 14, further comprising:
receiving, from the second UE, a sidelink control information (SCI) format related to the PSSCH, wherein:
the SCI format includes information indicating whether the PSSCH is: (i) unicast, (ii) groupcast related to a hybrid automatic repeat request acknowledgement (HARQ-ACK) information reporting of a first option, or (iii) groupcast related to a HARQ-ACK information reporting of a second option,
the first option corresponds to a PSFCH transmission providing HARQ-ACK information with an ACK or NACK value, and
the second option corresponds to a PSFCH transmission providing HARQ-ACK information with a NACK value.

* * * * *